US010075725B2

(12) United States Patent
Minezawa et al.

(10) Patent No.: US 10,075,725 B2
(45) Date of Patent: Sep. 11, 2018

(54) DEVICE AND METHOD FOR IMAGE ENCODING AND DECODING

(71) Applicant: Mitsubishi Electric Corporation, Tokyo (JP)

(72) Inventors: Akira Minezawa, Tokyo (JP); Shunichi Sekiguchi, Tokyo (JP); Yoshimi Moriya, Tokyo (JP); Ryoji Hattori, Tokyo (JP); Kazuyuki Miyazawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 18 days.

(21) Appl. No.: 15/110,650

(22) PCT Filed: Feb. 2, 2015

(86) PCT No.: PCT/JP2015/052855
§ 371 (c)(1),
(2) Date: Jul. 8, 2016

(87) PCT Pub. No.: WO2015/115644
PCT Pub. Date: Aug. 6, 2015

(65) Prior Publication Data
US 2016/0330468 A1 Nov. 10, 2016

(30) Foreign Application Priority Data

Feb. 3, 2014 (JP) .................................. 2014-018368
Nov. 11, 2014 (JP) .................................. 2014-228604

(51) Int. Cl.
*G06K 9/00* (2006.01)
*H04N 19/51* (2014.01)
(Continued)

(52) U.S. Cl.
CPC ............ *H04N 19/51* (2014.11); *H04N 19/184* (2014.11); *H04N 19/43* (2014.11); *H04N 19/439* (2014.11);
(Continued)

(58) Field of Classification Search
CPC ...... H04N 19/51; H04N 19/52; H04N 19/439; H04N 19/184; H04N 19/43; H04N 19/503; H04N 19/46
(Continued)

(56) References Cited

U.S. PATENT DOCUMENTS 7,236,526 B1 6/2007 Kitamura
9,210,426 B2 * 12/2015 Sekiguchi ............ H04N 19/593
(Continued)

FOREIGN PATENT DOCUMENTS

CN 103141106 A 6/2013
EP 2348719 A2 7/2011
(Continued)

OTHER PUBLICATIONS

"Advanced video coding for generic audiovisual services", Series H: Audiovisual and Multimedia Systems: Infrastructure of audiovisual services—Coding of moving video, ITU-T, H.264, Feb. 2014, total pp. 801.
(Continued)

*Primary Examiner* — Aaron W Carter
(74) *Attorney, Agent, or Firm* — Birch, Stewart, Kolasch & Birch, LLP

(57) ABSTRACT

When a randomly-accessible inter picture is encoded, a prediction image generator sets a reference picture from among a plurality of randomly-accessible intra pictures, and performs a motion-compensated prediction using the set reference picture for a prediction process, and a variable length encoding unit 13 encodes both picture position infor-
(Continued)

mation showing the position of the reference picture, and identification information showing that the randomly-accessible inter picture is randomly accessible, and multiplexes encoded data about both the picture position information and the identification information into a bitstream.

5 Claims, 26 Drawing Sheets

(51) Int. Cl.
    *H04N 19/503* (2014.01)
    *H04N 19/46* (2014.01)
    *H04N 19/184* (2014.01)
    *H04N 19/43* (2014.01)
    *H04N 19/42* (2014.01)
    *H04N 19/52* (2014.01)

(52) U.S. Cl.
    CPC .......... *H04N 19/46* (2014.11); *H04N 19/503* (2014.11); *H04N 19/52* (2014.11)

(58) Field of Classification Search
    USPC ............ 382/236, 232, 233, 238; 375/240.17, 375/E7.26
    See application file for complete search history.

(56) References Cited

U.S. PATENT DOCUMENTS

| | | | | |
|---|---|---|---|---|
| 9,654,773 | B2* | 5/2017 | Sekiguchi | H04N 19/593 |
| 9,674,532 | B2* | 6/2017 | Kim | H04N 19/105 |
| 9,906,795 | B2* | 2/2018 | Sekiguchi | H04N 19/154 |
| 2004/0179610 | A1* | 9/2004 | Lu | G06T 9/004 375/240.25 |
| 2006/0291807 | A1 | 12/2006 | Ryu et al. | |
| 2007/0263722 | A1 | 11/2007 | Fukuzawa | |
| 2008/0075168 | A1* | 3/2008 | Toma | H04N 19/159 375/240.15 |
| 2010/0118944 | A1 | 5/2010 | Tanaka et al. | |
| 2010/0177776 | A1 | 7/2010 | Crinon et al. | |
| 2011/0032988 | A1 | 2/2011 | Chiba et al. | |
| 2013/0028326 | A1* | 1/2013 | Moriya | H04N 19/176 375/240.16 |
| 2013/0188706 | A1* | 7/2013 | Minezawa | H04N 19/147 375/240.12 |
| 2013/0287312 | A1* | 10/2013 | Minezawa | G06T 5/20 382/233 |
| 2014/0044369 | A1* | 2/2014 | Sekiguchi | H04N 19/00763 382/236 |
| 2015/0023420 | A1* | 1/2015 | Minezawa | H04N 19/00951 375/240.13 |
| 2015/0237379 | A1* | 8/2015 | Minezawa | H04N 19/82 375/240.12 |
| 2015/0256827 | A1* | 9/2015 | Minezawa | H04N 19/593 375/240.03 |
| 2015/0271502 | A1* | 9/2015 | Hattori | H04N 19/16 375/240.02 |
| 2016/0021379 | A1* | 1/2016 | Minezawa | H04N 19/463 375/240.13 |
| 2017/0171543 | A1* | 6/2017 | Moriya | H04N 19/107 |
| 2017/0244971 | A1* | 8/2017 | Sekiguchi | H04N 19/154 |

FOREIGN PATENT DOCUMENTS

| | | |
|---|---|---|
| JP | 2007-306160 A | 11/2007 |
| JP | 5023739 B2 | 11/2013 |
| JP | 5355815 B2 | 11/2013 |
| WO | WO 00/48402 A1 | 8/2000 |
| WO | WO 2006/003814 A1 | 1/2006 |

OTHER PUBLICATIONS

"High efficiency video coding", Series H: Audiovisual and Multimedia Systems: Infrastructure of audiovisual services—Coding of moving video, ITU-T, H.265, Apr. 2013, total pp. 317.

Sullivan et al., "Overview of the High Efficiency Video Coding (HEVC) Standard", IEEE Transactions on Circuits and Systems for Video Technology, vol. 22, No. 12, Dec. 2012, pp. 1649-1668.

Pettersson et al., "HLS: Dependent RAP indication SEI message," JCTVC-R0059, Joint Collaborative Team on Video Coding (JCT-VC) of ITU-T. SG 16 WP 3 and ISO/IEC JTC1/SC 29/WG 11, 18th Meeting: Sapporo, JP, Jun. 30-Jul. 9, 2014 (date saved: Jun. 19, 2014), XP030116302, pp. 1-5.

Office action issued in corresponding Chinese Application No. 201580006481.X dated May 25, 2018 in.

* cited by examiner

0th Hierarchical Layer
1st Hierarchical Layer
2nd Hierarchical Layer
3rd Hierarchical Layer
4th Hierarchical Layer

| Index | Class Classifying Method |
|---|---|
| 0 | No Offset Process |
| 1 | EO Method 1 |
| 2 | EO Method 2 |
| 3 | EO Method 3 |
| 4 | EO Method 4 |
| 5 | BO Method |

Region A
Region B
Region D
$P_i^n$
Region C

◯ Adjacent Already-Encoded Pixel

◯ Pixel to Be Filtered
◯ Reference Pixel

FIG.21

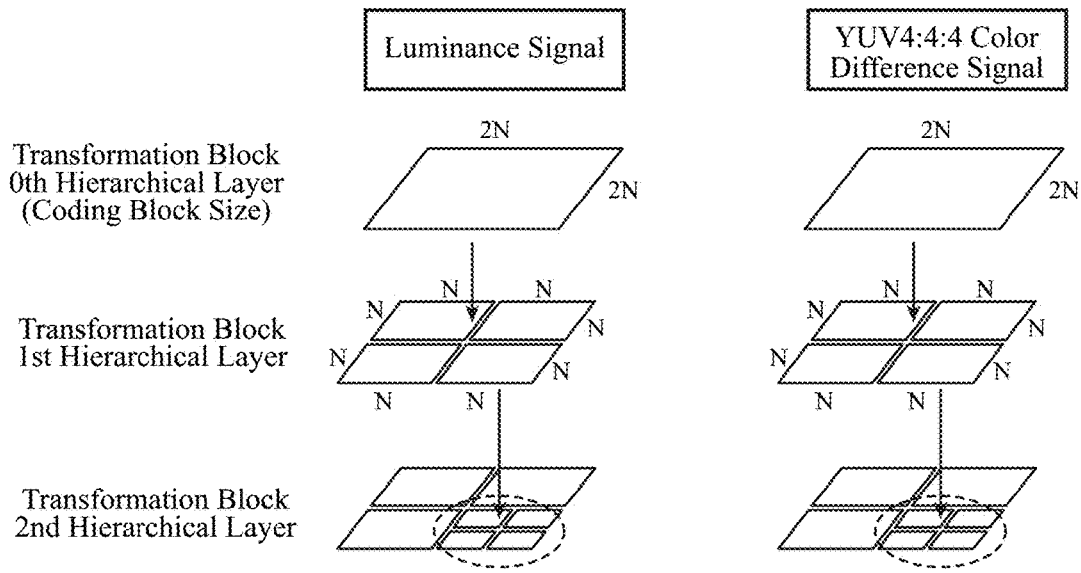

FIG.22

| Intra Prediction Parameter of Color Difference Signals | Color Difference Intra Prediction Mode |
|---|---|
| 0 | Planar Prediction |
| 1 | Vertical Prediction |
| 2 | Horizontal Prediction |
| 3 | Mean Value (DC) Prediction |
| 4 | DM Mode |
| 5 | LM Mode |

FIG.23

| Intra Prediction Parameter of Color Difference Signals | Color Difference Intra Prediction Mode |
|---|---|
| 0 | Planar Prediction |
| 1 | Vertical Prediction |
| 2 | Horizontal Prediction |
| 3 | Mean Value (DC) Prediction |
| 4 | DM Mode |

FIG.26
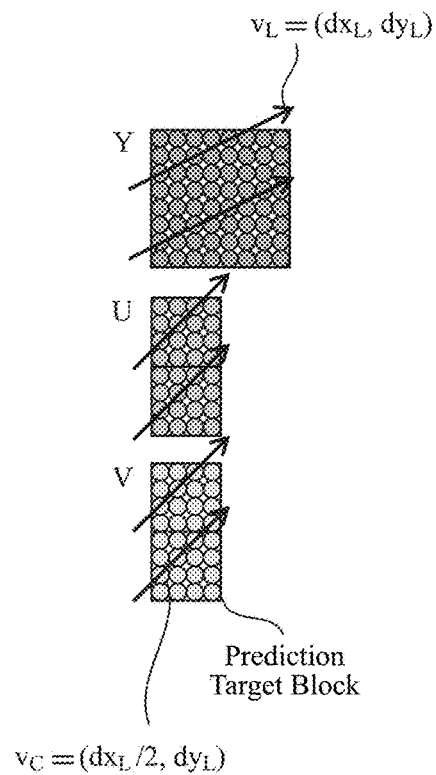
FIG.27
In the Case of Prediction from Left          In the Case of Prediction from Top
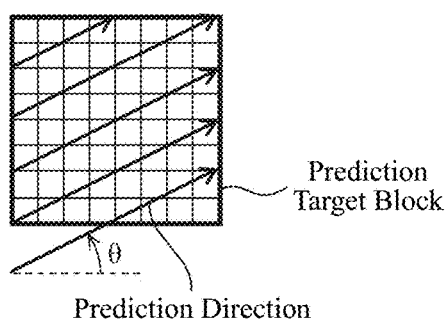          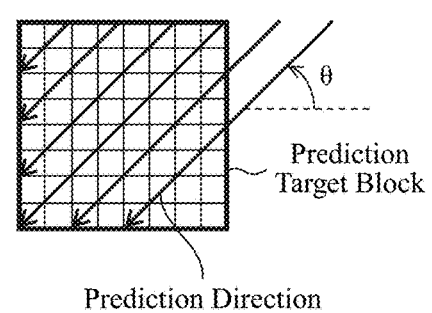

FIG.28

| Intra Prediction Mode Index of Luminance Signal | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| Intra Prediction Mode Index of Color Difference Signals | 0 | 1 | 2 | 2 | 2 | 2 | 3 | 5 | 7 | 8 | 10 | 12 | 13 | 15 | 17 | 18 | 19 | 20 |
| Intra Prediction Mode Index of Luminance Signal | 18 | 19 | 20 | 21 | 22 | 23 | 24 | 25 | 26 | 27 | 28 | 29 | 30 | 31 | 32 | 33 | 34 | |
| Intra Prediction Mode Index of Color Difference Signals | 21 | 22 | 23 | 23 | 24 | 24 | 25 | 25 | 26 | 27 | 27 | 28 | 28 | 29 | 29 | 30 | 31 | |

FIG.29

| Intra Prediction Mode Index | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|
| tanθ | 32/32 | 26/32 | 21/32 | 17/32 | 13/32 | 9/32 | 5/32 | 2/32 | 0 | −2/32 | −5/32 | −9/32 | −13/32 | −17/32 | −21/32 | −26/32 | −32/32 |

| Intra Prediction Mode Index | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|
| tanθ | −32/26 | −32/21 | −32/17 | −32/13 | −32/9 | −32/5 | −32/2 | - | 32/2 | 32/5 | 32/9 | 32/13 | 32/17 | 32/21 | 32/26 | 32/32 |

DEVICE AND METHOD FOR IMAGE ENCODING AND DECODING

FIELD OF THE INVENTION

The invention relates to an image encoding device for and an image encoding method of encoding an image with a high degree of efficiency, an image decoding device for and an image decoding method of decoding an image which is encoded with a high degree of efficiency, and an encoded stream conversion device.

BACKGROUND OF THE INVENTION

For example, in a conventional image encoding device described in the following nonpatent reference 1, an inputted color image is partitioned into largest coding blocks each having a predetermined size, and each largest coding block is further partitioned hierarchically into smaller coding blocks.

Each coding block is further partitioned into smaller prediction blocks, and an intra-screen prediction and a motion-compensated prediction are performed on each of the prediction blocks to generate a prediction error.

Further, the prediction error is divided hierarchically into transformation blocks within each coding block, and each of the transform coefficients is entropy-encoded, thereby achieving a high compression ratio.

In a conventional image encoding device, in order to implement high-efficiency encoding using a temporal correlation, a block having a high correlation with a coding target block is searched for from an already-encoded picture according to, for example, an encoding configuration as shown in FIG. 30(a), and encoding using a motion-compensated prediction which provides the block which is searched for as a predicted value is carried out. In general, a picture used for the motion-compensated prediction at that time is referred to as an inter picture, a picture which is a destination of the search (reference) in the motion-compensated prediction is referred to as a reference picture, and a picture which is predicted from only already-encoded pixels in a coding target picture without using the motion compensation is referred to as an intra picture. Particularly, it is known that a bidirectional prediction which is motion compensation which refers to both a past picture and a future picture in the display order as shown in FIG. 30(b) can implement a high-accuracy prediction. However, providing a reference relation between pictures by using motion compensation, as shown in these examples, results in dependence occurring in the decoding of each picture, and, as a result, decoding of an encoded bitstream (encoded stream) cannot be carried out from a picture existing at some midpoint of the bitstream and a halfway playback of a video image cannot be carried out.

Therefore, when using the encoding configuration using a motion-compensated prediction as shown in FIG. 30 or the like, there is a case of preparing a random access point showing a halfway decoding start point in order to make it possible to normally perform a playback even if the encoded bitstream is decoded from some midpoint of the bitstream. For example, an example of setting a randomly-accessible picture (an Intra Random Access Point (IRAP) picture described in nonpatent reference 1) is shown in FIG. 31. While an inter picture is allowed to refer to a picture preceding to an intra picture in time, an inter picture subsequent to an IRAP picture in the decoding order (encoding order) and also in the display order cannot refer to a picture preceding to the IRAP picture in time across the IRAP picture. More specifically, a limitation of the reference destination of the motion-compensated prediction is imposed on an inter picture subsequent to an IRAP picture in the decoding order (encoding order) and also in the display order. In this case, also when starting the decoding from some midpoint of the encoded bitstream, by starting the decoding from an IRAP picture, pictures whose positions in the display order are subsequent to that of the IRAP picture can be always decoded normally, and a halfway playback of the encoded sequence can be implemented.

In nonpatent reference 1, as IRAP pictures, IDR (Instantaneous Decoding Refresh) pictures, CRA (Clean Random Access) pictures and BLA (Broken Link Access) pictures are defined. At the time of random access from an IRAP picture, in the case of an IDR picture, normal decoding of a picture whose position in the decoding order is subsequent to that of the IDR picture is guaranteed, and in the case of a CRA picture and a BLA picture, normal decoding of a picture whose position in the decoding order and also in the display order are subsequent to that of any of the CRA picture and the BLA picture is guaranteed. In addition, a picture whose position in the display order is subsequent to that of an IRAP picture is surely subsequent to that of the IRAP picture in the decoding order so that pictures subsequent to the IRAP picture in the display order can be played back at the time of random access from the IRAP picture. More specifically, it is common that also for any IRAP picture, pictures subsequent to the IRAP picture in the display order can be normally decoded.

Further, also in nonpatent reference 2, the same random access function is provided. However, in nonpatent reference 2, only IDR pictures are defined as pictures for random access.

RELATED ART DOCUMENT

Nonpatent Reference

Nonpatent reference 1: ISO/IEC 23008-2/ITU-T H.265
Nonpatent reference 2: ISO/IEC 14496-10/ITU-T H.264

SUMMARY OF THE INVENTION

Problems to be Solved by the Invention

Because the conventional image encoding device is configured as above, by starting the decoding from a specific picture even from some midpoint of an encoded bitstream, random access which makes it possible to normally decode pictures subsequent to the picture in the display order can be implemented. However, as shown in FIG. 32, when the random access intervals (IRAP picture intervals) are short, the percentage of inter pictures usable for the motion-compensated prediction decreases and the coding efficiency degrades. On the other hand, when the percentage of inter pictures is increased in order to improve the coding efficiency, the random access intervals become long with the increase. A problem is that there is a trade-off relation between the coding efficiency and the random access intervals, as mentioned above, and it is difficult to improve the prediction efficiency while keeping the random access intervals shortened.

The present invention is made in order to solve the above-mentioned problems, and it is therefore an object of the present invention to provide an image encoding device, an image decoding device, an encoded stream conversion device, an image encoding method, and an image decoding method capable of improving the coding efficiency while maintaining the random access intervals.

Means for Solving the Problem

According to the present invention, there is provided an image encoding device that includes a block partitioner to partition an inputted image into blocks which are units for encoding process and a coding mode determiner to determine a coding mode for each of the blocks after being partitioned by the block partitioner, and that performs an encoding process on each of the blocks after being partitioned by the block partitioner according to the coding mode determined by the coding mode determiner, and outputs compressed data about the block, the image encoding device including: a prediction image generator to generate a prediction image of each of the blocks after being partitioned by the block partitioner; an image compressor to compress a difference image between each of the blocks after being partitioned by the block partitioner and the prediction image generated by the prediction image generator and output compressed data about the difference image; a local decoded image generator to decompress the difference image compressed by the image compressor and add the difference image decompressed thereby and the prediction image generated by the prediction image generator, to generate a local decoded image; a filtering processor to perform a filtering process on the local decoded image generated by the local decoded image generator; and an encoder to encode the compressed data outputted from the image compressor and the coding mode determined by the coding mode determiner, to generate a bitstream into which encoded data about the compressed data and encoded data about the coding mode are multiplexed, in which when a randomly-accessible inter picture is encoded, the prediction image generator sets, as a reference picture, only another randomly-accessible intra picture whose position in encoding order is preceding and the nearest to that of the randomly-accessible inter picture, and performs a motion-compensated prediction using the set reference picture for a prediction process, and the encoder encodes identification information showing that the randomly-accessible inter picture is randomly accessible, and multiplexes encoded data about the identification information into the bitstream.

According to the present invention, there is provided an image decoding device that inputs a bitstream in which an image is compression-encoded on a per block basis, and generates a decoded image, the image decoding device including: a decoder to decode compressed data and a coding mode which are associated with each of blocks from the bitstream; a prediction image generator to refer to an already-decoded pixel according to the coding mode decoded by the decoder to generate a prediction image for each of the blocks; a decoded image generator to add a difference image generated by decompressing the compressed data decoded by the decoder and the prediction image generated by the prediction image generator to generate a decoded image; and a filtering processor to perform a filtering process on the decoded image generated by the decoded image generator, in which the decoder decodes identification information showing which inter picture is a randomly-accessible one, and, when a randomly-accessible inter picture identified by the identification information is decoded, the prediction image generator sets, as a reference picture, only another randomly-accessible intra picture whose position in decoding order is preceding and the nearest to that of the randomly-accessible inter picture, and performs a motion-compensated prediction using the set reference picture for a prediction process.

According to the present invention, there is provided an encoded stream conversion device that inputs a bitstream in which an image is compression-encoded on a per block basis, and outputs a re-encoded bitstream, the encoded stream conversion device including: an image decoder to decode the bitstream to generate a decoded image, and also specify randomly-accessible intra pictures; a re-encoding setter to set a re-encoding target intra picture which is to be re-encoded to a randomly-accessible inter picture from among the specified randomly-accessible intra pictures; a re-encoder to re-encode the re-encoding target intra picture; and a bitstream combiner to combine the bitstream and the re-encoding target intra picture which is re-encoded by the re-encoder, and output a re-encoded bitstream, in which the re-encoder encodes identification information showing that the picture which is re-encoded to the randomly-accessible inter picture is randomly accessible, and multiplexes encoded data about the identification information into the re-encoded bitstream.

According to the present invention, there is provided an image encoding method of, when in a block partitioner, partitioning an inputted image into blocks which are units for encoding process and, in a coding mode determiner, determining a coding mode for each of the blocks after being partitioned by the block partitioner, performing an encoding process on each of the blocks after being partitioned by the block partitioner according to the coding mode and outputting compressed data about the block, the image encoding method including the steps of: in a prediction image generator, generating a prediction image of each of the blocks after being partitioned by the block partitioner; in an image compressor, compressing a difference image between each of the blocks after being partitioned by the block partitioner and the prediction image generated by the prediction image generator and outputting compressed data about the difference image; in a local decoded image generator, decompressing the difference image compressed by the image compressor and adding the difference image decompressed thereby and the prediction image generated by the prediction image generator, to generate a local decoded image; in a filtering processor, performing a filtering process on the local decoded image generated by the local decoded image generator; and in an encoder, encoding the compressed data outputted from the image compressor and the coding mode determined by the coding mode determiner, to generate a bitstream into which encoded data about the compressed data and encoded data about the coding mode are multiplexed, in which when a randomly-accessible inter picture is encoded, the prediction image generator sets, as a reference picture, only another randomly-accessible intra picture whose position in encoding order is preceding and the nearest to that of the randomly-accessible inter picture, and performs a motion-compensated prediction using the set reference picture for a prediction process, and the encoder encodes identification information showing that the randomly-accessible inter picture is randomly accessible, and multiplexes encoded data about the identification information into the bitstream.

According to the present invention, there is provided an image decoding method of inputting a bitstream in which an image is compression-encoded on a per block basis, and generating a decoded image, the image decoding method including the steps of: in a decoder, decoding compressed data and a coding mode which are associated with each of blocks from the bitstream; in a prediction image generator, referring to an already-decoded pixel according to the coding mode decoded by the decoder to generate a prediction image for each of the blocks; in a decoded image generator, adding a difference image generated by decompressing the compressed data decoded by said decoder and the prediction image generated by the prediction image generator to generate a decoded image; and in a filtering processor, performing a filtering process on the decoded image generated by the decoded image generator, in which the decoder decodes identification information showing which inter picture is a randomly-accessible one, and, when a randomly-accessible inter picture identified by the identification information is decoded, the prediction image generator sets, as a reference picture, only another randomly-accessible intra picture whose position in decoding order is preceding and the nearest to that of the randomly-accessible inter picture, and performs a motion-compensated prediction using the set reference picture for a prediction process.

Advantages of the Invention

Because the image encoding device according to the present invention is configured in such a way that when a randomly-accessible inter picture is encoded, a prediction image generator sets a reference picture from among a plurality of randomly-accessible intra pictures, and performs a motion-compensated prediction using the set reference picture for a prediction process, and an encoder encodes both picture position information showing the position of the reference picture, and identification information showing that the randomly-accessible inter picture is randomly accessible, and multiplexes encoded data about both the picture position information and the identification information into the bitstream, there is provided an advantage of being able to carry out random access also in inter pictures, and improve the coding efficiency while maintaining the random access intervals.

Further, because the other image encoding device and the image encoding method according to the present invention are configured in such a way that when a randomly-accessible inter picture is encoded, a prediction image generator sets, as a reference picture, another randomly-accessible intra picture whose position in encoding order is preceding and the nearest to that in the encoding order of the randomly-accessible inter picture, and performs a motion-compensated prediction using the set reference picture for a prediction process, and an encoder encodes identification information showing that the randomly-accessible inter picture is randomly accessible, and multiplexes encoded data about the identification information into the bitstream, there is provided an advantage of eliminating the need for information identifying an intra picture which is to be referred to by a randomly-accessible inter picture, and being able to reduce the code amount of information to be encoded.

Further, because the image decoding device and the image decoding method according to the present invention are configured in such a way that a decoder decodes identification information showing which inter picture is a randomly-accessible one and also decodes picture position information showing the position of a reference picture which is to be referred to when generating a prediction image of the randomly-accessible inter picture, and, when a randomly-accessible inter picture identified by the identification information is decoded, a prediction image generator sets, as a reference picture, a picture shown by the picture position information from among a plurality of randomly-accessible intra pictures, and performs a motion-compensated prediction using the set reference picture for a prediction process, there is provided an advantage of being able to normally decode the encoded bitstream including inter pictures which are randomly accessible.

Further, because the encoded stream conversion device according to the present invention is configured in such a way that the re-encoder encodes the identification information showing that a picture which is re-encoded to a randomly-accessible inter picture is randomly accessible, and multiplexes encoded data about the identification information into the re-encoded bitstream, there is provided an advantage of being able to generate an encoded bitstream having a smaller amount of code than that of an encoded bitstream generated by an image encoding device or the like.

BRIEF DESCRIPTION OF THE FIGURES

FIG. 21 is an explanatory drawing showing a transformation block size at the time of performing a compression process on the luminance signal and the color difference signals in a signal in the YUV4:2:4 format;

FIG. 22 is an explanatory drawing showing an example of a correspondence between an intra prediction parameter and a color difference intra prediction mode of the color difference signals;

FIG. 23 is an explanatory drawing showing an example of the correspondence between the intra prediction parameter and the color difference intra prediction mode of the color difference signals when not using an LM mode;

FIG. 26 is an explanatory drawing showing a prediction direction vector for the directional prediction in a signal in the YUV4:2:2 format;

FIG. 27 is an explanatory drawing showing a relation between the directional prediction and an angle;

FIG. 28 is an explanatory drawing showing a relation between an intra prediction mode index of the luminance signal and an intra prediction mode index of the color difference signals in a signal in the YUV4:2:2 format;

FIG. 29 is an explanatory drawing showing a relation between the intra prediction mode index and tang;

EMBODIMENTS OF THE INVENTION

Embodiment 1

Figure 1:
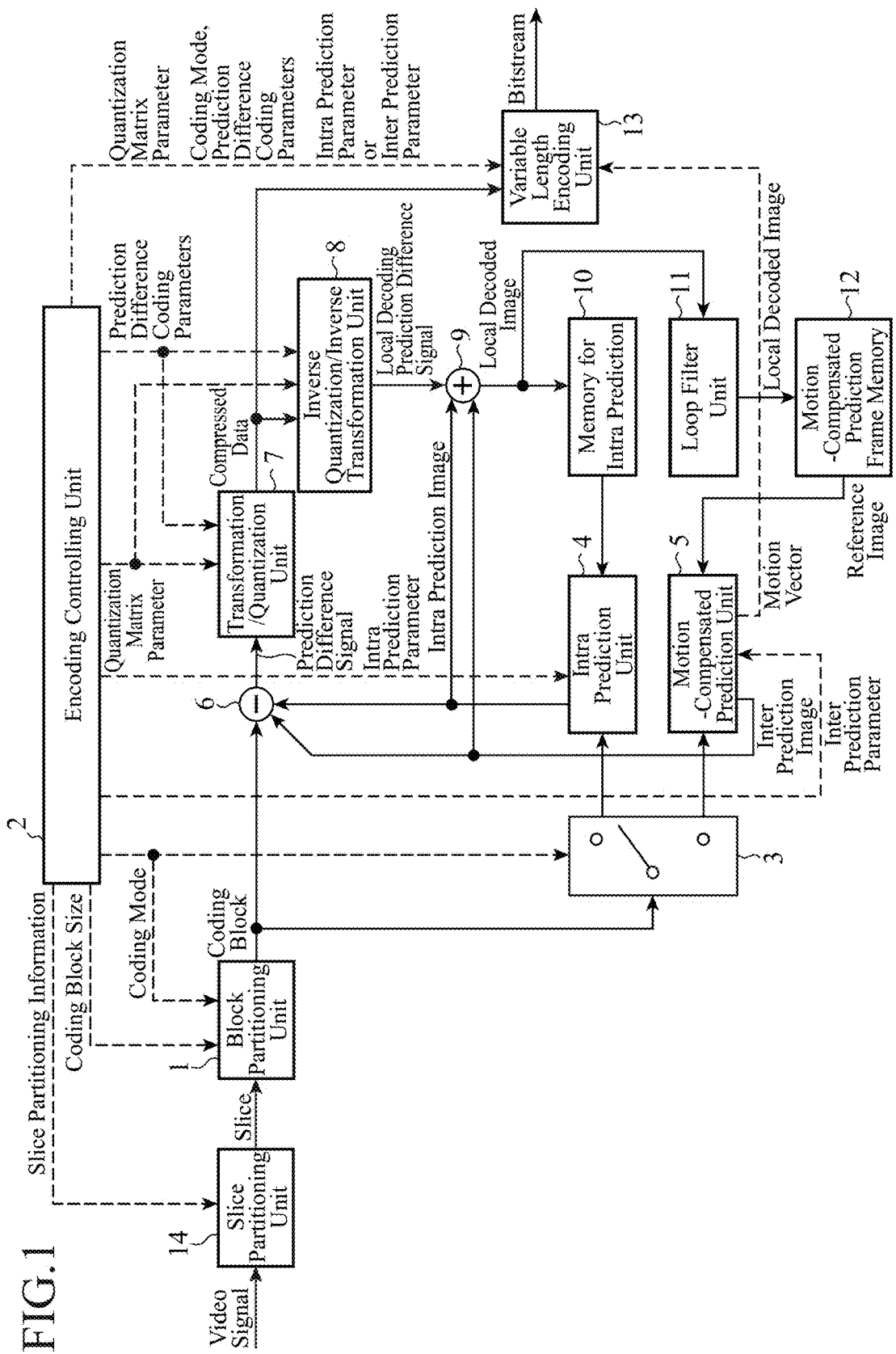
FIG. 1 is a block diagram showing an image encoding device according to Embodiment 1 of the present invention.

FIG. 1 is a block diagram showing an image encoding device according to Embodiment 1 of the present invention. The feature of the present invention is that the image encoding device enables random access also in inter pictures by mainly using a motion-compensated prediction unit 5, a motion-compensated prediction frame memory 12 and a variable length encoding unit 13 in the configuration shown in FIG. 1. In this embodiment, a block partitioning unit 1 and a slice partitioning unit 14 construct a block partitioner described in Claims, an encoding controlling unit 2 constructs a coding mode determiner, and a select switch 3, an intra prediction unit 4 and the motion-compensated prediction unit 5 construct a prediction image generator.

Further, a subtracting unit 6 constructs a difference image generator, a transformation/quantization unit 7 constructs an image compressor, and an inverse quantization/inverse transformation unit 8 and an adding unit 9 construct a local decoded image generator.

In addition, a loop filter unit 11 constructs a filtering processor and the variable length encoding unit 13 constructs an encoder.

A video signal to be processed by the image encoding device according to this Embodiment 1 is an arbitrary video signal in which each video frame consists of a series of digital samples (pixels) in two dimensions, horizontal and vertical, including a color video signal in arbitrary color space, such as a YUV signal which consists of a luminance signal and two color difference signals and an RGB signal outputted from a digital image sensor, a monochrome image signal, an infrared image signal, and so on.

The gradation of each pixel can be an 8-bit, 10-bit, or 12-bit one.

As a matter of course, the input signal can be a still image signal, instead of a video signal, because the still image signal can be assumed to be a video signal which consists of only a single frame.

In the following explanation, for the sake of convenience, the inputted video signal is assumed to be, unless otherwise specified, a signal having a YUV4:2:0 format in which the two color difference components U and V are subsampled by a factor of two both in the vertical and horizontal directions with respect to the luminance component Y, a signal having a YUV4:2:2 format in which the two color difference components U and V are subsampled by a factor of two in the horizontal direction with respect to the luminance component Y, or a signal having a YUV4:4:4 format in which the two color difference components U and V have the same number of samples as the luminance component Y. Further, as to a signal having an RGB4:4:4 format which consists of trichromatic signals of red (R), green (G) and blue (B), each of the signals is assumed to be a signal having the YUV4:4:4 format, and the same encoding as that on the YUV4:4:4 format is performed on the signal. However, how each signal (RGB) having the RGB4:4:4 format is brought into correspondence with each signal (YUV) having the YUV4:4:4 format is not limited (can be set arbitrarily). Further, in the case of a YUV4:4:4 format signal or an RGB4:4:4 format signal, each signal can be assumed to be a monochrome image signal, and monochrome (YUV4:0:0) encoding can be performed independently on each signal to generate a bitstream. By doing in this way, the encoding process can be performed on the signals in parallel.

A data unit to be processed which corresponds to each frame of the video is referred to as a "picture", and an explanation will be made in this Embodiment 1 by assuming that a "picture" is a signal of an image frame on which progressive scanning is performed. However, when the video signal is an interlaced signal, a "picture" can be a field image signal which is a unit which constructs an image frame.

Referring to FIG. 1, the slice partitioning unit 14 performs a process of, when receiving a video signal as an inputted image, partitioning the inputted image into one or more part images, which are called "slices", according to slice partitioning information determined by the encoding controlling unit 2. Each slice partitioned can be partitioned into up to coding blocks which will be mentioned below.

The block partitioning unit 1 carries out a process of, every time when receiving a slice partitioned by the slice partitioning unit 14, partitioning the slice into largest coding blocks each of which is a coding block having a largest size determined by the encoding controlling unit 2, and further partitioning each of the largest coding blocks into coding blocks hierarchically until the number of hierarchical layers reaches an upper limit determined by the encoding controlling unit 2.

More specifically, the block partitioning unit 1 performs a process of partitioning the slice into coding blocks according to partition determined by the encoding controlling unit 2, and outputting the coding blocks. Each of the coding blocks is further partitioned into one or more prediction blocks each of which serves as a unit for prediction process.

The encoding controlling unit 2 performs a process of determining the largest size of the coding blocks serving as units to be processed when an encoding process is performed, and also determining the size of each coding block by determining the upper limit on the number of hierarchical layers at the time when each coding block having the largest size is hierarchically partitioned.

The encoding controlling unit 2 also performs a process of selecting a coding mode which is applied to a coding block outputted from the block partitioning unit 1, from among one or more selectable coding modes (one or more intra coding modes in which the size or the like of a prediction block which represents a unit for prediction process differs and one or more inter coding modes in which the size or the like of a prediction block differs). As an example of a selecting method, there is a method of selecting a coding mode which provides the highest degree of coding efficiency for a coding block outputted from the block partitioning unit 1, from among the one or more selectable coding modes.

The encoding controlling unit 2 also performs a process of, when a coding mode having the highest degree of coding efficiency is an intra coding mode, determining an intra prediction parameter to be used when performing an intra prediction process on a coding block in the intra coding mode, for each prediction block which is a unit for prediction process shown by the above-described intra coding mode, and, when the coding mode having the highest degree of coding efficiency is an inter coding mode, determining an inter prediction parameter to be used when performing an inter prediction process on a coding block in the inter coding mode, for each prediction block which is a unit for prediction process shown by the above-described inter coding mode.

The encoding controlling unit 2 further performs a process of determining prediction difference coding parameters to be provided to a transformation/quantization unit 7 and an inverse quantization/inverse transformation unit 8. The prediction difference coding parameters include transformation block partitioning information showing partitioning information about transformation blocks each serving as a unit for orthogonal transformation process on a coding block and a quantization parameter defining a quantization step size at the time when performing quantization on transform coefficients, etc.

Figure 19:
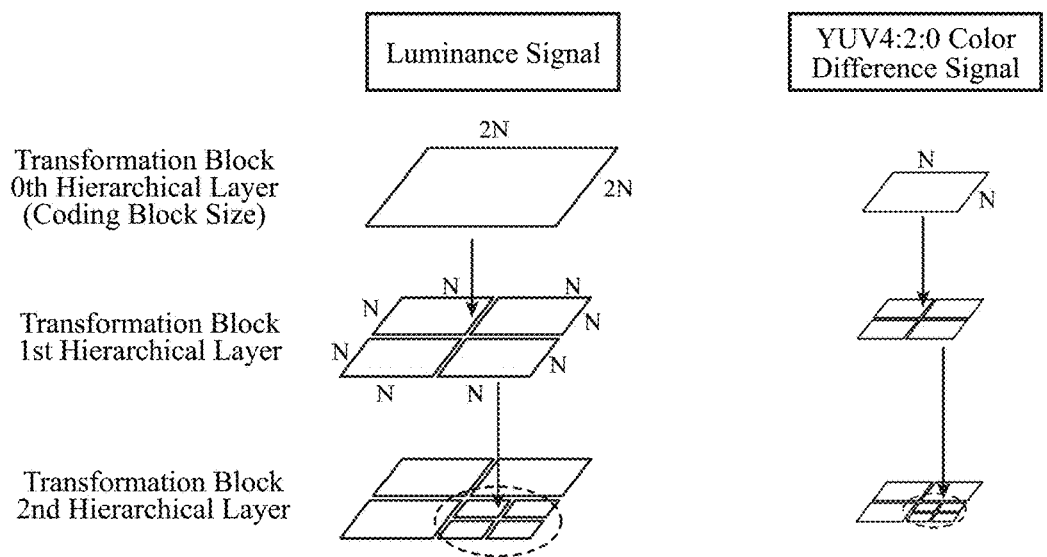
FIG. 19 is an explanatory drawing showing a transformation block size at the time of performing a compression process on the luminance signal and the color difference signals in a signal in the YUV4:2:0 format.

FIG. 19 is an explanatory drawing showing transformation block sizes at the time of performing a compression process (a transformation process and a quantization process) on the luminance signal and the color difference signals in a signal having the YUV4:2:0 format.

The transformation block sizes are determined by hierarchically partitioning each coding block into blocks in quadtree form, as shown in FIG. 19.

For example, by determining whether or not to partition each transformation block on the basis of the code amount in the case of partitioning the transformation block, the code amount in the case of not partitioning the transformation block, and an evaluation criterion which takes into consideration coding errors, etc. in such a way that an evaluated value is minimized, an optimal partitioned shape of the transformation block can be determined from the viewpoint of a trade-off between the code amount and the coding errors.

The luminance signal is configured in such a way that each coding block is hierarchically partitioned into one or more square transformation blocks, as shown in, for example, FIG. 19.

The color difference signals are configured in such a way that when the input signal format is the YUV4:2:0 signal format, each coding block is hierarchically partitioned into one or more square transformation blocks, as shown in FIG. 19, like the luminance signal.

In this case, the transformation block size of each of the color difference signals is half of that of the corresponding luminance signal both in the vertical and horizontal directions.

Figure 20:
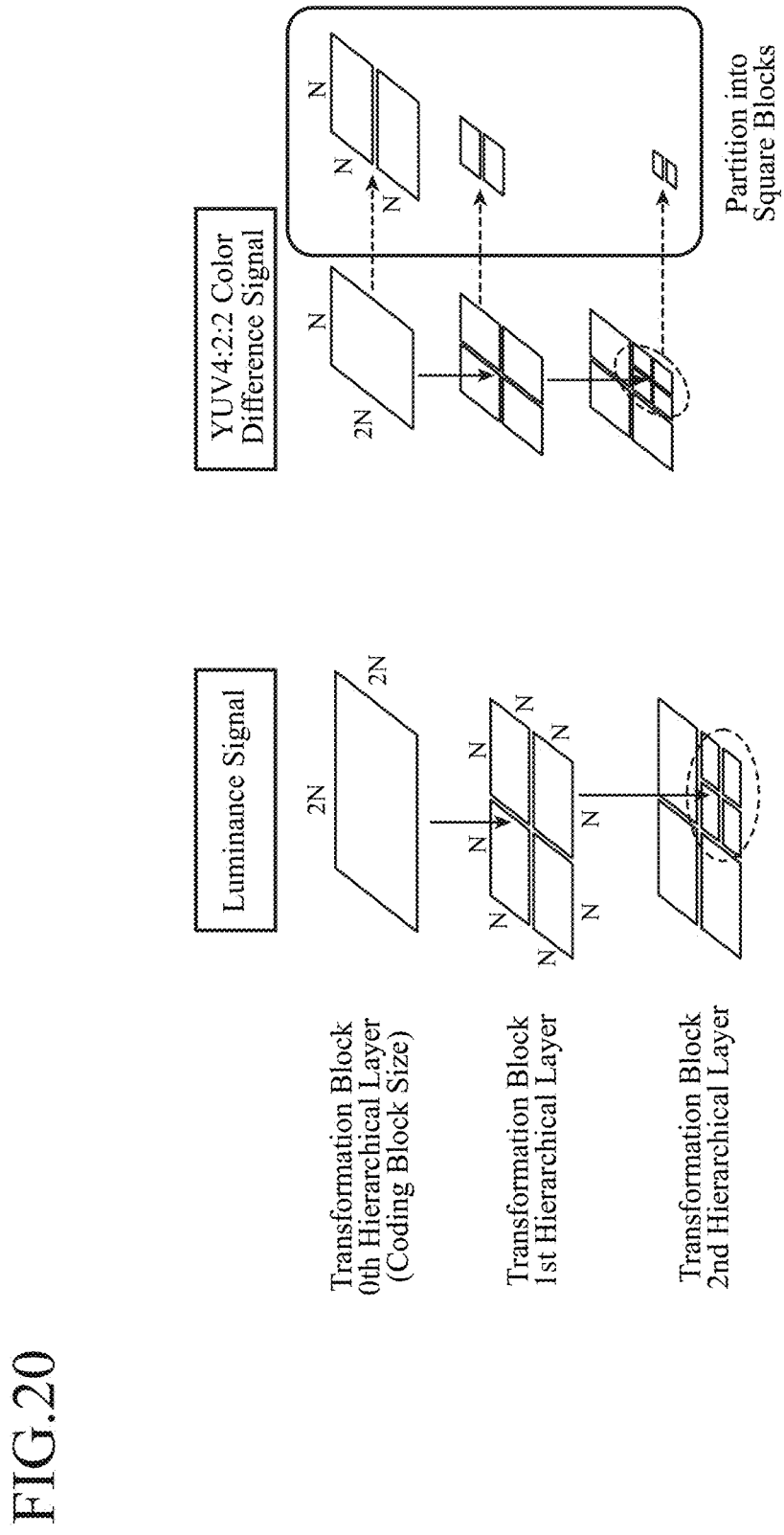
FIG. 20 is an explanatory drawing showing a transformation block size at the time of performing a compression process on the luminance signal and the color difference signals in a signal in the YUV4:2:2 format.

As shown in FIG. 20, when the input signal format is the YUV4:2:2 signal format, the same hierarchical partitioning into blocks in quadtree form as that on the luminance signal is performed. Further, because the shape of each partitioned block is a rectangle in which the number of pixels in the vertical direction is twice as large as the number of pixels in the horizontal direction, by further partitioning each partitioned block into two blocks in the vertical direction, each partitioned block is made to consist of two transformation blocks having the same block size as that of the color difference signals in a YUV4:2:0 signal (a size which is half of the size both in the vertical and horizontal directions of each transformation block of the luminance signal).

Further, when the input signal format is the YUV4:4:4 signal format, as shown in FIG. 21, the same partitioning as that on the transformation blocks of the luminance signal is always performed on the transformation blocks of the color difference signals in such a way that the transformation blocks are configured to have the same size.

Information about the partitioning of the luminance signal into the transformation blocks is outputted to the variable length encoding unit 13 as, for example, a transformation block partitioning flag showing whether or not to perform partitioning for each hierarchical layer.

The select switch 3 performs a process of, when the coding mode determined by the encoding controlling unit 2 is an intra coding mode, outputting the coding block outputted from the block partitioning unit 1 to the intra prediction unit 4, and, when the coding mode determined by the encoding controlling unit 2 is an inter coding mode, outputting the coding block outputted from the block partitioning unit 1 to the motion-compensated prediction unit 5.

The intra prediction unit 4 performs, when an intra coding mode is selected, as the coding mode associated with the coding block outputted from the select switch 3, by the encoding controlling unit 2, an intra prediction process (intra-frame prediction process) using the intra prediction parameter determined by the encoding controlling unit 2 while referring to a local decoded image stored in a memory 10 for intra prediction, and then performs a process of generating an intra prediction image. The intra prediction unit 4 constructs an intra predictor.

More specifically, as to the luminance signal, the intra prediction unit 4 performs the intra prediction process (intra-frame prediction process) using the intra prediction parameter of the luminance signal, and generates a prediction image of the luminance signal.

On the other hand, as to the color difference signals, when the intra prediction parameter of the color difference signals shows that the same prediction mode as the intra prediction mode for the luminance signal is used (when the intra prediction parameter shows an intra prediction mode common between the luminance and the color differences (DM mode)), the intra prediction unit performs the same intra-frame prediction as that on the luminance signal, to generate prediction images of the color difference signals.

Further, when the intra prediction parameter of the color difference signals shows the vertical prediction mode or the horizontal prediction mode, the intra prediction unit performs the directional prediction on the color difference signals to generate prediction images of the color difference signals.

Further, when the intra prediction parameter of the color difference signals shows a color difference signal prediction mode using a luminance correlation (LM mode), the intra prediction unit calculates a correlation parameter showing the correlation between the luminance signal and the color difference signals by using the luminance signals and the color difference signals of a plurality of pixels adjacent to the upper and left sides of a block for which a prediction image is to be generated, and generates prediction images of the color difference signals by using both the correlation parameter and the luminance signal associated with the block of each of the color difference signals which is the target for prediction process.

The intra prediction unit can be configured to perform the process in the above-described DM mode or the above-described LM mode and prevent itself from selecting another prediction mode when the input signal format is the YUV4:4:4 signal format.

Because there is a high correlation between the edge position of the luminance signal and those of the color difference signals in a YUV4:4:4 signal, by prohibiting the application of a prediction mode different from that applied to the luminance signal to the color difference signals, the amount of information in the intra prediction mode of the color difference signals can be reduced and the coding efficiency can be improved.

Figure 24:
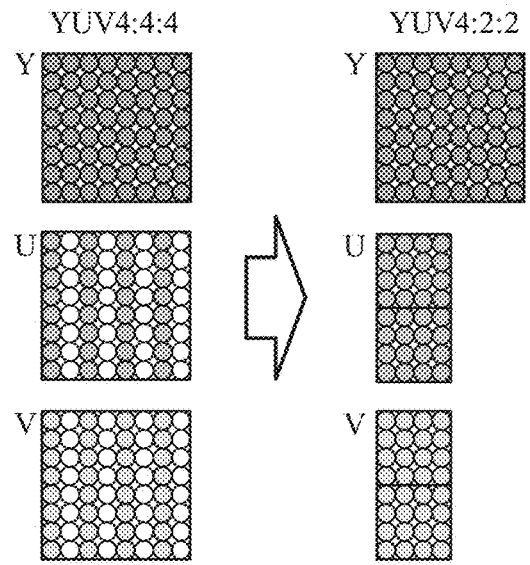
FIG. 24 is an explanatory drawing showing a relation between the YUV4:4:4 format and the YUV4:2:2 format.
Figure 25:
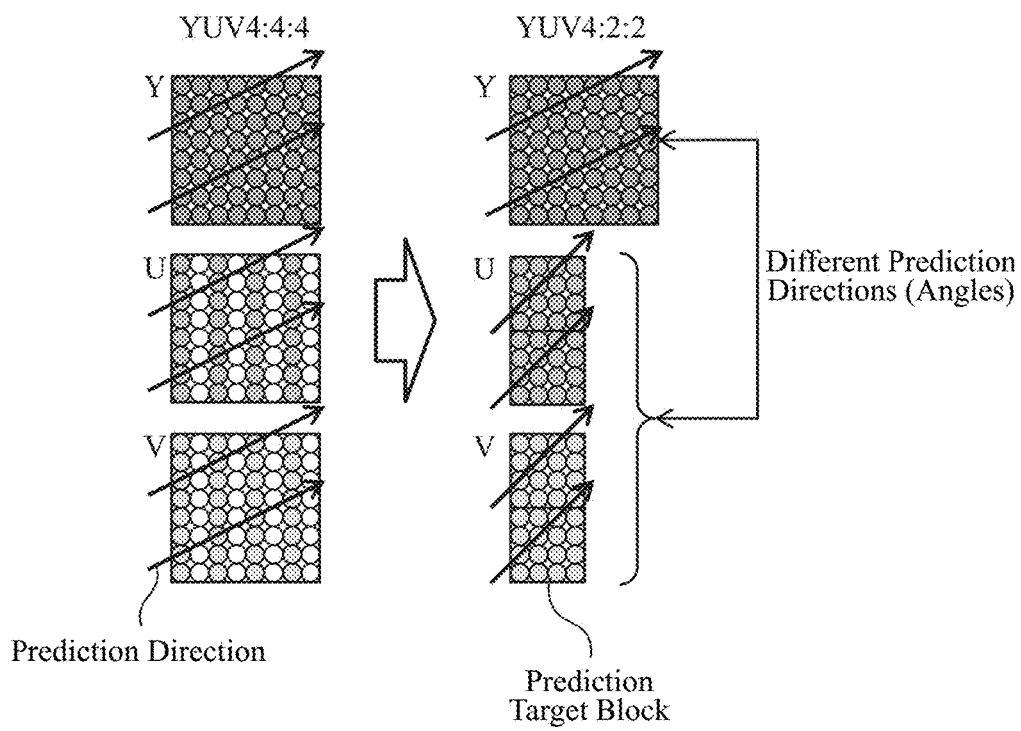
FIG. 25 is an explanatory drawing showing an example of a directional prediction in the YUV4:2:2 format which is equivalent to the use of the same directional prediction for the luminance signal and the color difference signals in a signal in the YUV4:4:4 format.

Further, when the input signal format is the YUV4:2:2 signal format, if the luminance signal is a square block, each of the color difference signals is a rectangular block in which the number of pixels in the horizontal direction is half as compared with that of the luminance signal, as shown in FIG. 24. Therefore, when the luminance signal and the color difference signals indicate a prediction in the same direction on a YUV4:4:4 signal, by converting the YUV4:4:4 signal into a YUV4:2:2 signal, the prediction direction of the color difference signals is made to differ from that of the luminance signal in the case of a directional prediction other than the vertical prediction and the horizontal prediction, as shown in FIG. 25.

Concretely, when the prediction direction vector of the luminance signal is expressed by $v_L=(dx_L, dy_L)$, the prediction direction vector of each of the color difference signals is expressed by $v_C=(dx_L/2, dy_L)$, as shown in FIG. 26. More specifically, when the angle of the prediction direction is expressed by $\theta$, it is necessary to perform a prediction in a prediction direction having a relation shown by $\tan\theta_C=2\tan\theta_L$, where the angle of the prediction direction of the luminance signal is expressed by $\theta_L$ and the angle of the prediction direction of each of the color difference signals is expressed by $\theta_C$, as shown in FIG. 27.

Therefore, in order to make it possible to normally perform the above-described DM mode in which a prediction in the same direction is performed on the luminance signal and the color difference signals, when the input signal format is the YUV4:2:2 signal format, the intra prediction unit converts an index of the intra prediction mode which is used for the luminance signal into an index of the intra prediction mode which is used for the prediction on the color difference signals, and performs the prediction process on the color difference signals according to the intra prediction mode corresponding to the converted index. Concretely, a conversion table for the index can be prepared and the intra prediction unit can be configured to convert the index by referring to the conversion table, or a conversion equation can be prepared in advance and the intra prediction unit can be configured to convert the index according to the conversion equation.

Because the intra prediction unit is configured in this way, the intra prediction unit can perform an appropriate prediction on the color difference signals according to the YUV4:2:2 signal format only by performing the conversion of the index without changing the directional prediction process itself.

When an inter coding mode is selected, as the coding mode associated with the coding block outputted from the select switch 3, by the encoding controlling unit 2, the motion compensation unit 5 compares the coding block with one or more frames of local decoded images stored in the motion-compensated prediction frame memory 12 to search for a motion vector, performs an inter prediction process (motion-compensated prediction process) by using the motion vector and the inter prediction parameter, such as a frame number to be referred to, which is determined by the encoding controlling unit 2, and performs a process of generating an inter prediction image.

The subtracting unit 6 performs a process of subtracting the intra prediction image generated by the intra prediction unit 4 or the inter prediction image generated by the motion-compensated prediction unit 5 from the coding block outputted from the block partitioning unit 1, and outputting a prediction difference signal showing a difference image which is the result of the subtraction to the transformation/quantization unit 7.

The transformation/quantization unit 7 refers to the transformation block partitioning information included in the prediction difference coding parameters determined by the encoding controlling unit 2 and performs an orthogonal transformation process (e.g., an orthogonal transformation process, such as DCT (discrete cosine transform), DST (discrete sine transform), and KL transform in which bases are designed for specific learning sequence in advance) on the prediction difference signal outputted from the subtracting unit 6 on a per transformation block basis to calculate transform coefficients, and also refers to the quantization parameter included in the prediction difference coding parameters and performs a process of quantizing the transform coefficients of each transformation block and then outputting compressed data which are the transform coefficients quantized thereby to the inverse quantization/inverse transformation unit 8 and the variable length encoding unit 13.

When quantizing the transform coefficients, the transformation/quantization unit 7 can perform a process of quantizing the transform coefficients by using a quantization matrix for scaling, for each of the transform coefficients, the quantization step size calculated from the above-described quantization parameter.

Figures 9, 10:
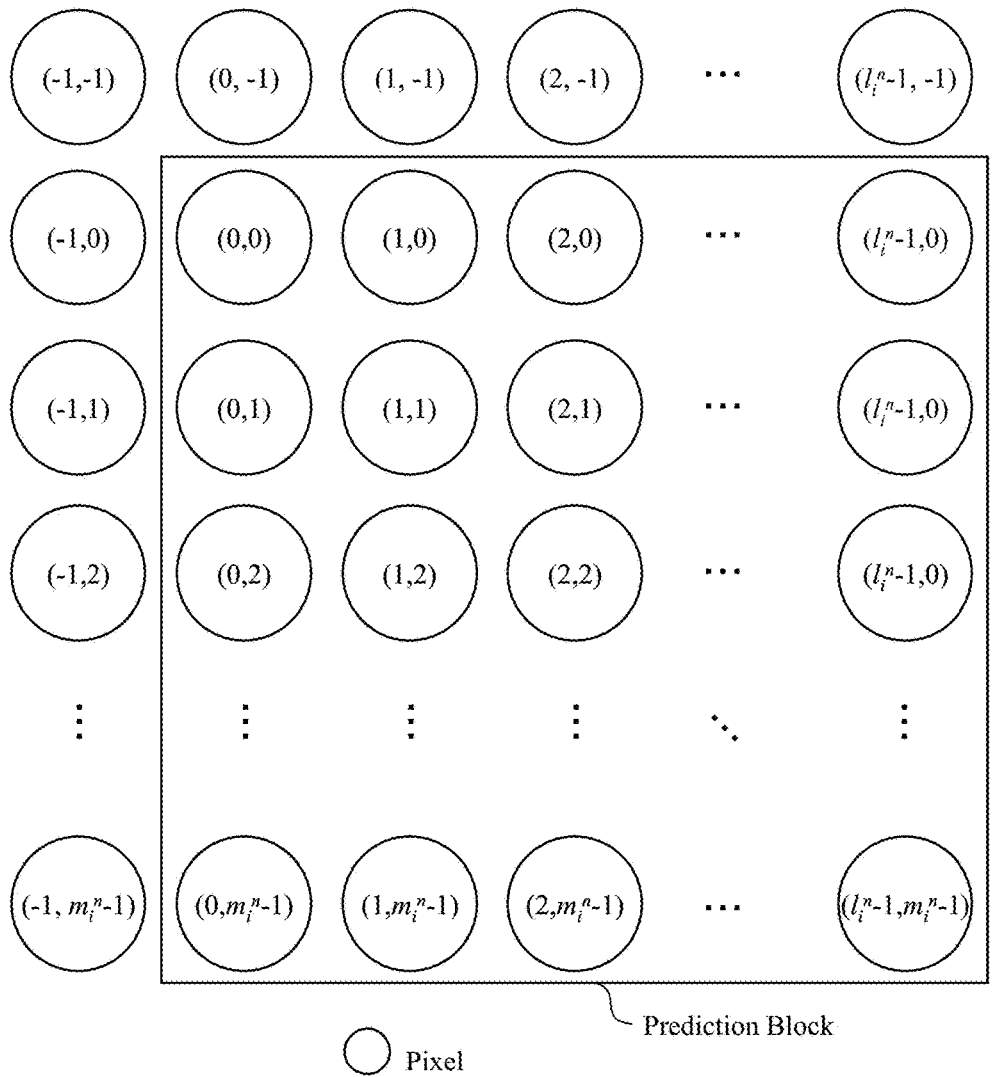
FIG. 9 is an explanatory drawing showing relative coordinates of each pixel in the prediction image generation block which are determined with the pixel at the upper left corner of the prediction image generation block being defined as the point of origin.
FIG. 10 is an explanatory drawing showing an example of a quantization matrix.

FIG. 10 is an explanatory drawing showing an example of the quantization matrix of a 4×4 DCT.

Numerals shown in the figure represent scaling values for the quantization step sizes of the transform coefficients.

For example, by performing the scaling in such a way that a transform coefficient in a higher frequency band have a larger quantization step size in order to suppress the coding bit rate, as shown in FIG. 10, transform coefficients in high frequency bands which occur in a complicated image area or the like are reduced, thereby suppressing the code amount, while the coding can be carried out without reducing information about coefficients in a low frequency band which exert a great influence upon the subjective quality.

As mentioned above, when it is desirable to control the quantization step size for each transform coefficient, what is necessary is just to use a quantization matrix.

Further, as the quantization matrix, a matrix which is independent for each chrominance signal and for each coding mode (intra coding or inter coding) at each orthogonal transformation size can be used, and either the selection of a quantization matrix from a quantization matrix which is prepared, as an initial value, in advance and in common between the image encoding device and the image decoding device and an already-encoded quantization matrix or the use of a new quantization matrix can be selected.

Thus, the transformation/quantization unit 7 sets, to a quantization matrix parameter to be encoded, flag information showing whether or not to use a new quantization matrix for each chrominance signal and for each coding mode at each orthogonal transformation size.

In addition, when anew quantization matrix is used, each of the scaling values in a quantization matrix as shown in FIG. 10 is set as a quantization matrix parameter to be encoded.

In contrast, when a new quantization matrix is not used, an index specifying a matrix to be used from a quantization matrix which is prepared, as an initial value, in advance and in common between the image encoding device and the image decoding device and an already-encoded quantization matrix is set to the quantization matrix parameter to be encoded. However, when no already-encoded quantization matrix which can be referred to exists, only a quantization matrix prepared in advance and in common between the image encoding device and the image decoding device can be selected.

The inverse quantization/inverse transformation unit 8 refers to the quantization parameter and the transformation block partitioning information included in the prediction difference coding parameters determined by the encoding controlling unit 2 and inverse-quantizes the compressed data outputted from the transformation/quantization unit 7 on a per transformation block, and also performs an inverse orthogonal transformation process on the transform coefficients which are the compressed data inverse-quantized thereby and performs a process of calculating a local decoding prediction difference signal corresponding to the prediction difference signal outputted from the subtracting unit 6. When the transformation/quantization unit 7 performs a quantization process by using a quantization matrix, the quantization matrix is referred to and a corresponding inverse quantization process is performed also in the inverse quantization process.

The adding unit 9 performs a process of adding the local decoding prediction difference signal calculated by the inverse quantization/inverse transformation unit 8 and the intra prediction image generated by the intra prediction unit 4 or the inter prediction image generated by the motion-compensated prediction unit 5, to calculate a local decoded image corresponding to the coding block outputted from the block partitioning unit 1.

The memory 10 for intra prediction is a recording medium that stores the local decoded image calculated by the adding unit 9.

The loop filter unit 11 performs a predetermined filtering process on the local decoded image calculated by the adding unit 9, and performs a process of outputting the local decoded image filtering-processed thereby.

Concretely, the loop filter unit performs a filtering (deblocking filtering) process of reducing a distortion occurring at a boundary between transformation blocks and a distortion occurring at a boundary between prediction blocks, a process (pixel adaptive offset process) of adaptively adding an offset on a per pixel basis, an adaptive filtering process of adaptively switching among linear filters, such as Wiener filters, and performing a filtering process, and so on.

Figure 11:
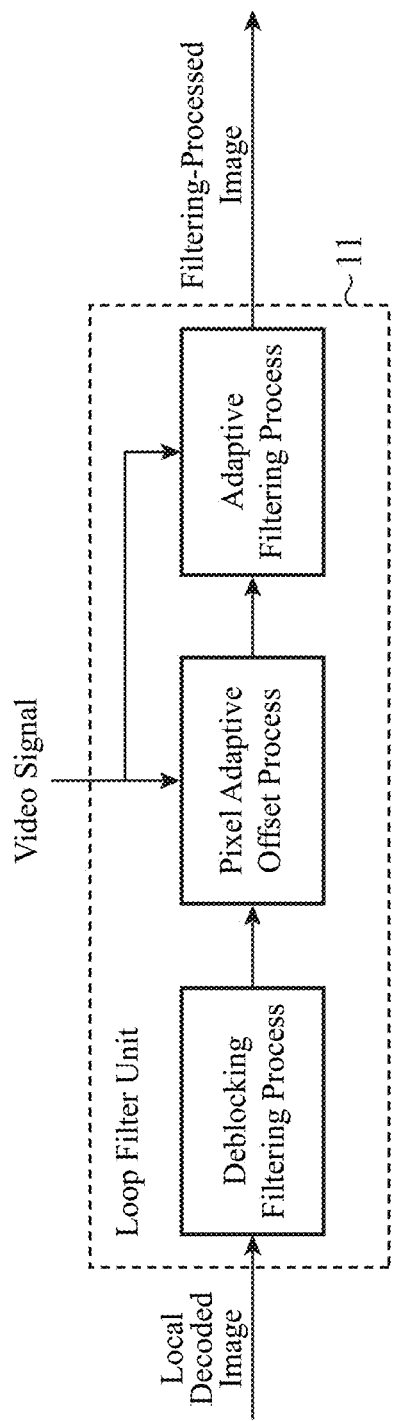
FIG. 11 is an explanatory drawing showing an example of a configuration of using a plurality of loop filtering processes in a loop filter unit of the image encoding device according to Embodiment 1 of the present invention.

The loop filter unit 11 determines whether or not to perform the process for each of the above-described processes including the deblocking filtering process, the pixel adaptive offset process, and the adaptive filtering process, and outputs an enable flag of each of the processes, as header information, to the variable length encoding unit 13. When a plurality of filtering processes as described above are used, the filtering processes are performed sequentially. FIG. 11 shows an example of the configuration of the loop filter unit 11 in the case of using a plurality of filtering processes.

In general, as the number of types of filtering processes to be used increases, the image quality improves while the processing load increases. More specifically, there is a trade-off between the image quality and the processing load. Also, the image quality improving effect of each filtering process differs depending upon the characteristics of the image which is the target for filtering process. Thus, the filtering process to be used can be determined according to the processing load acceptable to the image encoding device and the characteristics of the image on which the encoding process is to be performed. For example, when there is a demand to reduce the frequency with which the process cannot be performed rather than to provide the configuration shown in FIG. 11, there can be considered an example in which the loop filter unit is configured with only the deblocking filtering process and the pixel adaptive offset process.

In the deblocking filtering process, various parameters to be used for selecting the intensity of the filter applied to a block boundary can be changed from initial values. When changing a parameter, the parameter is outputted to the variable length encoding unit 13 as header information.

In the pixel adaptive offset process, an image is partitioned into a plurality of blocks first. A case of not performing the offset process is defined as one class classifying method, and one class classifying method is selected, for each of the blocks, from among a plurality of class classifying methods which are prepared in advance.

Next, by using the selected class classifying method, each pixel included in the block is classified into one of classes, and an offset value for compensating for a coding distortion is calculated for each of the classes.

Finally, a process of adding the offset to the luminance value of the local decoded image is performed, thereby improving the image quality of the local decoded image.

Therefore, in the pixel adaptive offset process, the block partitioning information, an index indicating the class classifying method selected for each block, and offset information specifying the offset value calculated for each class on a per block basis are outputted to the variable length encoding unit 13 as header information.

In the pixel adaptive offset process, for example, the image can be always partitioned into blocks each having a fixed size, such as largest coding blocks, and a class classifying method can be selected for each of the blocks and the adaptive offset process for each class can be carried out. In this case, the need for the above-described block partitioning information can be eliminated, the code amount can be reduced by the code amount required for the block partitioning information, and the coding efficiency can be improved.

In the adaptive filtering process, the local decoded image is class classified by using a predetermined method, a filter for compensating for a distortion piggybacked thereonto is designed for a region (local decoded image) belonging to each of classes, and a filtering process is performed on the local decoded image by using the filter.

The filter designed for each class is then outputted to the variable length encoding unit 13 as header information.

As to the class classifying method, there are a simplified method of spatially separating the image at equal intervals, and a method of making a classification on a per block basis according to the local characteristics (variance, etc.) of the image.

Further, the number of classes used in the adaptive filtering process can be set in advance as a value common between the image encoding device and the image decoding device, or can be a parameter to be encoded.

In comparison with the former, the latter can freely set the number of classes to be used, thereby increasing the image quality improving effect. On the other hand, since the latter encodes the number of classes, the code amount increases by an amount needed for the encoding.

Because the video signal needs to be referred to by the loop filter unit 11, as shown in FIG. 11, when performing the pixel adaptive offset process and the adaptive filtering process, the image encoding device shown in FIG. 1 needs to be modified in such a way that the video signal is inputted to the loop filter unit 11.

The motion-compensated prediction frame memory 12 is a recording medium that stores the local decoded image on which the filtering process is carried out by the loop filter unit 11.

The variable length encoding unit 13 variable-length-encodes the compressed data outputted from the transformation/quantization unit 7, the output signal from the encoding controlling unit 2 (the block partitioning information about the inside of each largest coding block, the coding mode, the prediction difference coding parameters, and the intra prediction parameter or the inter prediction parameter), and the motion vector outputted from the motion-compensated prediction unit 5 (when the coding mode is an inter coding mode), to generate encoded data.

Figures 13, 14:
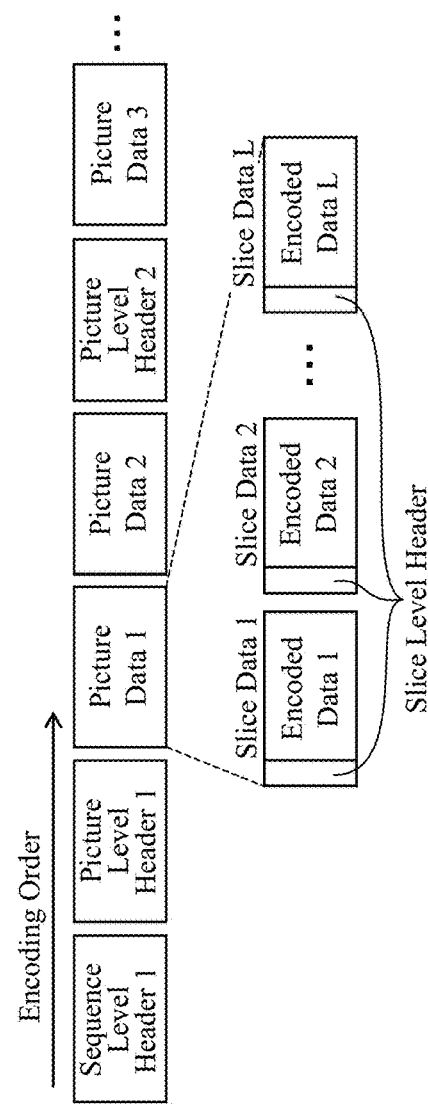
FIG. 13 is an explanatory drawing showing an example of an encoded bitstream.
FIG. 14 is an explanatory drawing showing indexes indicating class classifying methods for use in the pixel adaptive offset process.

The variable length encoding unit 13 also encodes sequence level headers and picture level headers as header information of an encoded bitstream, as illustrated in FIG. 13, and generates an encoded bitstream as well as picture data.

The picture data is configured with one or more pieces of slice data, and each slice data is acquired by aggregating the slice level header and the above-described encoded data contained in the slice.

The sequence level header is acquired by aggregating pieces of header information which are generally common on a per sequence basis and which include the image size, the chrominance signal format, the bit depth of the signal values of the luminance signal and the color difference signals, the enable flag information of each filtering process (adaptive filtering process, pixel adaptive offset process, and deblocking filtering process) in the loop filter unit 11 on a per sequence basis, and the enable flag information of the quantization matrix.

A picture level header is a combination of pieces of header information which are set on a per picture basis and which include an index of a sequence level header to be referred to, the number of reference pictures at the time of motion compensation, and a probability table initialization flag for entropy encoding, the quantization matrix parameter.

A slice level header is a combination of parameters which are set on a per slice basis and which include position information showing at which position of the picture the corresponding slice exists, an index indicating which picture level header is to be referred to, the encoding type of the slice (intra encoding, inter encoding, or the like), and the flag information showing whether or not to perform each of the filtering processes in the loop filter unit 11 (the adaptive filtering process, the pixel adaptive offset process, and the deblocking filtering process).

In nonpatent reference 1 and nonpatent reference 2, each header information and picture data are identified according to NAL units. Concretely, a sequence parameter set (corresponding to the above-mentioned sequence level header), a picture parameter header (corresponding to the above-mentioned picture level header), and slice data are defined as specific NAL unit types, respectively, and are encoded together with pieces of identification information (indexes) about the NAL unit types. Further, the above-mentioned picture data is defined as an access unit, and shows a unit of data access including the encoded data about one picture.

In nonpatent reference 1, as to a picture which is randomly accessed, the NAL unit type of the slice data in the corresponding access unit is encoded as an IRAP picture. This IRAP picture is encoded as an intra picture to be encoded only by using an intra prediction in such a way that the decoding can be carried out normally even if the decoding is started from that picture. As mentioned above, IDR pictures, CRA pictures and BLA pictures are defined as IRAP pictures.

Although the same technique is also disclosed in nonpatent reference 2, this reference differs in that only IDR pictures are defined as randomly-accessible pictures. Although an explanation will be made hereafter on the assumption that IRAP pictures shown in nonpatent reference 1 are provided, the same processing can be implemented by replacing IRAP pictures with IDR pictures also in nonpatent reference 2.

Figure 32:
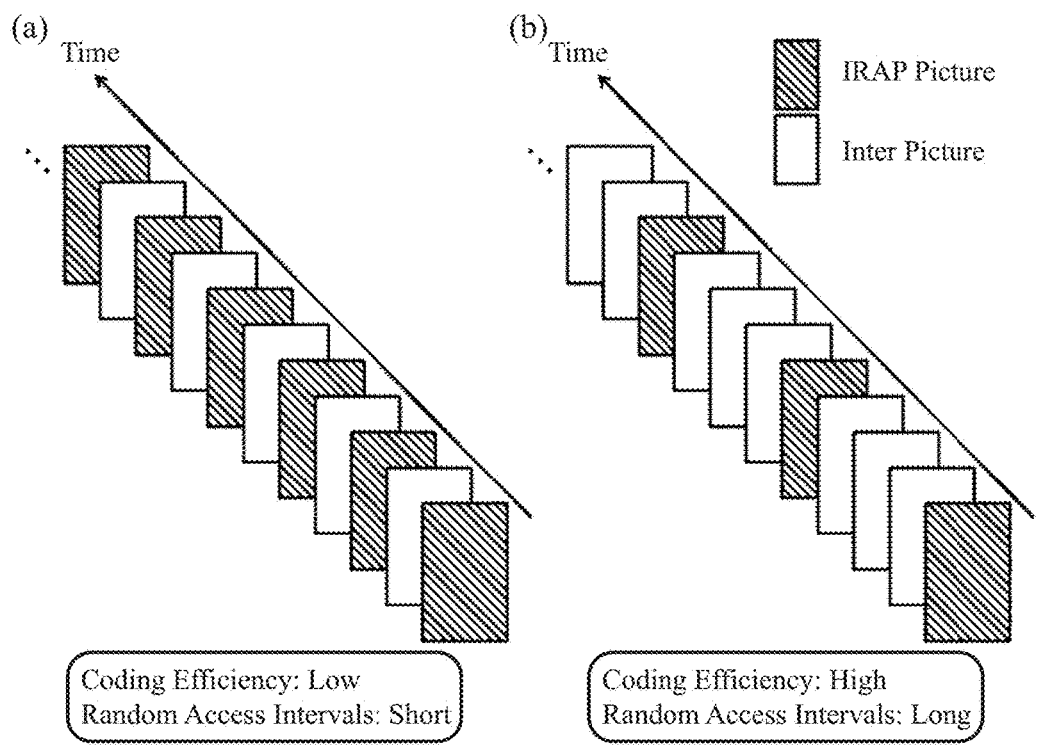
FIG. 32 is an explanatory drawing showing a trade-off relation between random access intervals and coding efficiency.

As shown in FIG. 32, in order to shorten the random access intervals, it is necessary to encode many pictures as IRAP pictures, while the number of inter pictures on which high-efficiency encoding can be carried out decreases due to motion-compensated predictions and hence the coding efficiency becomes low (FIG. 32(a)). In contrast, increase in the number of inter pictures lengthens the random access intervals (FIG. 32(b)). In order to solve this trade-off problem, randomly-accessible inter pictures are defined in this embodiment.

Figure 33:
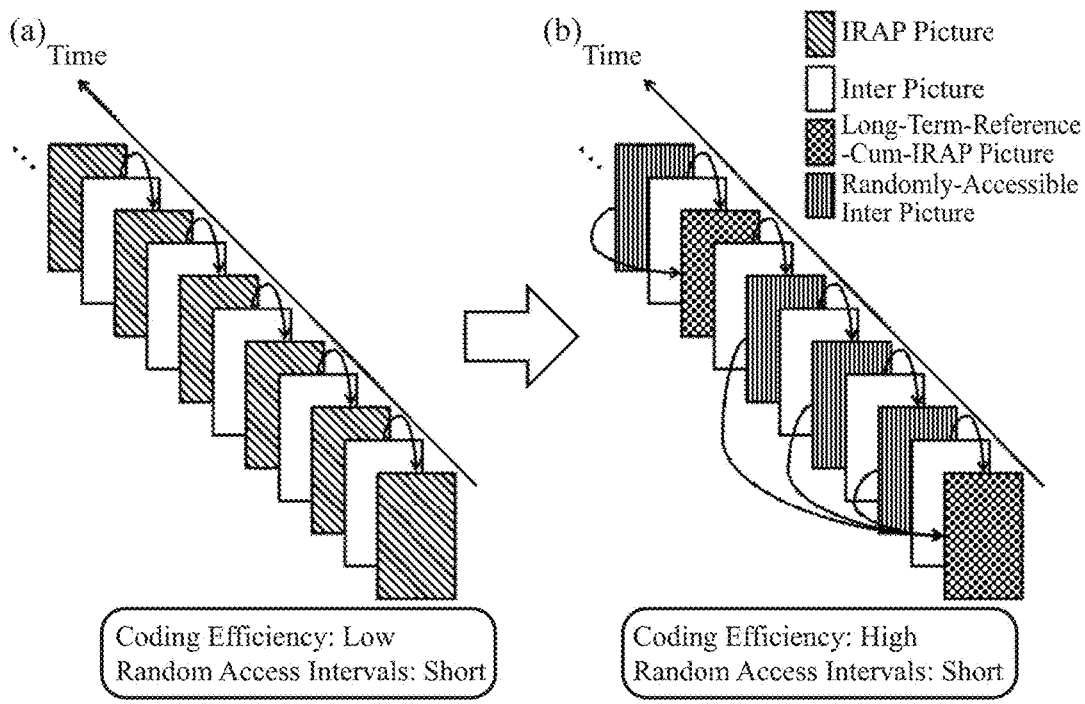
FIG. 33 is an explanatory drawing showing an example of random access implementation disclosed by nonpatent references 1 and 2, and an example of random access implementation according to Embodiment 1.

In FIG. 33, an example (FIG. 33(a)) of the conventional implementation of random access disclosed by nonpatent references 1 and 2, which is explained by referring to FIG. 32, and an example (FIG. 33(b)) of the implementation of random access according to this embodiment are shown. In the example of FIG. 33(a), each of IRAP pictures which are intra pictures is inserted between each of other pictures. In contrast, in the example of FIG. 33(b), the number of inter pictures is larger than that in the example of FIG. 33(a). In the example of FIG. 33(b), each "inter picture" denoted by a white box (an inter picture which cannot be randomly accessed) does not refer to a picture whose position in the display order is preceding to that of a randomly-accessible inter picture preceding thereto in the display order (its display time is a past one). By thus causing each inter picture which cannot be randomly accessed not to refer to, across a randomly-accessible inter picture preceding thereto in the display order, a picture further preceding thereto, random access according to a randomly-accessible inter picture is implemented. This corresponds to a configuration in which CRA pictures disclosed in nonpatent reference 1 are replaced by randomly-accessible inter pictures.

As shown in FIG. 33(b), according to this embodiment, a randomly-accessible inter picture is defined as an inter picture which refers to only a long-term reference picture. In this embodiment, long-term reference pictures represent reference pictures stored in a reference picture buffer prepared for long-term storage separately from buffer management of typical reference pictures defined in nonpatent references 1 and 2 (short-term reference pictures defined in nonpatent references 1 and 2). More specifically, long-term reference pictures are stored in a buffer for long-term storage in the motion-compensated prediction frame memory 12. Hereafter, a picture which is referred to by a randomly-accessible inter picture is called a "reference picture to be used at the time of random access." A reference picture to be used at the time of random access can also refer to a picture (e.g., an inter picture shown in FIG. 33(b)) other than a randomly-accessible inter picture, as shown in FIG. 33(b). In this Embodiment, reference pictures to be used at the time of random access are limited to intra pictures that can be decoded independently and normally. Further, reference pictures to be used at the time of random access can be set at intervals of a fixed number of pictures, or a picture suitable for each scene can be selected as a reference picture to be used at the time of random access. As an alternative, a background image can be set as a reference picture to be used at the time of random access. Further, there can be considered various methods of determining which intra picture is set as a reference picture to be used at the time of random access according to the application, the methods including a method of performing the determination according to a rule predetermined in the encoding device, a method of performing the determination in the encoding process, and a method of performing the determination outside the encoding device.

Further, also as to the setting of randomly-accessible inter pictures, there can be considered various setting methods according to the application. For example, the setting is carried out in advance on the basis of an evaluated value showing a correlation with the above-mentioned reference picture to be used at the time of random access. More specifically, an inter picture having a large correlation with the above-mentioned reference picture to be used at the time of random access is set as a randomly-accessible inter picture. As another example, there is also a method of setting randomly-accessible inter pictures at intervals of a fixed number of pictures.

For each inter picture set as a randomly-accessible picture, the motion compensation predictor 5 generates a prediction image by referring to one or more long-term reference pictures and performing a motion-compensated prediction.

It is necessary to multiplex information about the randomly-accessible inter pictures into the bitstream so that the decoding side can normally carry out decoding from a randomly-accessible inter picture existing at some midpoint of the bitstream. Accordingly, according to Embodiment 1, the variable length encoder 13 encodes the information about the randomly-accessible inter pictures.

More specifically, the variable length encoder 13 encodes, into the access unit of each randomly-accessible inter picture, additional information (identification information) showing that the picture is a randomly-accessible inter picture, as Supplemental Enhancement Information (SEI), and multiplexes the encoded data about the additional information into the bitstream. In this SEI, picture position information showing the picture number of a long-term reference picture (reference picture to be used at the time of random access) which is to be referred to by the inter picture of the corresponding access unit and which can be decoded independently is included. Therefore, when performing random access, the decoding side can also make random access to the inter picture of the access unit having the above-mentioned SEI, in addition to IRAP pictures. In this case, after decoding the long-term reference picture shown by the above-mentioned SEI, the decoding side decodes the inter picture which refers to only the long-term reference picture.

More specifically, when a variable length decoding unit 31 which constructs a decoder decodes SEI from the encoded data multiplexed into the bitstream in the image decoding device shown in FIG. 3 which will be described below, the image decoding device first decodes the decoded image of the intra picture which is the long-term reference picture having the picture number shown by the picture position information included in the SEI, and stores the decoded image of the intra picture in a motion-compensated prediction frame memory 39, and, after that, a motion compensation unit 35 refers to the decoded image of the intra picture which is stored in the motion-compensated prediction frame memory 39 and then performs a motion-compensated prediction on the randomly-accessible inter picture shown by the SEI, thereby being able to implement halfway decoding (random access) from the randomly-accessible inter picture shown by the SEI.

Figure 34:
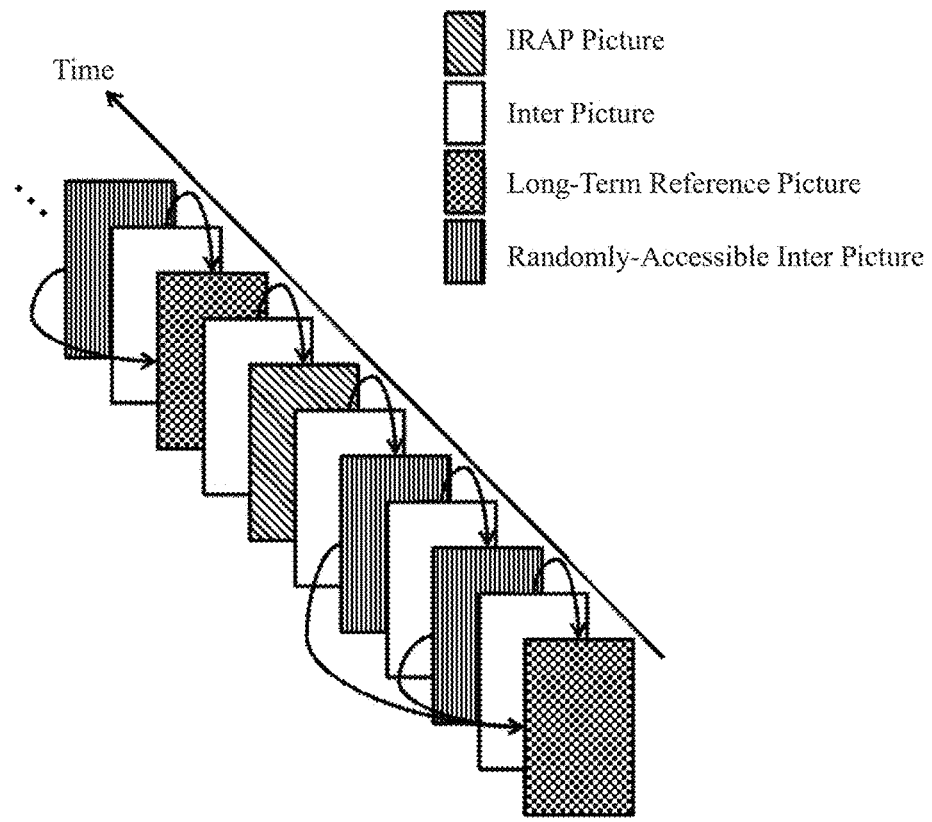
FIG. 34 is an explanatory drawing showing an example of random access implementation according to Embodiment 1 which uses together an IRAP picture which is not a long-term reference image.

Although each long-term reference picture which is a reference picture to be used at the time of random access is an IRAP picture in the example of FIG. 33(*b*), an intra picture which is not an IRAP picture can be set as a long-term reference picture. In addition, it is not necessary to set all IRAP pictures as long-term reference pictures, and an IRAP picture which is not a long-term reference picture can be used together, like in the case of an example of FIG. 34. Further, the number of long-term reference pictures each of which is referred to by a randomly-accessible inter picture are determined in advance as a value common between the image encoding device and the decoding device. The picture numbers of the long-term reference pictures, the number of picture numbers being to be encoded as additional information, exist as many as the predetermined number of long-term reference pictures. As an alternative, the above-mentioned number of long-term reference pictures can also be encoded as additional information. By doing in this way, the number of long-term reference pictures which are referred to can be changed adaptively according to the situation, and the coding efficiency of the randomly-accessible inter pictures can be improved.

Because it is thus possible to use, as random access points, not only intra pictures each of which uses only the inside thereof for prediction, but also inter pictures each of which can be used for motion compensation, high-efficiency encoding can be implemented as compared with nonpatent references 1 and 2.

In the example shown in FIG. 1, the block partitioning unit 1, the encoding controlling unit 2, the select switch 3, the intra prediction unit 4, the motion-compensated prediction unit 5, the subtracting unit 6, the transformation/quantization unit 7, the inverse quantization/inverse transformation unit 8, the adding unit 9, the memory 10 for intra prediction, the loop filter unit 11, the motion-compensated prediction frame memory 12, the variable length encoding unit 13, and the slice partitioning unit 14, which are the components of the image encoding device, are assumed to be configured with pieces of hardware for exclusive use (e.g., semiconductor integrated circuits in each of which a CPU is mounted, one chip microcomputers, or the like). As an alternative, in a case in which the image encoding device is configured with a computer, a program in which the processes performed by the block partitioning unit 1, the encoding controlling unit 2, the select switch 3, the intra prediction unit 4, the motion-compensated prediction unit 5, the subtracting unit 6, the transformation/quantization unit 7, the inverse quantization/inverse transformation unit 8, the adding unit 9, the loop filter unit 11, the variable length encoding unit 13, and the slice partitioning unit 14 are described can be stored in a memory of the computer and a CPU of the computer can execute the program stored in the memory.

Figure 2:
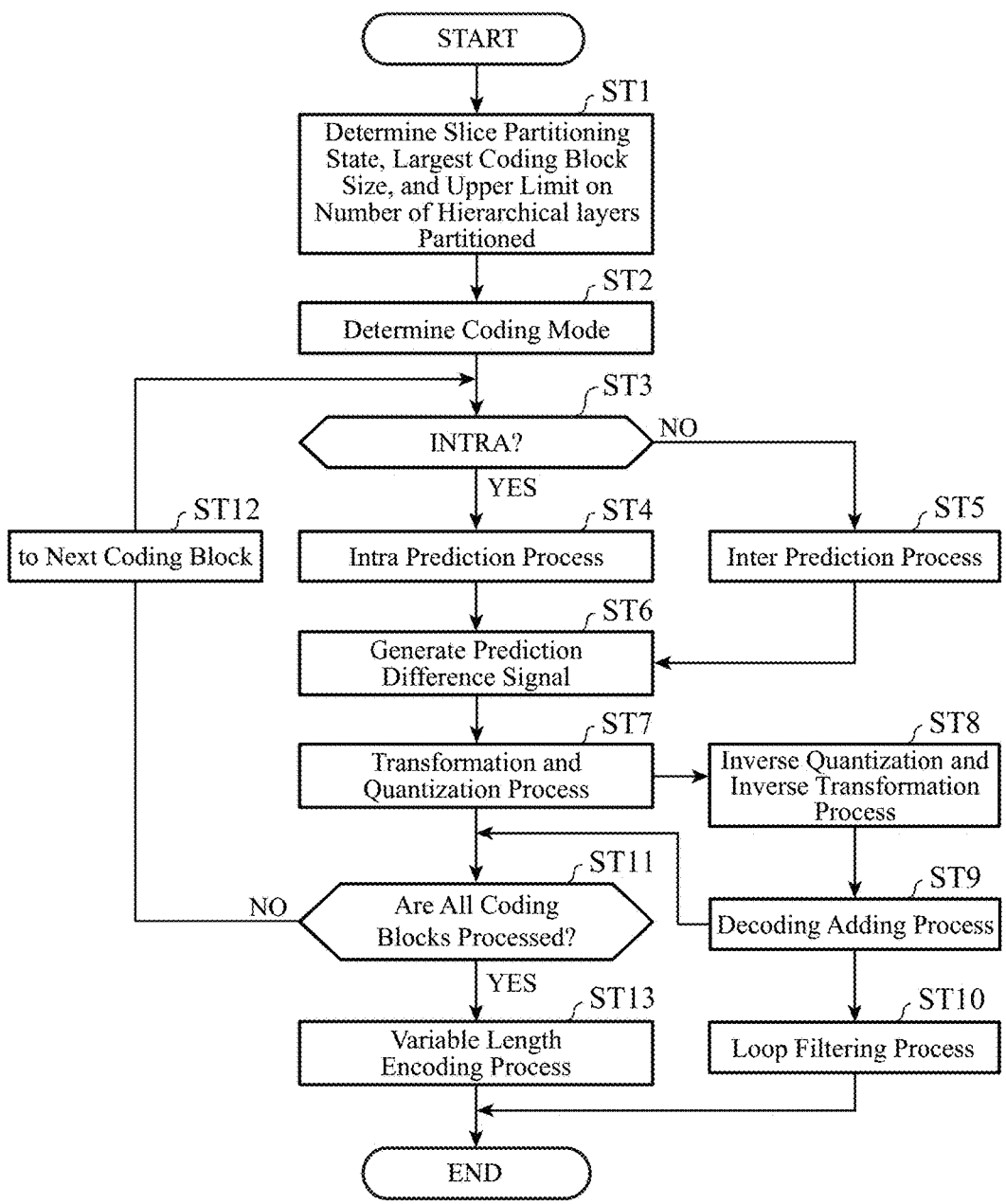
FIG. 2 is a flow chart showing processing (image encoding method) performed by the image encoding device according to Embodiment 1 of the present invention.

FIG. 2 is a flow chart showing the processing (image encoding method) performed by the image encoding device according to Embodiment 1 of the present invention.

Figure 3:
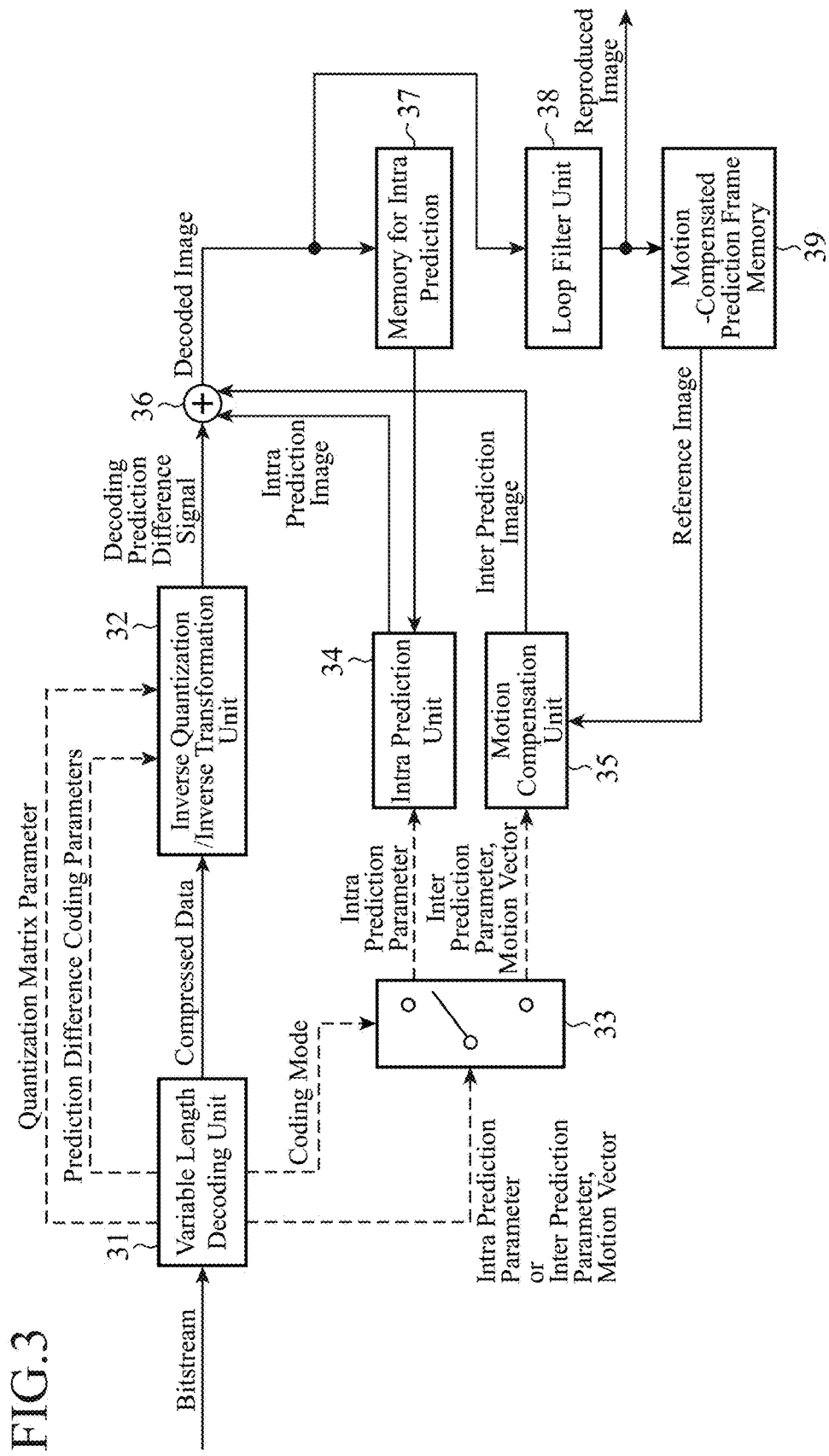
FIG. 3 is a block diagram showing an image decoding device according to Embodiment 1 of the present invention.

FIG. 3 is a block diagram showing the image decoding device according to Embodiment 1 of the present invention.

A feature also in the image decoding device is that random access can be carried out from an inter picture.

The variable length decoding unit 31 constructs a decoder, an inverse quantization/inverse transformation unit 32 constructs a difference image generator, and a select switch 33, an intra prediction unit 34 and the motion compensation unit 35 construct a prediction image generator.

Further, an adding unit 36 constructs a decoded image generator, and a loop filter unit 38 constructs a filtering processor.

Referring to FIG. 3, when receiving the encoded bitstream generated by the image encoding device shown in FIG. 1, a variable length decoding unit 31 decodes each of the pieces of header information, such as sequence level headers, picture level headers, and slice level headers, from the bitstream, and also variable-length-decodes the block partitioning information showing the partitioning state of each of coding blocks partitioned hierarchically from the encoded bitstream. At that time, assuming that each of a YUV4:4:4 format signal and an RGB4:4:4 format signal is a monochrome image signal, when information showing that monochrome (YUV4:0:0) encoding is performed independently is included in the header information, a decoding process can be performed independently on the encoded bitstream of each chrominance signal.

In this case, when carrying out random access to decode from some midpoint of the encoded bitstream, by starting the decoding from an IRAP picture or a picture of an access unit having SEI showing that the picture is a randomly-accessible inter picture, the image decoding device can normally decode pictures subsequent to that picture in the display order. Concretely, the image decoding device decodes the SEI showing that the picture is a randomly-accessible inter picture, and first refers to the picture number of a long-term reference picture, the picture number being included in this SEI, i.e., the picture number of the long-term reference picture which is to be referred to by the picture of the corresponding access unit and decodes the picture having that specified picture number. After that, the motion compensation unit 35 (motion compensation predictor) refers to the long-term reference picture which is decoded and stored in the motion-compensated prediction frame memory 39 (motion-compensated prediction memory) and performs a motion-compensated prediction on the inter picture of the access unit in which the above-mentioned SEI is included, to decode this inter picture. The image decoding device then decodes pictures subsequent to this inter picture in the display order. By doing in this way, the image decoding device can normally decode pictures subsequent to the picture which is the access unit in which the above-mentioned SEI is included.

Further, the number of long-term reference pictures each of which is to be referred to by a randomly-accessible inter picture is determined in advance as a value common between the image encoding device and the decoding device, and the picture numbers of the long-term reference pictures, the number of picture numbers being equal to the determined and above-mentioned number of long-term reference pictures, are decoded. As an alternative, in the case in which the image encoding device is configured in such a way as to also encode the above-mentioned number of long-term reference pictures as additional information, the image decoding device is configured in such a way as to decode the number of long-term reference pictures to be referred to, and decode the picture numbers of the long-term reference pictures, the number of picture numbers being equal to the decoded number of long-term reference pictures. By thus configuring the image decoding device in such away that the image decoding device decodes the encoded number of long-term reference pictures, the image decoding device can normally decode the stream generated by the image encoding device that adaptively changes the number of reference pictures to improve the coding efficiency of the randomly-accessible inter pictures.

Hereafter, the other configuration of the image decoding device will be explained. The following configuration is implemented in the same way for the time of random access to perform decoding from some midpoint of the encoded bitstream, and also for the time of performing decoding from the head of the encoded bitstream.

When the enable flag information of the quantization matrix included in the above-described header information shows "enabled", the variable length decoding unit 31 variable-length-decodes the quantization matrix parameter and specifies a quantization matrix. Concretely, for each chrominance signal and for each coding mode at each orthogonal transformation size, when the quantization matrix parameter shows that either a quantization matrix which is prepared, as an initial value, in advance and in common between the image encoding device and the image decoding device, or an already-decoded quantization matrix is used (no new quantization matrix is used), the variable length decoding unit refers to the index information specifying which quantization matrix in the above-described matrices is used, to specify a quantization matrix, and, when the quantization matrix parameter shows that a new quantization matrix is used, specifies, as the quantization matrix to be used, the quantization matrix included in the quantization matrix parameter.

The variable length decoding unit 31 also refers to each header information to specify the slice partitioning state and also specify each largest coding block included in the slice data about each slice, refers to the block partitioning information to partition each largest coding block hierarchically and specify each coding block which is a unit on which the decoding process is to be performed, and performs a process of variable-length-decoding the compressed data, the coding mode, the intra prediction parameter (when the coding mode is an intra coding mode), the inter prediction parameter (when the coding mode is inter encoding mode), the motion vector (when the coding mode is an inter coding mode), and the prediction difference coding parameters, which are associated with each coding block.

An inverse quantization/inverse transformation unit 32 refers to the quantization parameter and the transformation block partitioning information which are included in the prediction difference coding parameters variable-length-decoded by the variable length decoding unit 31, to inverse-quantize the compressed data variable-length-decoded by the variable length decoding unit 31 on a per transformation block, performs an inverse orthogonal transformation process on the transform coefficients which are the compressed data inverse-quantized thereby, and performs a process of calculating a decoding prediction difference signal which is the same as the local decoding prediction difference signal outputted from the inverse quantization/inverse transformation unit 8 shown in FIG. 1.

In this case, from the above-described transformation block partitioning information, the partitioning state of the transformation blocks in each coding block is determined. For example, in the case of a signal having the YUV4:2:0 format, the transformation block sizes are determined by performing hierarchical partitioning of each coding block into blocks in quadtree form, as shown in FIG. 19.

The luminance signal is configured in such a way that each coding block is hierarchically partitioned into one or more square transformation blocks, as shown in, for example, FIG. 19.

The color difference signals are configured, as shown in FIG. 19, in such a way that when the input signal format is the YUV4:2:0 signal format, each coding block is hierarchically partitioned into one or more square transformation blocks, like the luminance signal. In this case, the transformation block size of each of the color difference signals is half of that of the corresponding luminance signal both in the vertical and horizontal directions.

As shown in FIG. 20, when the input signal format is the YUV4:2:2 signal format, the same hierarchical partitioning into blocks in quadtree form as that on the luminance signal is performed. Further, because the shape of each partitioned block is a rectangle in which the number of pixels in the vertical direction is twice as large as the number of pixels in the horizontal direction, by further partitioning each partitioned block into two blocks in the vertical direction, each partitioned block is made to consist of two transformation blocks having the same block size as that of the color difference signals in a YUV4:2:0 signal (a size which is half of the size both in the vertical and horizontal directions of each transformation block of the luminance signal).

When the input signal format is the YUV4:4:4 signal format, as shown in FIG. 21, the same partitioning as that on the transformation blocks of the luminance signal is always performed on the transformation blocks of each of the color difference signals in such a way that the transformation blocks are configured to have the same size.

Further, when each header information variable-length-decoded by the variable length decoding unit 31 shows that in the slice currently being processed, an inverse quantization process is performed by using a quantization matrix, the inverse quantization process is performed by using the quantization matrix.

Concretely, the inverse quantization/inverse transformation unit performs the inverse quantization process by using the quantization matrix specified from each header information.

The select switch 33 performs a process of, when the coding mode variable-length-decoded by the variable length decoding unit 31 is an intra coding mode, outputting the intra prediction parameter which is variable-length-decoded by the variable length decoding unit 31 to the intra prediction unit 34, whereas when the coding mode variable-length-decoded by the variable length decoding unit 31 is an inter coding mode, outputting the inter prediction parameter and the motion vector which are variable-length-decoded by the variable length decoding unit 31 to the motion compensation unit 35.

When the coding mode associated with the coding block determined from the block partitioning information variable-length-decoded by the variable length decoding unit 31 is an intra coding mode, the intra prediction unit 34 performs an intra prediction process (intra-frame prediction process) using the intra prediction parameter outputted from the select switch 33 while referring to a decoded image stored in a memory 37 for intra prediction, and performs a process of generating an intra prediction image. The intra prediction unit 34 constructs an intra predictor.

More specifically, as to the luminance signal, the intra prediction unit 34 performs the intra prediction process (intra-frame prediction process) using the above-described intra prediction parameter on the luminance signal, to generate a prediction image of the luminance signal.

On the other hand, as to the color difference signals, when the intra prediction parameter of the color difference signals shows that the same prediction mode as the intra prediction mode for the luminance signal is used (when the intra prediction parameter shows the intra prediction mode common between the luminance and the color differences (DM mode)), the intra prediction unit performs the same intra-frame prediction as that on the luminance signal, to generate prediction images of the color difference signals.

Further, when the intra prediction parameter of the color difference signals shows the vertical prediction mode or the horizontal prediction mode, the intra prediction unit performs the directional prediction on the color difference signals to generate prediction images of the color difference signals.

Further, when the intra prediction parameter of the color difference signals shows the color difference signal prediction mode using a luminance correlation (LM mode), the intra prediction unit calculates a correlation parameter showing the correlation between the luminance signal and the color difference signals by using the luminance signals and the color difference signals of a plurality of pixels adjacent to the upper and left sides of a block for which a prediction image is to be generated, and generates prediction images of the color difference signals by using both the correlation parameter and the luminance signal associated with the block of each of the color difference signals which is the target for prediction process.

In a case in which the image encoding device is configured to perform the process in the above-described DM mode or the above-described LM mode and prevent itself from selecting another prediction mode when the input signal format is the YUV4:4:4 signal format, the image decoding device is similarly configured in such a way as to be able to decode the encoded bitstream generated by the image encoding device.

Because there is a high correlation between the edge position of the luminance signal and those of the color difference signals in a YUV4:4:4 signal, by prohibiting the application of a prediction mode different from that applied to the luminance signal to the color difference signals, the amount of information in the intra prediction mode of the color difference signals can be reduced and the coding efficiency can be improved.

Further, when the input signal format is the YUV4:2:2 signal format, if the luminance signal is a square block, each of the color difference signals is a rectangular block in which the number of pixels in the horizontal direction is half as compared with that of the luminance signal, as shown in FIG. 24. Therefore, in order to apply a prediction in the same direction to the luminance signal and the color difference signals when a YUV4:4:4 signal is converted into a YUV4:2:2 signal, the prediction direction of the color difference signals is made to differ from that of the luminance signal on the YUV4:2:2 signal in the case of a directional prediction other than the vertical prediction and the horizontal prediction, as shown in FIG. 25.

Concretely, when the prediction direction vector of the luminance signal is expressed by $v_L=(dx_L, dy_L)$, the prediction direction vector of each of the color difference signals is expressed by $v_C=(dx_L/2, dy_L)$, as shown in FIG. 26. More specifically, when the angle of the prediction direction is expressed by $\theta$, it is necessary to perform a prediction in a prediction direction having a relation shown by $\tan \theta_C = 2 \tan \delta_L$, where the angle of the prediction direction of the luminance signal is expressed by $\theta_L$ and the angle of the prediction direction of each of the color difference signals is expressed by $\theta_C$, as shown in FIG. 27.

Therefore, in order to make it possible to normally perform the above-described DM mode in which a prediction in the same direction is performed on the luminance signal and the color difference signals, when the input signal format is the YUV4:2:2 signal format, the intra prediction unit converts an index of the intra prediction mode which is used for the luminance signal into an index of the intra prediction mode which is used for the prediction on the color difference signals, and performs the prediction process on the color difference signals according to the intra prediction mode corresponding to the converted index. Concretely, a conversion table for the index can be prepared and the intra prediction unit can be configured to convert the index by referring to the conversion table, or a conversion equation can be prepared in advance and the intra prediction unit can be configured to convert the index according to the conversion equation.

Because the intra prediction unit is configured in this way, the intra prediction unit can perform an appropriate prediction on the color difference signals according to the YUV4:2:2 signal format only by performing the conversion of the index without changing the directional prediction process itself.

When the coding mode associated with the coding block determined from the block partitioning information variable-length-decoded by the variable length decoding unit 31 is an inter coding mode, the motion compensation unit 35 performs an inter prediction process (motion-compensated prediction process) using the motion vector and the inter prediction parameter which are outputted from the select switch 33 while referring to a decoded image stored in the motion-compensated prediction frame memory 39, and performs a process of generating an inter prediction image.

The adding unit 36 performs a process of adding the decoding prediction difference signal calculated by the inverse quantization/inverse transformation unit 32 and the intra prediction image generated by the intra prediction unit 34 or the inter prediction image generated by the motion compensation unit 35, to calculate a decoded image which is the same as the local decoded image outputted from the adding unit 9 shown in FIG. 1.

The memory 37 for intra prediction is a recording medium that stores the decoded image calculated by the adding unit 36 as a reference image used for the intra prediction process.

The loop filter unit 38 performs a predetermined filtering process on the decoded image calculated by the adding unit 36, and performs a process of outputting the decoded image filtering-processed thereby.

Concretely, the loop filter unit performs a filtering (deblocking filtering) process of reducing a distortion occurring at a boundary between transformation blocks and a distortion occurring at a boundary between prediction blocks, a process (pixel adaptive offset process) of adaptively adding an offset on a per pixel basis, an adaptive filtering process of adaptively switching among linear filters, such as Wiener filters, and performing a filtering process, and so on.

For each of the above-mentioned filtering processes including the deblocking filtering process, the pixel adaptive offset process, and the adaptive filtering process, the loop filter unit 38 refers to each header information variable-length-decoded by the variable length decoding unit 31 and specifies whether or not to perform the process in the slice currently being processed.

Figure 12:
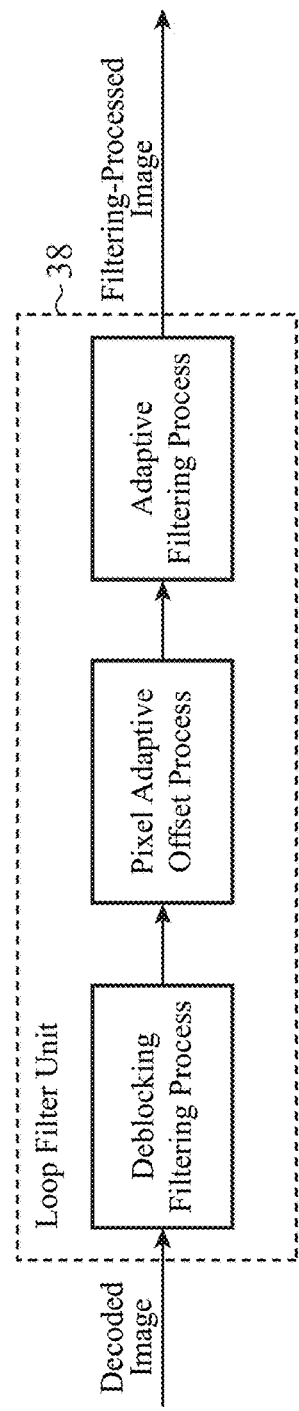
FIG. 12 is an explanatory drawing showing an example of the configuration of using a plurality of loop filtering processes in a loop filter unit of the image decoding device according to Embodiment 1 of the present invention.

At that time, if, for example, the loop filter unit 11 of the image encoding device is configured as shown in FIG. 11 when performing two or more filtering processes, the loop filter unit 38 is configured as shown in FIG. 12. As a matter of course, if the loop filter unit 11 of the image encoding device is configured with the deblocking filtering process and the pixel adaptive offset process, the loop filter unit 38 is also configured with the deblocking filtering process and the pixel adaptive offset process.

In the deblocking filtering process, the loop filter unit refers to the header information variable-length-decoded by the variable length decoding unit 31, and, when there exists information for changing the various parameters used for the selection of the intensity of a filter applied to a block boundary from initial values, performs the deblocking filtering process on the basis of the change information. When no change information exists, the loop filter unit carries out the deblocking filtering process according to a predetermined method.

In the pixel adaptive offset process, the loop filter unit partitions the decoded image into blocks on the basis of the block partitioning information for the pixel adaptive offset process, which is variable-length-decoded by the variable length decoding unit 31, refers to the index variable-length-decoded by the variable length decoding unit 31 and indicating the class classifying method of each of the blocks on a per block basis, and, when the index does not indicate "does not perform the offset process", performs a class classification on each pixel in each of the blocks according to the class classifying method indicated by the above-mentioned index.

As a candidate for the class classifying method, a method which is the same as a candidate for the class classifying method for the pixel adaptive offset process in the loop filter unit 11 is prepared in advance.

The loop filter unit then refers to the offset information specifying the offset value calculated for each class on a per block basis, and performs a process of adding the offset to the brightness value of the decoded image.

When the pixel adaptive offset process in the loop filter unit 11 of the image encoding device is configured in such a way as to, instead of encoding the block partitioning information, always partition the image into blocks each having a fixed size (e.g., largest coding blocks), select a class classifying method for each of the blocks, and perform an adaptive offset process on a per class basis, a pixel adaptive offset process is performed also in the loop filter unit 38 for each block having a fixed size which is the same as that in the loop filter unit 11.

In the adaptive filtering process, after performing a class classification according to the same method as that used by the image encoding device of FIG. 1, the loop filter unit performs the filtering process by using the filter for each class, which is variable-length-decoded by the variable length decoding unit 31, on the basis of information about the class classification.

The motion-compensated prediction frame memory 39 is a recording medium that stores the decoded image filtering-processed by the loop filter unit 38 as a reference image used for inter prediction process (motion-compensated prediction process).

In the example shown in FIG. 3, the variable length decoding unit 31, the inverse quantization/inverse transformation unit 32, the select switch 33, the intra prediction unit 34, the motion compensation unit 35, the adding unit 36, the memory 37 for intra prediction, the loop filter unit 38, and the motion-compensated prediction frame memory 39, which are the components of the image decoding device, are assumed to be configured with pieces of hardware for exclusive use (e.g., semiconductor integrated circuits in each of which a CPU is mounted, one chip microcomputers, or the like). As an alternative, in a case in which the image decoding device is configured with a computer, a program in which the processes performed by the variable length decoding unit 31, the inverse quantization/inverse transformation unit 32, the select switch 33, the intra prediction unit 34, the motion compensation unit 35, the adding unit 36, and the loop filter unit 38 are described can be stored in a memory of the computer and a CPU of the computer can execute the program stored in the memory.

Figure 4:
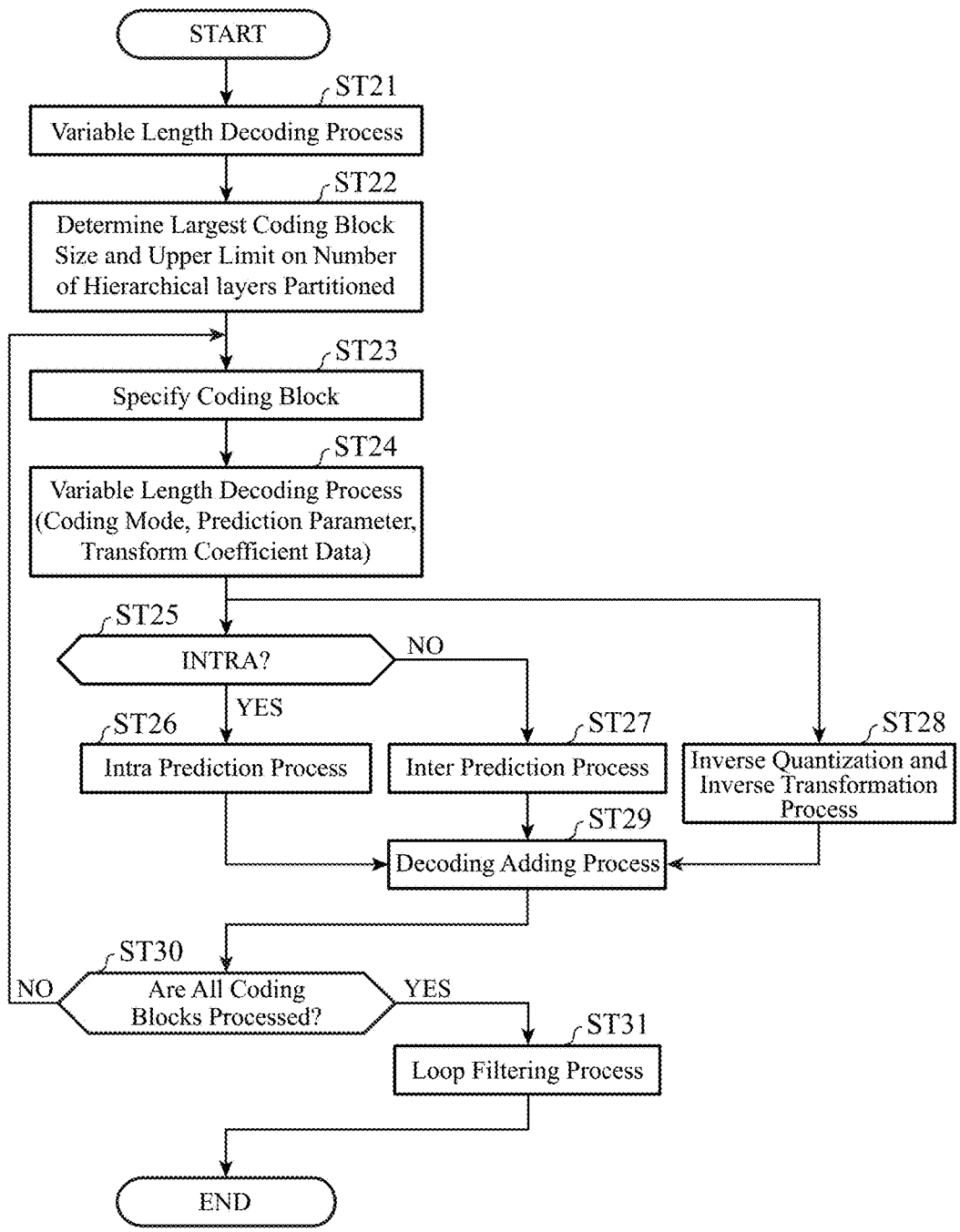
FIG. 4 is a flow chart showing processing (image decoding method) performed by the image decoding device according to Embodiment 1 of the present invention.

FIG. 4 is a flow chart showing the processing (image decoding method) performed by the image decoding device according to Embodiment 1 of the present invention.

Next, operations will be explained.

In this Embodiment 1, a case will be explained in which the image encoding device receives each frame image of a video as an input image, performs an intra prediction based on already-encoded neighboring pixels or a motion-compensated prediction between adjacent frames, performs a compression process with orthogonal transformation and quantization on an acquired prediction difference signal, and, after that, performs variable length encoding to generate an encoded bitstream, and the image decoding device decodes the encoded bitstream outputted from the image encoding device.

The image encoding device shown in FIG. 1 is characterized in that the device is adapted for local changes of a video signal in a space direction and in a time direction, partitions the video signal into blocks having various sizes, and performs intra-frame and inter-frame adaptive encoding.

In general, video signals have characteristics of their complexity locally varying in space and time. From the viewpoint of space, a certain video frame may have, for example, a pattern having a uniform signal characteristic in a relatively large image region, such as a sky image or a wall image, or a pattern in which a pattern having a complicated texture in a small image region, such as a person image or a picture including a fine texture, also coexists.

Also from the viewpoint of time, a sky image and a wall image have a small local change in a time direction in their patterns, while an image of a moving person or object has a larger temporal change because its outline has a movement of a rigid body and a movement of a non-rigid body with respect to time.

Although a process of generating a prediction difference signal having small signal power and small entropy by using a temporal and spatial prediction, thereby reducing the whole code amount, is performed in the encoding process, the code amount of parameters used for the prediction can be reduced as long as the parameters can be applied uniformly to as large an image signal region as possible.

On the other hand, because the amount of errors occurring in the prediction increases when the same prediction parameter is applied to a large image region in an image signal pattern having a large change in time and space, the code amount of the prediction difference signal increases.

Therefore, it is desirable that, for an image region having a large change in time and space, the block size of a block subjected to the prediction process to which the same prediction parameter is applied is reduced, thereby increasing the data volume of the parameter which is used for the prediction and reducing the electric power and entropy of the prediction difference signal.

In this Embodiment 1, in order to perform encoding which is adapted for the above-described general characteristics of a video signal, a configuration is employed in which the prediction process and so on are started first from a predetermined largest block size, the region of the video signal is hierarchically partitioned, and the prediction process and the encoding process on the prediction difference are adapted for each of the partitioned regions.

The processing performed by the image encoding device shown in FIG. 1 will be explained first.

First, the encoding controlling unit 2 determines the slice partitioning state of a picture (current picture) which is the target to be encoded, and also determines the size of each largest coding block which is used for the encoding of the picture and the upper limit on the number of hierarchies at the time when each largest coding block is hierarchically partitioned into blocks (step ST1 of FIG. 2).

As a method of determining the size of each largest coding block, for example, there can be a method of determining the same size for all the pictures according to the resolution of the video signal of the inputted image, and a method of quantifying a variation in the complexity of a local movement of the video signal of the inputted image as a parameter and then determining a small size for a picture having a vigorous movement while determining a large size for a picture having a small movement.

As a method of determining the upper limit on the number of hierarchical layers partitioned, for example, there can be a method of determining the same number of hierarchical layers for all the pictures according to the resolution of the video signal of the inputted image, and a method of determining an increased number of hierarchical layers so that a finer movement can be detected when the video signal of the inputted image has a vigorous movement, while determining a decreased number of hierarchical layers when the video signal of the inputted image has a small movement.

The above-described size of each largest coding block and the upper limit on the number of hierarchical layers into which each largest coding block is hierarchically partitioned can be encoded into the sequence level header or the like, or, instead of encoding the size and the number, the image decoding device can be configured in such a way as to also perform the same determination process.

In the former case, the code amount of the header information increases. However, because the image decoding device does not have to perform the above-described determination process, the processing load on the image decoding device can be reduced and, in addition to that, the image encoding device can search for and send an optimal value.

In the latter case, conversely, while the processing load on the image decoding device increases since the image decoding device performs the above-described determination process, the code amount of the header information does not increase.

Further, when the above-described size of each largest coding block and the upper limit on the number of hierarchical layers into which each largest coding block is hierarchically partitioned is encoded into the sequence level header, the smallest block size of the coding blocks, instead of the upper limit on the number of hierarchical layers partitioned, can be encoded. More specifically, because the size of blocks which are acquired when each largest coding block is partitioned until its number of hierarchical layers partitioned reaches the upper limit is the smallest block size of the coding blocks, the image decoding device can determine the upper limit on the number of hierarchical layers partitioned from the size of the largest coding blocks and the smallest block size of the coding blocks.

The encoding controlling unit 2 also selects a coding mode corresponding to each of the coding blocks into which each inputted image is hierarchically partitioned from one or more available coding modes (step ST2).

More specifically, the encoding controlling unit 2 hierarchically partitions each image region having the largest coding block size into coding blocks each having a coding block size until the number of hierarchical layers partitioned reaches the upper limit which is determined in advance, and determines a coding mode for each of the coding blocks.

The coding mode is one of one or more intra coding modes (generically referred to as "INTRA") and one or more inter coding modes (generically referred to as "INTER"), and the encoding controlling unit 2 selects a coding mode corresponding to each of the coding blocks from among all the coding modes available in the picture currently being processed or a subset of these coding modes.

Each of the coding blocks into which each inputted image is hierarchically partitioned by the block partitioning unit 1, which will be mentioned below, is further partitioned into one or more prediction blocks each of which is a unit on which a prediction process is to be performed, and the state of the partitioning into the prediction blocks is also included as information in the coding mode. More specifically, the coding mode, which is either an intra or inter coding mode, is an index identifying what type of partitioned prediction blocks are included.

Although a detailed explanation of a method of selecting a coding mode for use in the encoding controlling unit 2 will be omitted hereafter because the selecting method is a known technique, there is a method of performing an encoding process on each coding block by using arbitrary available coding modes to examine the coding efficiency, and selecting a coding mode having the highest degree of coding efficiency from among the plurality of available coding modes, for example.

The encoding controlling unit 2 further determines a quantization parameter and a transformation block partitioning state, which are used when a difference image is compressed, for each coding block, and also determines a prediction parameter (intra prediction parameter or inter prediction parameter) which is used when a prediction process is performed.

When each coding block is further partitioned into prediction blocks on each of which the prediction process is to be performed, a prediction parameter (intra prediction parameter or inter prediction parameter) can be selected for each of the prediction blocks.

FIG. 19 is an explanatory drawing showing transformation block sizes at the time of performing the compression process (transformation process and quantization process) on the luminance signal and the color difference signals in a 4:2:0 format signal.

The transformation block sizes are determined by hierarchically partitioning each coding block into blocks in quadtree form, as shown in FIG. 19.

For example, by determining whether or not to partition each transformation block on the basis of the code amount in the case of partitioning the transformation block, the code amount in the case of not partitioning the transformation block, and an evaluation criterion which takes into consideration coding errors, etc. in such a way that an evaluated value is minimized, an optimal partitioned shape of the transformation block can be determined from the viewpoint of a trade-off between the code amount and the coding errors.

The luminance signal is configured in such a way that each coding block is hierarchically partitioned into one or more square transformation blocks, as shown in, for example, FIG. 19.

The color difference signals are configured, as shown in FIG. 19, in such a way that when the input signal format is the YUV4:2:0 signal format, each coding block is hierarchically partitioned into one or more square transformation blocks, like the luminance signal. In this case, the transformation block size of each of the color difference signals is half of that of the corresponding luminance signal both in the vertical and horizontal directions.

As shown in FIG. 20, when the input signal format is the YUV4:2:2 signal format, the same hierarchical partitioning into blocks in quadtree form as that on the luminance signal is performed. Further, because the shape of each partitioned block is a rectangle in which the number of pixels in the vertical direction is twice as large as the number of pixels in the horizontal direction, by further partitioning each partitioned block into two blocks in the vertical direction, each partitioned block is made to consist of two transformation blocks having the same block size as that of the color difference signals in a YUV4:2:0 signal (a size which is half of the size both in the vertical and horizontal directions of each transformation block of the luminance signal).

Further, when the input signal format is the YUV4:4:4 signal format, as shown in FIG. 21, the same partitioning as that on the transformation blocks of the luminance signal is always performed on the transformation blocks of the color difference signals in such a way that the transformation blocks are configured to have the same size.

The encoding controlling unit 2 outputs the prediction difference coding parameters including the transformation block partitioning information showing the partitioning information about the transformation blocks in each coding block, and the quantization parameter defining the quantization step size at the time of performing quantization on the transform coefficients to the transformation/quantization unit 7, the inverse quantization/inverse transformation unit 8, and the variable length encoding unit 13.

The encoding controlling unit 2 also outputs the intra prediction parameter to the intra prediction unit 4 as needed.

The encoding controlling unit 2 further outputs the inter prediction parameter to the motion-compensated prediction unit 5 as needed.

When receiving the video signal as the inputted image, the slice partitioning unit 14 partitions the inputted image into one or more slices which are part images according to the slice partitioning information determined by the encoding controlling unit 2.

Every time when receiving each of the slices from the slice partitioning unit 14, the block partitioning unit 1 partitions the slice into coding blocks each having the largest coding block size determined by the encoding controlling unit 2, and further partitions each of the largest coding blocks partitioned into coding blocks hierarchically, these coding blocks being determined by the encoding controlling unit 2, and outputs each of the coding blocks.

Figure 5:
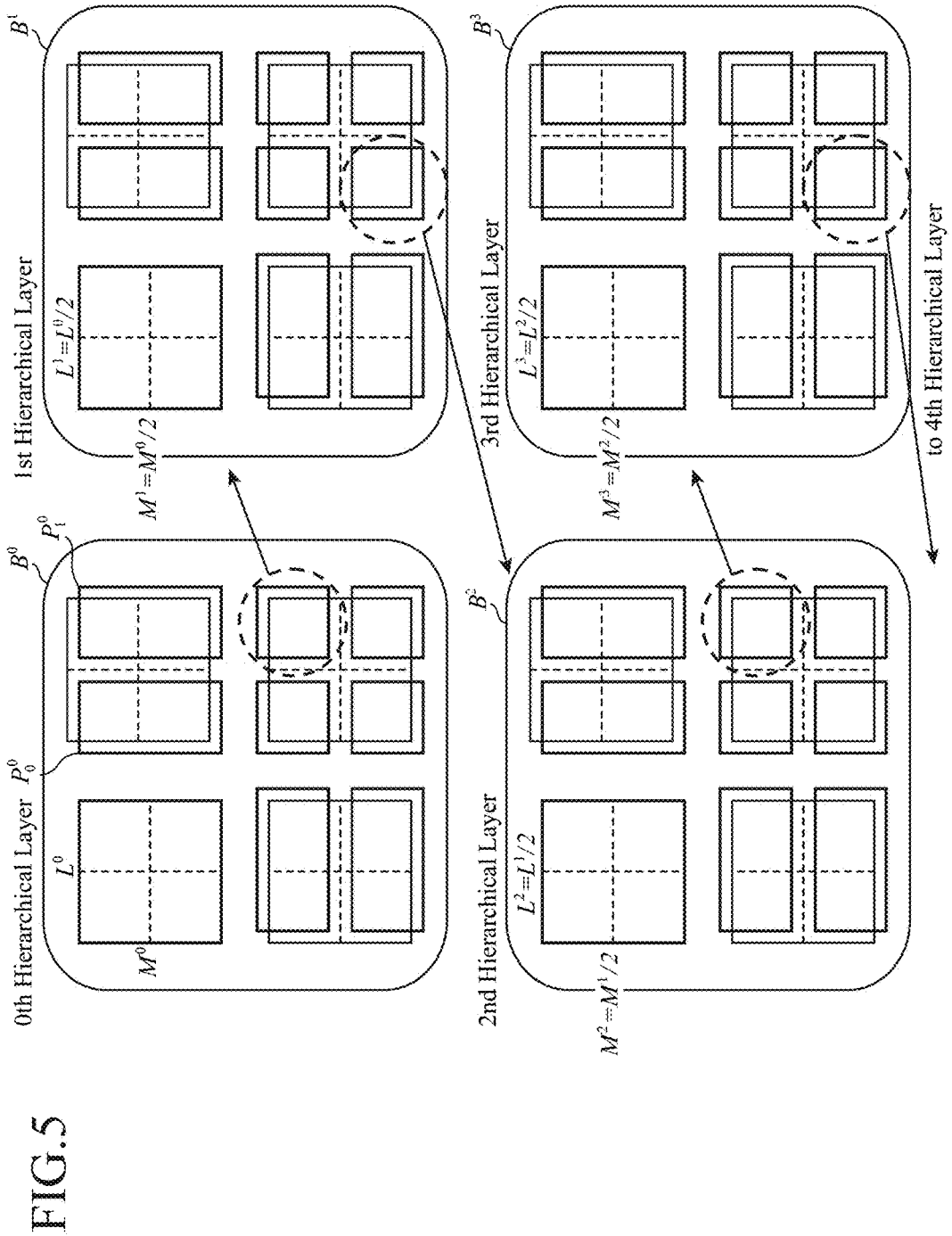
FIG. 5 is an explanatory drawing showing an example in which each largest coding block is partitioned hierarchically into a plurality of coding blocks.

FIG. 5 is an explanatory drawing showing an example in which each largest coding block is hierarchically partitioned into a plurality of coding blocks.

Referring to FIG. 5, each largest coding block is a coding block whose luminance component, which is shown by "0-th hierarchical layer", has a size of ($L^0$, $M^0$).

By performing the partitioning hierarchically with each largest coding block being set as a starting point until the depth of the hierarchy reaches a predetermined depth which is set separately according to a quadtree structure, the coding blocks are acquired.

At the depth of n, each coding block is an image region having a size of ($L^n$, $M^n$).

Although $L^n$ can be the same as or differ from $M^n$, the case of $L^n=M^n$ is shown in FIG. 5.

Hereafter, the coding block size determined by the encoding controlling unit 2 is defined as the size of ($L^n$, $M^n$) in the luminance component of each coding block.

Because quadtree partitioning is performed, $L^{n+1},M^{n+1})=(L^n/2, M^n/2)$ is always established.

In the case of a color video signal (4:4:4 format) in which all the color components have the same sample number, such as an RGB signal, all the color components have a size of ($L^n$, $M^n$), while in the case of handling the 4:2:0 format, a corresponding color difference component has a coding block size of ($L^n/2$, $M^n/2$).

Hereafter, each coding block in the nth hierarchical layer is expressed by $B^n$, and a coding mode selectable for each coding block $B^n$ is expressed by $m(B^n)$.

In the case of a color video signal which consists of a plurality of color components, the coding mode $m(B^n)$ can be configured in such a way that an individual mode is used for each color component, or can be configured in such a way that a common mode is used for all the color components. Hereafter, an explanation will be made by assuming that the coding mode indicates a coding mode for the luminance component of each coding block when having the 4:2:0 format in a YUV signal unless otherwise specified.

Each coding block $B^n$ is partitioned into one or more prediction blocks each representing a unit for prediction process by the block partitioning unit 1, as shown in FIG. 5.

Hereafter, each prediction block belonging to each coding block $B^n$ is expressed by $P_i^n$ (i shows a prediction block number in the nth hierarchical layer). An example of P00 and P10 is shown in FIG. 5.

How the partitioning of each coding block $B^n$ into prediction blocks is performed is included as information in the coding mode $m(B^n)$.

While a prediction process is performed on each of all the prediction blocks $P_i^n$ according to the coding mode $m(B^n)$, an individual prediction parameter (an intra prediction parameter or an inter prediction parameter) can be selected for each prediction block $P_i^n$.

The encoding controlling unit 2 generates such a block partitioning state as shown in, for example, FIG. 6 for each largest coding block, and then specifies coding blocks.

Figure 6B:
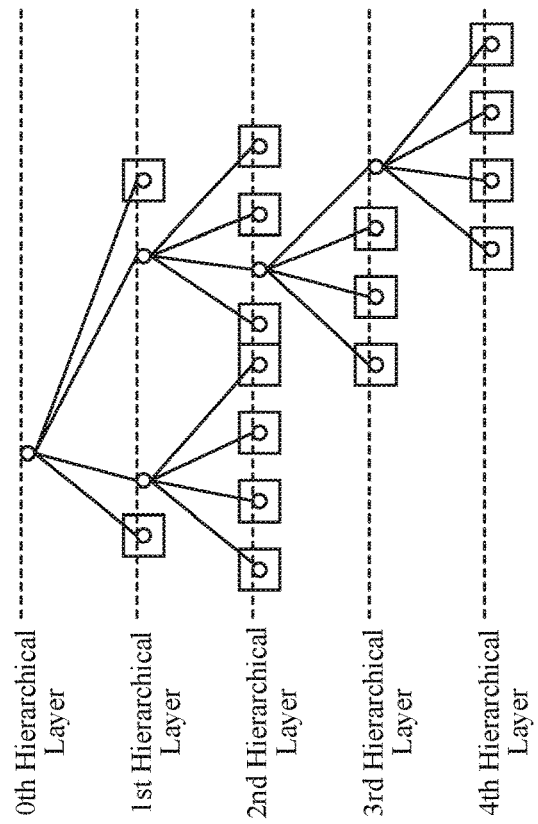
FIG. 6(b) is an explanatory drawing showing a state in which a coding mode m(B$^n$) is assigned to each of the blocks through the hierarchical partitioning.
Figure 6A:
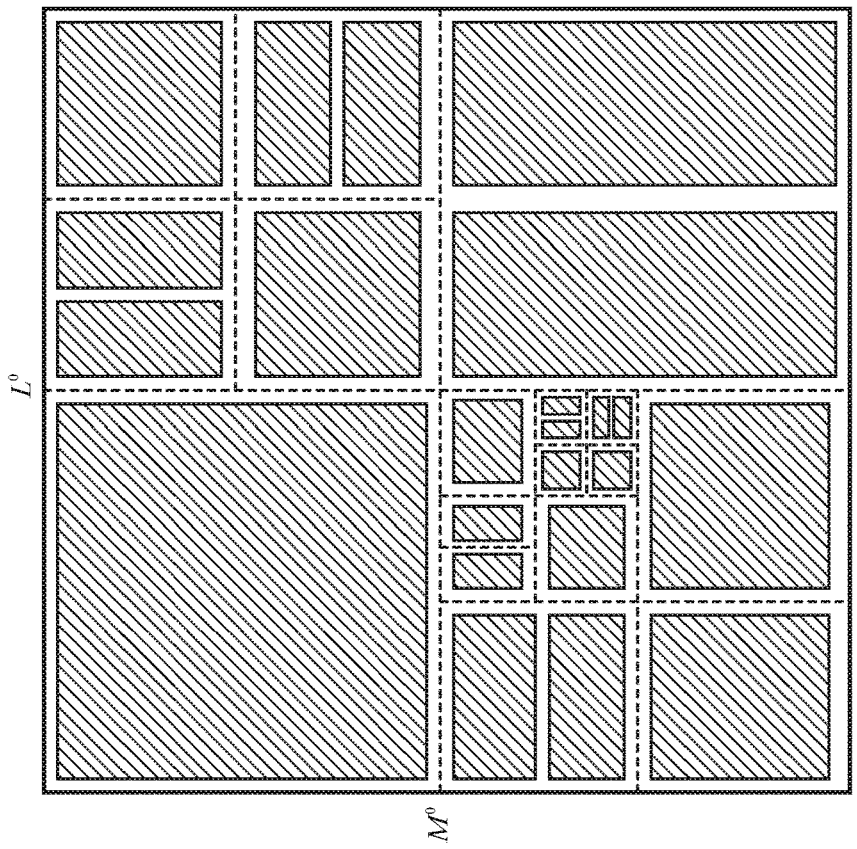
FIG. 6(a) is an explanatory drawing showing a distribution of coding blocks and prediction blocks after the partitioning.

Each rectangle enclosed by a dotted line of FIG. 6(a) shows a coding block, and each block filled with hatch lines in each coding block shows the partitioning state of each prediction block.

FIG. 6(b) shows a situation where a coding mode $m(B^n)$ is assigned to each node through the hierarchical partitioning in the example of FIG. 6(a) is shown by using a quadtree graph. Each node enclosed by □□ shown in FIG. 6(b) is a node (coding block) to which a coding mode $m(B^n)$ is assigned.

Information about this quadtree graph is outputted from the encoding controlling unit 2 to the variable length encoding unit 13 together with the coding mode $m(B^n)$, and is multiplexed into a bitstream.

When the coding mode $m(B^n)$ determined by the encoding controlling unit 2 is an intra coding mode (when $m(B^n) \in INTRA$), the select switch 3 outputs the coding block $B^n$ outputted from the block partitioning unit 1 to the intra prediction unit 4.

In contrast, when the coding mode m(B″) determined by the encoding controlling unit 2 is an inter coding mode (when m(B″)∈INTER), the select switch outputs the coding block B″ outputted from the block partitioning unit 1 to the motion-compensated prediction unit 5.

When the coding mode m(B″) determined by the encoding controlling unit 2 is an intra coding mode (in the case of m(B″)∈INTRA), and the intra prediction unit 4 receives the coding block B″ from the select switch 3 (step ST3), the intra prediction unit 4 carries out the intra prediction process on each prediction block $P_i^n$ in the coding block B″ by using the intra prediction parameter determined by the encoding controlling unit 2 while referring to the local decoded image stored in the memory 10 for intra prediction, to generate an intra prediction image $P_{INTRAi}^n$ (step ST4).

Although the details will be described below, because already-encoded pixels adjacent to the target block for prediction are used when performing the process of generating an intra prediction image, the process of generating an intra prediction image must be always performed on a per transformation block basis in such a way that the pixels adjacent to the target block for prediction which are used for the prediction process have been already encoded.

Accordingly, for a coding block in which the coding mode is an intra coding mode, the selectable block sizes of the transformation blocks are limited to sizes equal to or smaller than the size of the prediction blocks. In addition, when each transformation block is smaller than a prediction block (when a plurality of transformation blocks exist in a prediction block), an intra prediction process using the intra prediction parameter determined for this prediction block is performed and the process of generating an intra prediction image is performed on a per transformation block basis.

Because the image decoding device needs to generate an intra prediction image which is completely the same as the intra prediction image $P_{INTRAi}^n$ the intra prediction parameter used for generating the intra prediction image $P_{INTRAi}^n$ is outputted from the encoding controlling unit 2 to the variable length encoding unit 13, and is multiplexed into the bitstream.

The details of the processing performed by the intra prediction unit 4 will be mentioned below.

When the coding mode m(B″) determined by the encoding controlling unit 2 is an inter coding mode (in the case of m(B″)∈INTER), and the motion-compensated prediction unit 5 receives the coding block B″ from the select switch 3 (step ST3), the motion-compensated prediction unit 5 compares each prediction block $P_i^n$ in the coding block B″ with the local decoded image which is stored in the motion-compensated prediction frame memory 12 and on which the filtering process is performed to search for a motion vector, and carries out the inter prediction process on each prediction block $P_i^n$ in the coding block B″ by using both the motion vector and the inter prediction parameter determined by the encoding controlling unit 2, to generate an inter prediction image $P_{INTERi}^n$ (step ST5).

Because the image decoding device needs to generate an inter prediction image which is completely the same as the inter prediction image $P_{INTERi}^n$ the inter prediction parameter used for generating the inter prediction image $P_{INTERi}^n$ is outputted from the encoding controlling unit 2 to the variable length encoding unit 13, and is multiplexed into the bitstream.

The motion vector which is searched for by the motion-compensated prediction unit 5 is also outputted to the variable length encoding unit 13 and is multiplexed into the bitstream.

When receiving the coding block B″ from the block partitioning unit 1, the subtracting unit 6 subtracts the intra prediction image $P_{INTRAi}^n$ generated by the intra prediction unit or the inter prediction image $P_{INTERi}^n$ generated by the motion-compensated prediction unit 5 from the prediction block $P_i^n$ in the coding block B″, and outputs a prediction difference signal $e_i^n$ showing a difference image which is the result of the subtraction to the transformation/quantization unit 7 (step ST6).

When receiving the prediction difference signal $e_i^n$ from the subtracting unit 6, the transformation/quantization unit 7 refers to the transformation block partitioning information included in the prediction difference coding parameters determined by the encoding controlling unit 2, and performs an orthogonal transformation process (e.g., an orthogonal transformation process, such as a DCT (discrete cosine transform), a DST (discrete sine transform), or a KL transform in which bases are designed for a specific learning sequence in advance) on the prediction difference signal $e_i^n$ on a per transformation block basis, to calculate transform coefficients.

The transformation/quantization unit 7 also refers to the quantization parameter included in the prediction difference coding parameters and quantizes the transform coefficients of each transformation block, and outputs compressed data which are the transform coefficients quantized thereby to the inverse quantization/inverse transformation unit 8 and the variable length encoding unit 13 (step ST7). At that time, the transformation/quantization unit can perform the quantization process by using a quantization matrix for performing scaling on the quantization step size calculated from the above-described quantization parameter for each transform coefficient.

As the quantization matrix, a matrix which is independent for each chrominance signal and for each coding mode (intra encoding or inter encoding) at each orthogonal transformation size can be used, and either the selection of a quantization matrix from a quantization matrix which is prepared, as an initial value, in advance and in common between the image encoding device and the image decoding device and an already-encoded quantization matrix or the use of a new quantization matrix can be selected.

Thus, the transformation/quantization unit 7 sets, to a quantization matrix parameter to be encoded, flag information showing whether or not to use a new quantization matrix for each chrominance signal and for each coding mode at each orthogonal transformation size.

In addition, when anew quantization matrix is used, each of the scaling values in a quantization matrix as shown in FIG. 10 is set as a quantization matrix parameter to be encoded.

In contrast, when a new quantization matrix is not used, an index specifying a matrix to be used from a quantization matrix which is prepared, as an initial value, in advance and in common between the image encoding device and the image decoding device and an already-encoded quantization matrix is set to the quantization matrix parameter to be encoded. However, when no already-encoded quantization matrix which can be referred to exists, only a quantization matrix prepared in advance and in common between the image encoding device and the image decoding device can be selected.

The transformation/quantization unit 7 then outputs the quantization matrix parameter set thereby to the variable length encoding unit 13.

When receiving the compressed data from the transformation/quantization unit 7, the inverse quantization/inverse transformation unit 8 refers to the quantization parameter and the transformation block partitioning information which are included in the prediction difference coding parameters determined by the encoding controlling unit 2, and inverse-quantizes the compressed data on a per transformation block basis.

When the transformation/quantization unit 7 uses a quantization matrix for the quantization process, the inverse quantization/inverse transformation unit carries out a corresponding inverse quantization process by referring to the quantization matrix also at the time of the inverse quantization process.

The inverse quantization/inverse transformation unit 8 also performs an inverse orthogonal transformation process (e.g., an inverse DCT, an inverse DST, an inverse KL transform, or the like) on the transform coefficients, which are the compressed data inverse-quantized, on a per transformation block basis, and calculates a local decoding prediction difference signal corresponding to the prediction difference signal $e_i''$ outputted from the subtracting unit 6 and outputs the local decoding prediction difference signal to the adding unit 9 (step ST8).

When receiving the local decoding prediction difference signal from the inverse quantization/inverse transformation unit 8, the adding unit 9 calculates a local decoded image by adding the local decoding prediction difference signal and either the intra prediction image $P_{INTRAi}''$ generated by the intra prediction unit 4 or the inter prediction image $P_{INTERi}''$ generated by the motion-compensated prediction unit 5 (step ST9).

The adding unit 9 outputs the local decoded image to the loop filter unit 11, and also stores the local decoded image in the memory 10 for intra prediction.

This local decoded image is a coded image signal which is used at the time of subsequent intra prediction processes.

When receiving the local decoded image from the adding unit 9, the loop filter unit 11 performs the predetermined filtering process on the local decoded image, and stores the local decoded image filtering-processed thereby in the motion-compensated prediction frame memory 12 (step ST10).

Concretely, the loop filter unit performs a filtering (deblocking filtering) process of reducing a distortion occurring at a boundary between transformation blocks and a distortion occurring at a boundary between prediction blocks, a process (pixel adaptive offset process) of adaptively adding an offset on a per pixel basis, an adaptive filtering process of adaptively switching among linear filters, such as Wiener filters, and performing a filtering process, and so on.

The loop filter unit 11 determines whether or not to perform the process for each of the above-described filtering processes including the deblocking filtering process, the pixel adaptive offset process, and the adaptive filtering process, and outputs the enable flag of each of the processes, as a part of the sequence level header and a part of the slice level header, to the variable length encoding unit 13. When a plurality of filtering processes as described above are used, the filtering processes are performed sequentially. FIG. 11 shows an example of the configuration of the loop filter unit 11 in the case of using a plurality of filtering processes.

In general, as the number of types of filtering processes to be used increases, the image quality improves while the processing load increases. More specifically, there is a trade-off between the image quality and the processing load. Also, the image quality improving effect of each filtering process differs depending upon the characteristics of the image which is the target for filtering process. Thus, the filtering process to be used can be determined according to the processing load acceptable to the image encoding device and the characteristics of the image on which the encoding process is to be performed.

In the deblocking filtering process, various parameters to be used for selecting the intensity of the filter applied to a block boundary can be changed from initial values. When changing a parameter, the parameter is outputted to the variable length encoding unit 13 as header information.

In the pixel adaptive offset process, the image is partitioned into a plurality of blocks first, a case of not carrying out the offset process is defined as one class classifying method for each of the coding blocks, and one class classifying method is selected from among a plurality of class classifying methods which are prepared in advance.

Next, by using the selected class classifying method, each pixel included in the block is classified into one of classes, and an offset value for compensating for a coding distortion is calculated for each of the classes.

Finally, a process of adding the offset to the luminance value of the local decoded image is performed, thereby improving the image quality of the local decoded image.

As the method of performing a class classification, there are a method (referred to as a BO method) of classifying each pixel into one of classes according to the brightness value of the local decoded image, and a method (referred to as an EO method) of classifying each pixel into one of classes according to the state of a neighboring region around the pixel (e.g., whether or not the neighboring region is an edge portion) for each of the directions of edges.

These methods are prepared in common between the image encoding device and the image decoding device. For example, as shown in FIG. 14, the case of not performing the offset process is defined as one class classifying method, and an index indicating which one of these methods is to be used to perform the class classification is selected for each of the above-described blocks.

Therefore, in the pixel adaptive offset process, the block partitioning information, the index indicating the class classifying method for each block, and the offset information for each block are outputted to the variable length encoding unit 13 as header information.

In the pixel adaptive offset process, for example, the image can be always partitioned into blocks each having a fixed size, such as largest coding blocks, and a class classifying method can be selected for each of the blocks and the adaptive offset process for each class can be performed. In this case, the need for the above-described block partitioning information can be eliminated, the code amount can be reduced by the code amount required for the block partitioning information, and the coding efficiency can be improved.

Further, in the adaptive filtering process, a class classification is carried out on the local decoded image by using a predetermined method, a filter for compensating for a distortion piggybacked on the image is designed for each region (local decoded image) belonging to each class, and the filtering process of filtering this local decoded image is carried out by using the filter.

The filter designed for each class is then outputted to the variable length encoding unit 13 as header information.

As the class classifying method, there are a simple method of partitioning the image into equal parts spatially and a method of performing a classification on a per block basis according to the local characteristics (a variance and so on) of the image. Further, the number of classes used in the adaptive filtering process can be set in advance to be a value common between the image encoding device and the image decoding device, or can be set as a parameter to be encoded.

In comparison with the former, the latter can freely set the number of classes to be used, thereby increasing the image quality improving effect. On the other hand, since the latter encodes the number of classes, the code amount increases by an amount needed for the encoding.

The video encoding device repeatedly performs the processes of steps ST3 to ST9 until the video encoding device completes the processing on all the coding blocks $B^n$ into which the inputted image is partitioned hierarchically, and, when completing the processing on all the coding blocks $B^n$, shifts to a process of step ST13 (steps ST11 and ST12).

The variable length encoding unit 13 variable-length-encodes the compressed data outputted from the transformation/quantization unit 7, the block partitioning information about the inside of each largest coding block, which is outputted from the encoding controlling unit 2 (the quadtree information which is shown in FIG. 6(b) as an example), the coding mode m($B^n$) and the prediction difference coding parameters, the intra prediction parameter (when the coding mode is an intra coding mode) or the inter prediction parameter (when the coding mode is an inter coding mode) which is outputted from the encoding controlling unit 2, and the motion vector outputted from the motion-compensated prediction unit 5 (when the coding mode is an inter coding mode), and generates encoded data showing those encoded results (step ST13).

At that time, as a method of encoding the compressed data which are the quantized orthogonal transformation coefficients, each transformation block is further partitioned into blocks (coding sub-blocks) of 4×4 pixels each of which is called a Coefficient Group (CG), and a process of encoding the coefficients is performed on a per CG basis.

Figure 15:
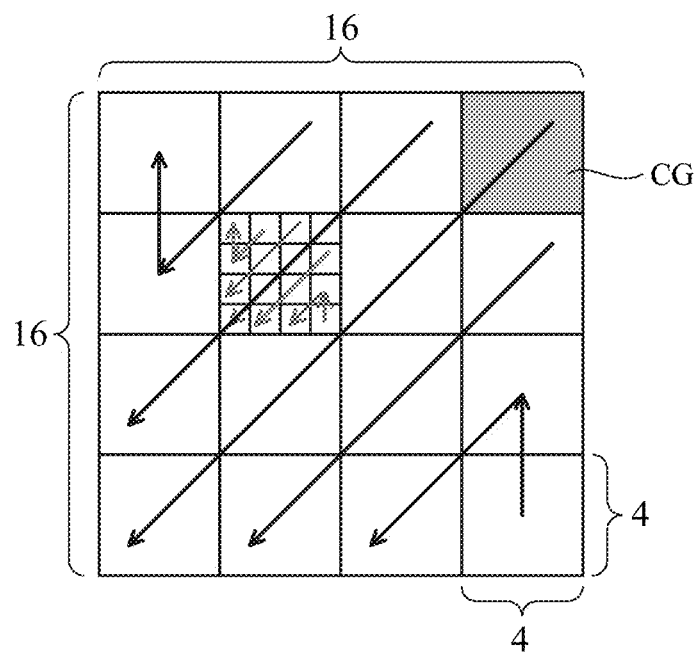
FIG. 15 is an explanatory drawing showing the encoding order of transform coefficients in orthogonal transformation on a size of 16×16 pixels.

FIG. 15 shows the order (scanning order) of encoding the coefficients in each 16×16 pixel transformation block.

A process of encoding 16 CGs of 4×4 pixels is performed in order from the CG at the lower right corner in this way, and the 16 coefficients in each CG are further encoded in order from the coefficient at the lower right corner.

Concretely, flag information showing whether a significant (non-zero) coefficient exists in the 16 coefficients in the CG is encoded first, whether or not each coefficient in the CG is a significant (non-zero) coefficient is then encoded in the above-described order only when a significant (non-zero) coefficient exists in the CG, and, for each significant (non-zero) coefficient, information about its coefficient value is finally encoded in order. This process is performed in the above-mentioned order on a per CG basis.

At that time, it is preferable to configure the scanning order in such a way that significant (non-zero) coefficients appear as consecutively as possible, thereby being able to improve the coding efficiency according to the entropy encoding.

Figure 16:
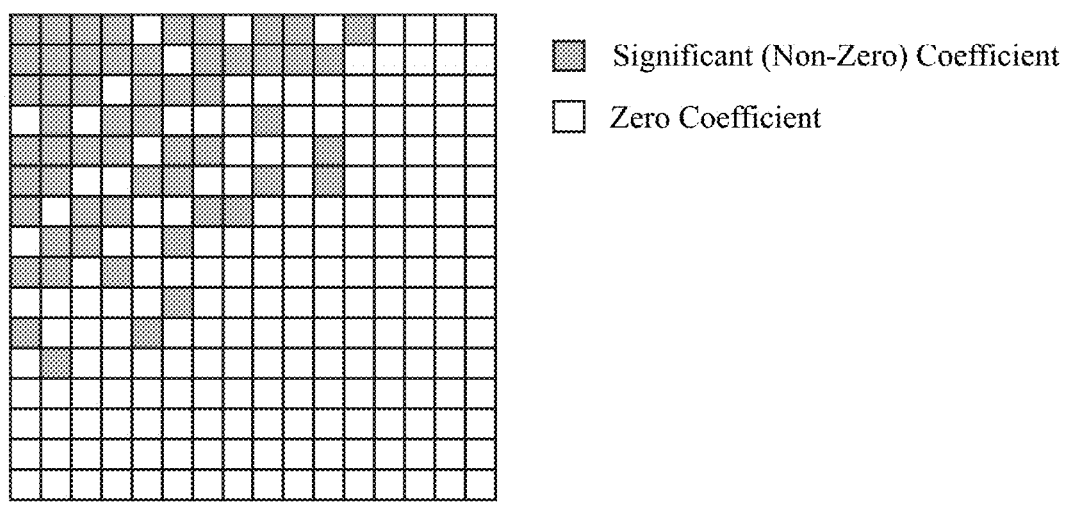
FIG. 16 is an explanatory drawing showing an example of the distribution of transform coefficients in orthogonal transformation on a size of 16×16 pixels.

Because the coefficients after orthogonal transformation, starting with the dc component located at the upper left corner, represent the coefficients of components having a frequency which decreases as they approach the upper left corner, and therefore, in general, significant (non-zero) coefficients appear more frequently as they approach the upper left corner, as shown in the example shown in FIG. 16, the coefficients can be encoded efficiently by encoding them in order from the coefficient at the lower right corner, as shown in FIG. 15.

Although 16×16 pixel transformation blocks are explained in the above-described example, an encoding process for each CG (coding sub-block) is assumed to be performed also on transformation blocks having a block size other than 16×16 pixels, such as 8×8 or 32×32 pixel transformation blocks.

The variable length encoding unit 13 also encodes sequence level headers and picture level headers as header information of an encoded bitstream, as illustrated in FIG. 13, and generates an encoded bitstream as well as picture data.

The picture data is configured with one or more pieces of slice data, and each slice data is acquired by aggregating the slice level header and the above-described encoded data contained in the slice.

A sequence level header is generally a combination of pieces of header information which are common on a per sequence basis, the pieces of header information including the image size, the chrominance signal format, the bit depths of the signal values of the luminance signal and the color difference signals, and the enable flag information about each of the filtering processes (the adaptive filtering process, the pixel adaptive offset process, and the deblocking filtering process) which are performed on a per sequence basis by the loop filter unit 11, the enable flag information of the quantization matrix, a flag showing whether or not field encoding is performed, and so on.

A picture level header is a combination of pieces of header information which are set on a per picture basis, the pieces of header information including an index of a sequence level header to be referred to, the number of reference pictures at the time of motion compensation, a probability table initialization flag for entropy coding, and so on.

A slice level header is a combination of parameters which are set on a per slice basis, the parameters including position information showing at which position of the picture the corresponding slice exists, an index indicating which picture level header is to be referred to, the coding type of the slice (intra coding, inter coding, or the like), the flag information showing whether or not to perform each of the filtering processes in the loop filter unit 11 (the adaptive filtering process, the pixel adaptive offset process, and the deblocking filtering process), and so on.

Next, the processing carried out by the intra prediction unit 4 will be explained in detail.

The intra prediction unit 4 refers to the intra prediction parameter of each prediction block $P_i^n$ and performs the intra prediction process on the prediction block $P_i^n$ to generate an intra prediction image $P_{INTRAi}^n$ as mentioned above. Hereafter, an intra process of generating an intra prediction image of each prediction block $P_i^n$ in the luminance signal will be explained.

Figure 7:
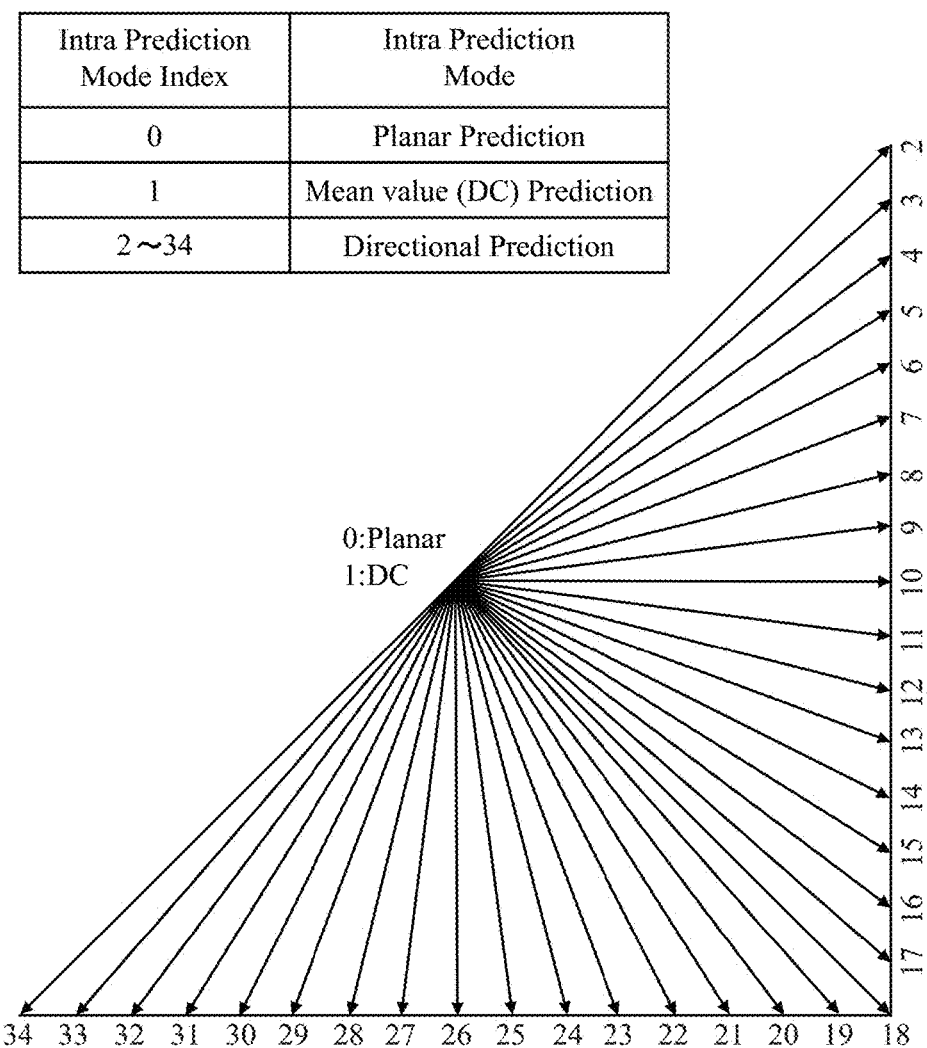
FIG. 7 is an explanatory drawing showing an example of an intra prediction intra prediction mode which can be selected for each prediction block $P_i^n$ in a coding block B$^n$.

FIG. 7 is an explanatory drawing showing an example of intra prediction modes each of which can be selected for each prediction block $P_i^n$ in the coding block $B^n$, and shows the index values of the intra prediction modes and prediction direction vectors respectively indicated by the intra prediction modes. The index value of each of the above-described intra prediction modes shows the intra prediction parameter.

The number of intra prediction modes can be configured to differ according to the size of the block which is the target for processing.

By providing a configuration in which the number of intra prediction directions which can be selected is made to be small for a block having a larger size because the efficiency of intra prediction degrades whereas the number of intra prediction directions which can be selected is made to be large for a block having a smaller size, the amount of computations can be suppressed.

First, because the process of generating an intra prediction image employs an already-encoded pixel adjacent to the block which is the target for processing, the process must be performed on a per transformation block basis, as mentioned above.

Hereafter, a transformation block for which an intra prediction image is to be generated is referred to as a prediction image generation block. Therefore, the intra prediction unit 4 performs an intra prediction image generating process, which will be mentioned blow, on a per prediction image generation block basis, to generate an intra prediction image of the prediction block $P_i^n$.

It is assumed that the size of a prediction image generation block is $l_i^n \times m_i^n$ pixels.

Figure 8:
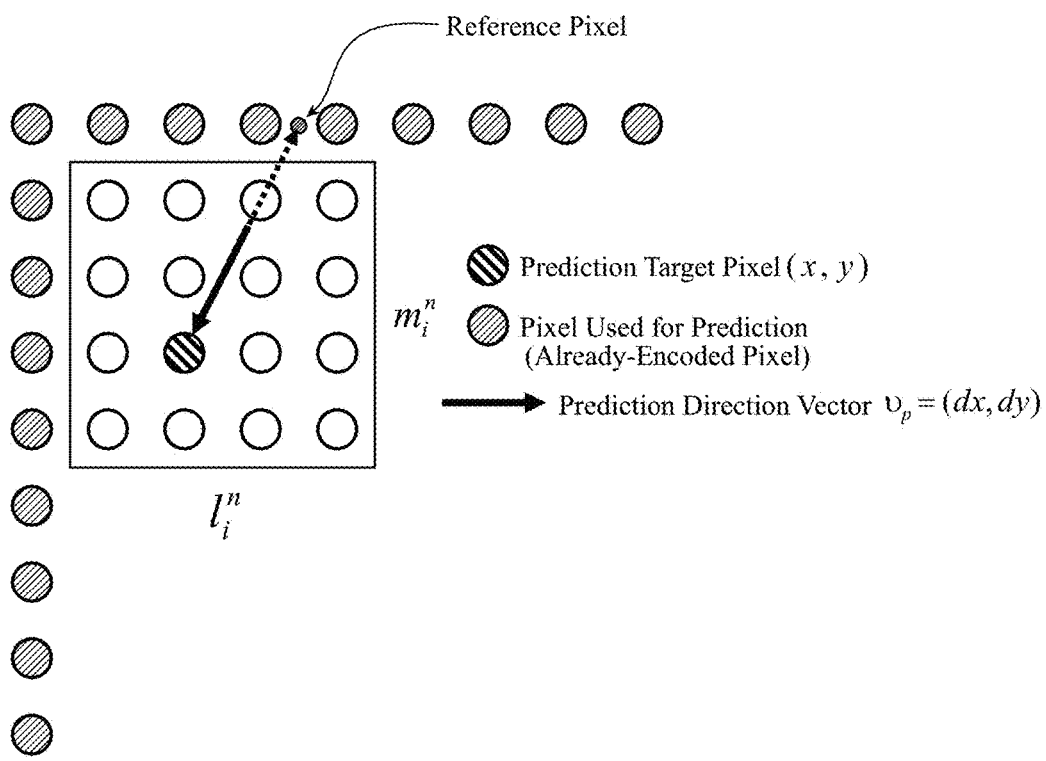
FIG. 8 is an explanatory drawing showing an example of pixels which are used when generating a predicted value of each pixel in a prediction image generation block in the case of $l_i^n = m_i^n = 4$.

FIG. 8 is an explanatory drawing showing an example of pixels which are used when generating a predicted value of each pixel in the prediction image generation block in the case of $l_i^n = m_i^n = 4$.

Although ($2 \times l_i^n + 1$) already-encoded pixels located on the top of the prediction image generation block and ($2 \times m_i^n$) already-encoded pixels located to the left of the prediction image generation block are set as the pixels used for prediction in the example of FIG. 8, the number of pixels used for prediction can be larger or smaller than that of the pixels shown in FIG. 8.

Further, although one row or column of pixels adjacent to the prediction image generation block are used for prediction in the example shown in FIG. 8, two or more rows or columns of pixels can be alternatively used for prediction.

When the index value indicating the intra prediction mode for the prediction block $P_i^n$ to which the prediction image generation block belongs is 0 (planar prediction), by using already-encoded pixels adjacent to the top of the prediction image generation block and already-encoded pixels adjacent to the left of the prediction image generation block, the intra prediction unit determines a value interpolated according to the distances between these pixels and the target pixel for prediction in the prediction image generation block as a predicted value and generates a prediction image.

When the index value indicating the intra prediction mode for the prediction block $P_i^n$ to which the prediction image generation block belongs is 1 (mean value (DC) prediction), the intra prediction unit determines the mean value of the already-encoded pixels adjacent to the top of the prediction image generation block and the already-encoded pixels adjacent to the left of the prediction image generation block as the predicted value of each pixel in the prediction image generation block and generates a prediction image.

Figure 17:
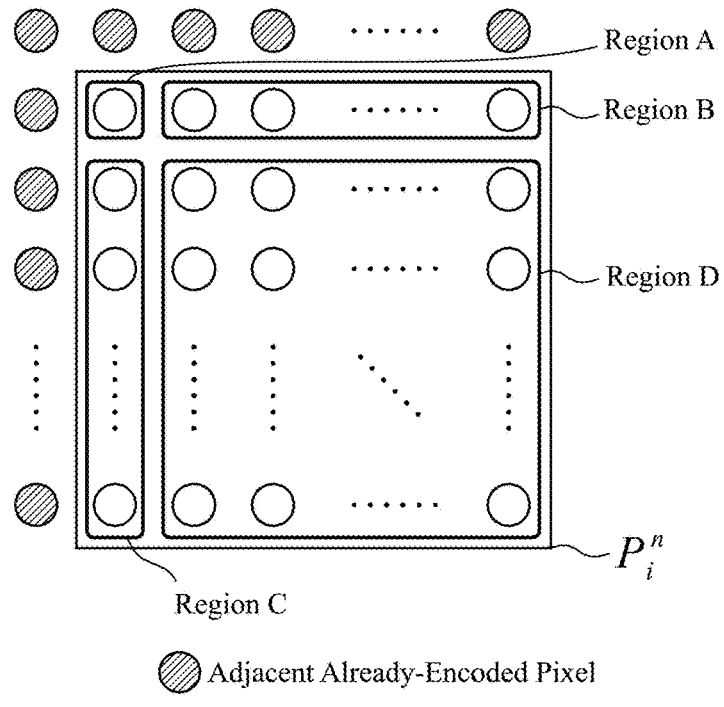
FIG. 17 is an explanatory drawing showing regions for which switching of filters is performed in a filtering process at the time of a mean value prediction.
Figure 18:
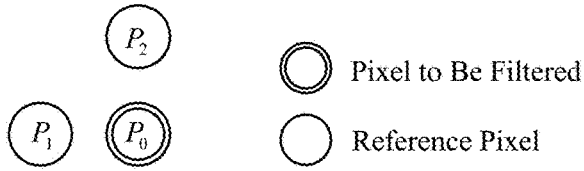
FIG. 18 is an explanatory drawing showing the arrangement of reference pixels in the filtering process at the time of the mean value prediction.

In addition, a filtering process of smoothing a block boundary is performed on regions A, B, and C of FIG. 17 located at the upper edge and at the left edge of the prediction image generation block, and a final prediction image is generated. For example, in the case of the arrangement, as shown in FIG. 18, of reference pixels of the filter, according to the following equation (1), the filtering process is performed by using the following filter coefficients.

$$S'(p_0) = a_0 S(p_0) + a_1 S(p_1) + a_2 S(p_2) \quad (1)$$

Region A (the pixel at the upper left corner of the partition $P_i^n$)

$a_0 = 1/2, a_1 = 1/4, a_2 = 1/4$

Region B (the pixels at the upper edge of the partition $P_i^n$, except the region A)

$a_0 = 3/4, a_2 = 1/4, (a_1 = 0)$

Region C (the pixels at the left edge of the partition $P_i^n$, except the region A)

$a_0 = 3/4, a_1 = 1/4, (a_2 = 0)$

In the equation (1) $a_n$ (n=0, 1, 2) denotes the filter coefficient by which each reference pixel is multiplied, $p_n$ (n=0, 1, 2) denotes each reference pixel of the filter, including the target pixel $p_0$ for filtering process, $S'(p_0)$ denotes the predicted value after the filtering process in the target pixel $p_0$ for filtering process, and $S(p_n)$ (n=0, 1, 2) denotes the predicted value before the filtering process of each reference pixel including the target pixel $p_0$ for filtering process.

In addition, the block size of the prediction image generation block on which the above-described filtering process is to be performed can be limited.

In general, because when the filtering process is performed only on a block edge to change the predicted value, a block having a large block size has a small ratio of occupation of a region in which the predicted value varies due to the filtering process, a change of a prediction residual signal which is caused by this variation in the predicted value is expressed by a very high frequency component, and there is a tendency that degradation of the coding efficiency is caused because of the encoding of this high frequency component. Further, when preventing this high frequency component from being encoded while giving a priority to the coding efficiency, there is a tendency that a change of the prediction residual signal of a block edge cannot be restored and a distortion is caused at a block boundary.

On the other hand, because a block having a small block size has a large ratio of occupation of a region in which the predicted value varies due to the filtering process, a change of the prediction residual signal which is caused by this variation in the predicted value is not expressed by such a high frequency component as mentioned at the time of a block having a large block size, and the residual signal can be encoded appropriately and the quality of the decoded image can be improved by such an extent that the continuity of a block boundary is improved by using this filtering process.

Accordingly, for example, by, instead of applying the above-described filtering process to prediction image generation blocks having a block size of 32×32 pixels or more, applying the above-described filtering process only to blocks having a size smaller than 32×32 pixels, increase in the amount of computations can be suppressed while improving the prediction performance as compared with that of the conventional mean value prediction.

When the index value indicating the intra prediction mode for the prediction block $P_i^n$ to which the prediction image generation block belongs is 26 (vertical prediction), the intra prediction unit calculates the predicted value of each pixel in the prediction image generation block according to the following equation (2), and generates a prediction image.

$$S'(x, y) = \begin{cases} S(x, -1) + (S(-1, y) - S(-1, -1)) \gg 1 & (x \le 0) \\ S(x, -1) & (x > 0) \end{cases} \quad (2)$$

In this equation, coordinates (x, y) are relative coordinates (refer to FIG. 9) acquired with the pixel at the upper left corner in the prediction image generation block being defined as the point of origin, $S'(x, y)$ is the predicted value at the coordinates (x, y), and $S(x, y)$ is the brightness value (decoded brightness value) of the already-encoded pixel at the coordinates (x, y). Further, when the calculated predicted value exceeds a range of values which the brightness value can have, the predicted value is rounded in such a way as to fall within the range.

An expression in the first line of the equation (2) means that by adding a value which is one-half of the amount of change (S(−1, y)−S(−1, −1)) in the vertical direction of the brightness values of adjacent already-encoded pixels to S(x, −1) which is the predicted value acquired by the vertical prediction in MPEG-4 AVC/H.264, the filtering process is performed in such a way that a block boundary is smoothed, and an expression in the second line of the equation (2) shows the same prediction expression as that for the vertical prediction in MPEG-4 AVC/H.264.

When the index value indicating the intra prediction mode for the prediction block $P_i^n$ to which the prediction image generation block belongs is 10 (horizontal prediction), the intra prediction unit calculates the predicted value of each pixel in the prediction image generation block according to the following equation (3), and generates a prediction image.

$$S'(x, y) = \begin{cases} S(-1, y) + (S(x, -1) - S(-1, -1)) \gg 1 & (y \leq 0) \\ S(-1, y) & (y > 0) \end{cases} \quad (3)$$

In this equation, coordinates (x, y) are relative coordinates (refer to FIG. 9) acquired with the pixel at the upper left corner in the prediction image generation block being defined as the point of origin, S'(x, y) is the predicted value at the coordinates (x, y), and S(x, y) is the brightness value (decoded brightness value) of the already-encoded pixel at the coordinates (x, y). Further, when the calculated predicted value exceeds a range of values which the brightness value can have, the predicted value is rounded in such a way as to fall within the range.

An expression in the first line of the equation (3) means that by adding a value which is one-half of the amount of change (S(x, −1)−S(−1, −1)) in the horizontal direction of the brightness values of adjacent already-encoded pixels to S(−1, y) which is the predicted value acquired by the horizontal prediction in MPEG-4 AVC/H.264, the filtering process is performed in such a way that a block boundary is smoothed, and an expression in the second line of the equation (3) shows the same prediction expression as that for the horizontal prediction in MPEG-4 AVC/H.264.

The block size of the prediction image generation block on which the vertical prediction according to the equation (2) and the horizontal prediction according to the equation (3) are to be performed can be limited.

In general, because when a filtering process of adding a value proportional to the amount of change of the brightness value in the prediction direction is performed only on a block edge so as to change the predicted value, a block having a large block size has a small ratio of occupation of a region in which the predicted value varies due to the above-described filtering process on the block edge of the prediction image generation block, a change of the prediction residual signal which is caused by this variation in the predicted value is expressed by a very high frequency component, and there is a tendency that degradation of the coding efficiency is caused because of encoding of this high frequency component. Further, when preventing this high frequency component from being encoded while giving a priority to the coding efficiency, there is a tendency that a change of the prediction residual signal of a block edge cannot be restored and a distortion is caused at a block boundary.

On the other hand, because a block having a small block size has a large ratio of occupation of a region in which the predicted value varies due to the filtering process, a change of the prediction residual signal which is caused by this variation in the predicted value is not expressed by such a high frequency component as mentioned at the time of a block having a large block size, and the residual signal can be encoded appropriately and the quality of the decoded image can be improved by such an extent that the continuity of a block boundary is improved by using this filtering process.

Accordingly, for example, by, for a prediction image generation block having a block size of 32×32 pixels or more, always using the expressions in the second lines of the equations (2) and (3) regardless of the coordinates of the target pixel for prediction (not performing the filtering process on the block edges of the prediction image generation block), and applying the equations (2) and (3) according to which the above-described filtering process is performed only to blocks having a size smaller than 32×32 pixels, increase in the amount of computation can be suppressed while improving the prediction performance as compared with those of the conventional vertical and horizontal predictions.

When the index value indicating an intra prediction mode is other than 0 (planar prediction), 1 (mean value prediction), 26 (vertical prediction), and 10 (horizontal prediction), the intra prediction unit generates the predicted value of each pixel in the prediction image generation block on the basis of the prediction direction vector $u_p$=(dx, dy) shown by the index value.

As shown in FIG. 9, when the relative coordinates of each pixel in the prediction image generation block are expressed as (x, y) with the pixel at the upper left corner of the prediction image generation block being defined as the point of origin, each reference pixel which is used for prediction is located at a point of intersection of L shown below and an adjacent pixel.

$$L = \begin{pmatrix} x \\ y \end{pmatrix} + kv_p \quad (4)$$

where k is a negative real number.

When a reference pixel is at an integer pixel position, the value of the integer pixel is determined as the predicted value of the target pixel for prediction, whereas when a reference pixel is not at an integer pixel position, the value of an interpolation pixel generated from integer pixels which are adjacent to the reference pixel is determined as the predicted value.

In the example shown in FIG. 8, because a reference pixel is not located at an integer pixel position, the predicted value is interpolated from the values of two pixels adjacent to the reference pixel. The intra prediction unit can use, instead of only the adjacent two pixels, adjacent two or more pixels to generate an interpolation pixel and determine the value of this interpolation pixel as the predicted value.

While the increase in the number of pixels used for the interpolation process provides an advantage of improving the accuracy of interpolation of an interpolation pixel, because the degree of complexity of computations required for the interpolation process increases, it is preferable to generate an interpolation pixel from a larger number of pixels in a case in which the image encoding device requires high encoding performance even if the arithmetic load is large.

Through the process described above, the intra prediction unit generates prediction pixels for all the pixels of the luminance signal in the prediction block $P_i^n$ on a per prediction image generation block basis, and outputs an intra prediction image $P_{INTRAi}^n$.

The intra prediction parameter (intra prediction mode) used for the generation of the intra prediction image $P_{INTRAi}^n$ is outputted to the variable length encoding unit 13 in order to multiplex the intra prediction parameter into the bitstream.

Like in the case of performing a smoothing process on a reference pixel at the time of performing an intra prediction on an 8×8-pixel block in MPEG-4 AVC/H.264 explained previously, even if the intra prediction unit 4 is configured in such a way that an already-encoded pixel adjacent to the prediction image generation block on which a smoothing process is performed is provided as the reference pixel at the time of generating a prediction image of the prediction image generation block, the filtering process which is the same as that in the above-described example can be performed on the prediction image. By doing in this way, the noise of the reference pixel which is caused by the filtering process on the reference pixel can be removed, and the accuracy of the prediction can be improved by performing the prediction by using this configuration.

As an alternative, the above-described filtering process on the reference pixel can be configured to be performed only at the time of a prediction including the step of performing the filtering process on the prediction image, other than the mean value prediction, the vertical prediction, and the horizontal prediction. By doing in this way, the intra prediction unit has only to perform one filtering process at the maximum for each prediction mode, and the increase in the amount of computations can be suppressed.

Although the process of generating a prediction image of the luminance signal is explained above, prediction images for the color difference components are generated as follows.

The intra prediction unit performs an intra prediction process based on the intra prediction parameter (intra prediction mode) of the color difference signals on the color difference signals of the prediction block $P_i^n$, and outputs the intra prediction parameter used for the generation of the intra prediction image to the variable length encoding unit 13.

FIG. 22 is an explanatory drawing showing an example of the correspondence between the intra prediction parameter (index value) and the color difference intra prediction mode of the color difference signals.

When the intra prediction parameter of the color difference signals shows that the same prediction mode as the intra prediction mode for the luminance signal is used (when the intra prediction parameter shows the intra prediction mode common between the luminance and the color differences (DM mode)), the intra prediction unit performs the same intra-frame prediction as that on the luminance signal, to generate prediction images of the color difference signals.

Further, when the intra prediction parameter of the color difference signals shows the vertical prediction mode or the horizontal prediction mode, the intra prediction unit performs a directional prediction on the color difference signals to generate prediction images of the color difference signals.

Further, when the intra prediction parameter of the color difference signals shows the color difference signal prediction mode using a luminance correlation (LM mode), the intra prediction unit calculates a correlation parameter showing the correlation between the luminance signal and the color difference signals by using the luminance signals and the color difference signals of a plurality of pixels adjacent to the upper and left sides of a block for which a prediction image is to be generated, and generates prediction images of the color difference signals by using both the correlation parameter and the luminance signal associated with the block of each of the color difference signals which is the target for prediction process.

The intra prediction unit can be configured to perform the process in the above-described DM mode or the above-described LM mode and prevent itself from selecting another prediction mode when the input signal format is the YUV4:4:4 signal format. Because there is a high correlation between the edge position of the luminance signal and those of the color difference signals in a YUV4:4:4 signal, by prohibiting the application of a prediction mode different from that applied to the luminance signal to the color difference signals, the amount of information in the intra prediction mode of the color difference signals can be reduced and the coding efficiency can be improved.

As a matter of course, the intra prediction unit can be configured to select, for the color difference signals, a directional prediction mode different from that for the luminance signal also in the case of a YUV4:4:4 signal.

Further, when the input signal format is the YUV4:2:2 signal format, if the luminance signal is a square block, each of the color difference signals is a rectangular block in which the number of pixels in the horizontal direction is half as compared with that of the luminance signal, as shown in FIG. 24. Therefore, in order to apply a prediction in the same direction to the luminance signal and the color difference signals when a YUV4:4:4 signal is converted into a YUV4:2:2 signal, the prediction direction of the color difference signals is made to differ from that of the luminance signal on the YUV4:2:2 signal in the case of a directional prediction other than the vertical prediction and the horizontal prediction, as shown in FIG. 25.

Concretely, when the prediction direction vector of the luminance signal is expressed by $v_L=(dx_L, dy_L)$, the prediction direction vector of each of the color difference signals is expressed by $v_C=(dx_L/2, dy_L)$, as shown in FIG. 26. More specifically, when the angle of the prediction direction is expressed by θ, it is necessary to perform a prediction in a prediction direction having a relation shown by $\tan θ_C = 2 \tan θ_L$, where the angle of the prediction direction of the luminance signal is expressed by $θ_L$ and the angle of the prediction direction of each of the color difference signals is expressed by $θ_C$, as shown in FIG. 27.

Therefore, in order to make it possible to normally perform the above-described DM mode in which a prediction in the same direction is performed on the luminance signal and the color difference signals, when the input signal format is the YUV4:2:2 signal format, the intra prediction unit converts an index of the intra prediction mode which is used for the luminance signal into an index of the intra prediction mode which is used for the prediction on the color difference signals, and performs the prediction process on the color difference signals according to the intra prediction mode corresponding to the converted index.

FIG. 28 shows an example of the conversion of the intra prediction mode index in the intra prediction mode of FIG. 7.

The conversion table of FIG. 28 is an example of a table for performing conversion into an angle $θ_C$ which is the closest to the following relation: $\tan θ_C = 2 \tan θ_L$ in the case of an angle at which the directional prediction in the intra prediction mode is given by tan θ shown in FIG. 29, where the angle of the prediction direction is expressed by θ (refer to FIG. 27).

The implementation of the conversion process can be configured in such a way that a conversion table for the index is prepared and the intra prediction unit converts the index by referring to the conversion table, as described above, or a conversion equation is prepared and the intra prediction unit converts the index according to the conversion equation.

Because the intra prediction unit is configured in this way, the intra prediction unit can perform an appropriate prediction on the color difference signals according to the YUV4:2:2 signal format only by performing the conversion of the index without changing the directional prediction process itself.

Further, the intra prediction unit can be configured in such a way as to prevent itself from performing the above-described LM mode on the color difference signals. As an example of the correspondence between the intra prediction parameter (index value) and the color difference intra prediction mode of the color difference signals at that time, an example of FIG. 23 is provided.

Because by thus configuring the intra prediction unit in such a way as not to use the LM mode as well, the dependence between the luminance signal and the color difference signals of the target pixel for prediction is eliminated, parallelization of the prediction process on the luminance signal and that on the color difference signals is enabled, and high-speed arithmetic processing can be implemented.

In addition, as to the vertical prediction and the horizontal prediction on the color difference signals, the same prediction method as that in MPEG-4 AVC/H.264 can be used without performing the filtering process on a block boundary. By not performing the filtering process in this way, a reduction of the amount of computations of the prediction process can be achieved.

Next, the processing performed by the image decoding device shown in FIG. 3 will be explained concretely.

When receiving the encoded bitstream generated by the image encoding device of FIG. 1, the variable length decoding unit 31 performs the variable length decoding process on the bitstream (step ST21 of FIG. 4), and decodes the header information (sequence level header) about each sequence which consists of one or more frames of pictures and the header information (picture level header) about each picture, the filter parameter for use in the loop filter unit 38, and the quantization matrix parameter.

At that time, when the enable flag information of the quantization matrix included in the above-described header information shows "enabled", the variable length decoding unit 31 variable-length-decodes the quantization matrix parameter and specifies the quantization matrix.

Concretely, for each chrominance signal and for each coding mode at each orthogonal transformation size, when the quantization matrix parameter shows that either a quantization matrix which is prepared, as an initial value, in advance and in common between the image encoding device and the image decoding device, or an already-decoded quantization matrix is used (no new quantization matrix is used), the image decoding device refers to the index information included in the quantization matrix parameter and specifying which quantization matrix in the above-described matrices is used, to specify the quantization matrix, and, when the quantization matrix parameter shows that a new quantization matrix is used, specifies, as the quantization matrix to be used, the quantization matrix included in the quantization matrix parameter.

The image decoding device then decodes the header information about each slice (slice level header), such as the slice partitioning information, from each slice data which constructs the data about each picture, and decodes the encoded data about each slice.

The variable length decoding unit 31 also determines the largest coding block size and the upper limit on the number of hierarchical layers partitioned which are determined by the encoding controlling unit 2 of the image encoding device shown in FIG. 1, according to the same procedure as that of the image encoding device (step ST22).

For example, when the largest coding block size and the upper limit on the number of hierarchical layers partitioned are determined according to the resolution of the video signal, the largest coding block size is determined on the basis of the decoded frame size information according to the same procedure as that of the image encoding device.

When the largest coding block size and the upper limit on the number of hierarchical layers partitioned are multiplexed into the sequence level header or the like by the image encoding device, the values decoded from the above-described header are used. When the smallest block size of the coding blocks, instead of the upper limit on the number of hierarchical layers partitioned, is encoded, the upper limit on the number of hierarchical layers partitioned is determined by decoding this size. More specifically, the number of hierarchical layers in the case of partitioning each largest coding block into blocks having the above-described smallest block size is the upper limit on the number of hierarchical layers partitioned.

The variable length decoding unit 31 decodes the partitioning state of a largest coding block as shown in FIG. 6 for each determined largest coding block. On the basis of the decoded partitioning state, the variable length decoding unit determines coding blocks hierarchically (step ST23).

The variable length decoding unit 31 then decodes the coding mode assigned to each coding block. The variable length decoding unit further partitions each coding block into one or more prediction blocks each of which is a unit for prediction process on the basis of the information included in the decoded coding mode, and decodes the prediction parameter assigned to each of the one or more prediction blocks (step ST24).

More specifically, when the coding mode assigned to a coding block is an intra coding mode, the variable length decoding unit 31 decodes the intra prediction parameter for each of the one or more prediction blocks which are included in the coding block and each of which is a unit for prediction process.

In contrast, when the coding mode assigned to a coding block is an inter coding mode, the variable length decoding unit decodes the inter prediction parameter and the motion vector for each of the one or more prediction blocks which are included in the coding block and each of which is a unit for prediction process (step ST24).

The variable length decoding unit 31 further decodes the compressed data (transformed and quantized transform coefficients) for each transformation block on the basis of the transformation block partitioning information included in the prediction difference coding parameters (step ST24).

At that time, the variable length decoding unit performs a process of decoding the coefficients of each CG in the same way that the variable length encoding unit 13 of the image encoding device of FIG. 1 performs the process of encoding the compressed data.

Therefore, as shown in FIG. 15, the variable length decoding unit performs a process of decoding 16 CGs of 4×4 pixels in order from the CG at the lower right corner, and further decodes the 16 coefficients in each CG in order from the coefficient at the lower right corner.

Concretely, the flag information showing whether a significant (non-zero) coefficient exists in the 16 coefficients in the CG is decoded first, whether or not each coefficient in the CG is a significant (non-zero) coefficient is then decoded in the above-described order only when the decoded flag information shows that a significant (non-zero) coefficient exists in the CG, and, for each coefficient showing a significant (non-zero) coefficient, information about the coefficient value is finally decoded in order. This process is performed in the above-mentioned order on a per CG basis.

When the coding mode m(B″) variable-length-decoded by the variable length decoding unit 31 is an intra coding mode (when m(B″)∈INTRA), the select switch 33 outputs the intra prediction parameter of each prediction block, which is variable-length-decoded by the variable length decoding unit 31, to the intra prediction unit 34.

In contrast, when the coding mode m(B″) variable-length-decoded by the variable length decoding unit 31 is an inter coding mode (when m(B″)∈INTER), the select switch outputs the inter prediction parameter and the motion vector of each prediction block, which are variable-length-decoded by the variable length decoding unit 31, to the motion compensation unit 35.

When the coding mode m(B″) variable-length-decoded by the variable length decoding unit 31 is an intra coding mode (m(B″)∈INTRA) (step ST25), the intra prediction unit 34 receives the intra prediction parameter of each prediction block outputted from the select switch 33, and performs an intra prediction process on each prediction block $P_i^n$ in the coding block B″ using the above-described intra prediction parameter while referring to the decoded image stored in the memory 37 for intra prediction, to generate an intra prediction image $P_{INTRAi}^n$, according to the same procedure as that of the intra prediction unit 4 shown in FIG. 1 (step ST26).

Further, as to the luminance signal, the intra prediction unit 34 performs the intra prediction process (intra-frame prediction process) using the above-described intra prediction parameter on the luminance signal, to generate a prediction image of the luminance signal.

On the other hand, as to the color difference signals, the intra prediction unit performs the intra prediction process based on the intra prediction parameter of the color difference signals, to generate prediction images of the color difference signals.

FIG. 22 is an explanatory drawing showing an example of the correspondence between the intra prediction parameter (index value) and the color difference intra prediction mode of the color difference signals.

When the intra prediction parameter of the color difference signals shows that the same prediction mode as the intra prediction mode for the luminance signal is used (when the intra prediction parameter shows the intra prediction mode common between the luminance and the color differences (DM mode)), the intra prediction unit performs the same intra-frame prediction as that on the luminance signal, to generate prediction images of the color difference signals.

Further, when the intra prediction parameter of the color difference signals shows the vertical prediction mode or the horizontal prediction mode, the intra prediction unit performs a directional prediction on the color difference signals to generate prediction images of the color difference signals.

Further, when the intra prediction parameter of the color difference signals shows the color difference signal prediction mode using a luminance correlation (LM mode), the intra prediction unit calculates a correlation parameter showing the correlation between the luminance signal and the color difference signals by using the luminance signals and the color difference signals of a plurality of pixels adjacent to the upper and left sides of a block for which a prediction image is to be generated, and generates prediction images of the color difference signals by using both the correlation parameter and the luminance signal associated with the block of each of the color difference signals which is the target for prediction process.

In a case in which the image encoding device is configured to perform the process in the above-described DM mode or the above-described LM mode and prevent itself from selecting another prediction mode when the input signal format is the YUV4:4:4 signal format, the image decoding device is similarly configured in such a way as to be able to decode the encoded bitstream generated by the image encoding device.

Because there is a high correlation between the edge position of the luminance signal and those of the color difference signals in a YUV4:4:4 signal, by prohibiting the application of a prediction mode different from that applied to the luminance signal to the color difference signals, the amount of information in the intra prediction mode of the color difference signals can be reduced and the coding efficiency can be improved.

Further, when the input signal format is the YUV4:2:2 signal format, if the luminance signal is a square block, each of the color difference signals is a rectangular block in which the number of pixels in the horizontal direction is half as compared with that of the luminance signal, as shown in FIG. 24. Therefore, in order to apply a prediction in the same direction to the luminance signal and the color difference signals when a YUV4:4:4 signal is converted into a YUV4:2:2 signal, the prediction direction of the color difference signals is made to differ from that of the luminance signal on the YUV4:2:2 signal in the case of a directional prediction other than the vertical prediction and the horizontal prediction, as shown in FIG. 25.

Concretely, when the prediction direction vector of the luminance signal is expressed by $v_L=(dx_L, dy_L)$, the prediction direction vector of each of the color difference signals is expressed by $v_C=(dx_L/2, dy_L)$, as shown in FIG. 26. More specifically, when the angle of the prediction direction is expressed by θ, it is necessary to perform a prediction in a prediction direction having a relation shown by $\tan \theta_C = 2 \tan \theta_L$, where the angle of the prediction direction of the luminance signal is expressed by $\theta_L$ and the angle of the prediction direction of each of the color difference signals is expressed by $\theta_C$, as shown in FIG. 27.

Therefore, in order to make it possible to normally perform the above-described DM mode in which a prediction in the same direction is performed on the luminance signal and the color difference signals, when the input signal format is the YUV4:2:2 signal format, the intra prediction unit converts an index of the intra prediction mode which is used for the luminance signal into an index of the intra prediction mode which is used for the prediction on the color difference signals, and performs the prediction process on the color difference signals according to the intra prediction mode corresponding to the converted index.

FIG. 28 shows an example of the conversion of the intra prediction mode index in the intra prediction mode of FIG. 7.

The conversion table of FIG. 28 is an example of a table for performing conversion into an angle $\theta_C$ which is the closest to the following relation: $\tan \theta_C = 2 \tan \theta_L$ in the case of an angle at which the directional prediction in the intra prediction mode is given by tan θ shown in FIG. 29, where the angle of the prediction direction is expressed by θ (refer to FIG. 27).

The implementation of the conversion process can be configured in such a way that a conversion table for the index is prepared and the intra prediction unit converts the index by referring to the conversion table, as described above, or a conversion equation is prepared and the intra prediction unit converts the index according to the conversion equation.

Because the intra prediction unit is configured in this way, the intra prediction unit can perform an appropriate prediction on the color difference signals according to the YUV4:2:2 signal format only by performing the conversion of the index without changing the directional prediction process itself.

Further, in the case in which the image encoding device is configured in such a way as to prevent itself from performing the above-described LM mode on the color difference signals, the image decoding device is similarly configured in such a way as to be able to decode the encoded bitstream generated by the image encoding device.

As an example of the correspondence between the intra prediction parameter (index value) and the color difference intra prediction mode of the color difference signals at that time, the example of FIG. 23 is provided.

Because by thus configuring the intra prediction unit in such a way as not to use the LM mode as well, the dependence between the luminance signal and the color difference signals of the target pixel for prediction is eliminated, parallelization of the prediction process on the luminance signal and that on the color difference signals is enabled, and high-speed arithmetic processing can be implemented.

In addition, in the case in which the image encoding device is configured in such a way as to, as to the vertical prediction and the horizontal prediction on the color difference signals, use the same prediction method as that in MPEG-4 AVC/H.264 without performing the filtering process on a block boundary, the image decoding device is similarly configured in such a way as to be able to decode the encoded bitstream generated by the image encoding device.

By not performing the filtering process in this way, a reduction of the amount of computations of the prediction process can be achieved.

When the coding mode m(B″) variable-length-decoded by the variable length decoding unit 31 is an inter coding mode (m(B″)∈INTER) (step ST25), the motion compensation unit 35 receives the motion vector and the inter prediction parameter of each prediction block which are outputted from the select switch 33, and performs an inter prediction process on each prediction block $P_i''$ in the coding block B″ using the motion vector and the inter prediction parameter while referring to the decoded image which is stored in the motion-compensated prediction frame memory 39 and on which the filtering process is performed, to generate an inter prediction image $P_{INTERi}''$ (step ST27).

When receiving the compressed data and the prediction difference coding parameters from the variable length decoding unit 31, the inverse quantization/inverse transformation unit 32 refers to the quantization parameter and the transformation block partitioning information which are included in the prediction difference coding parameters and inverse-quantizes the compressed data on a per transformation block basis according to the same procedure as that of the inverse quantization/inverse transformation unit 8 shown in FIG. 1.

At that time, the inverse quantization/inverse transformation unit refers to each header information variable-length-decoded by the variable length decoding unit 31, and, when this header information shows that the inverse quantization process is to be performed on the slice currently being processed by using the quantization matrix, performs the inverse quantization process by using the quantization matrix.

At that time, the inverse quantization/inverse transformation unit refers to each header information variable-length-decoded by the variable length decoding unit 31 to specify the quantization matrix to be used for each chrominance signal and for each coding mode (intra coding or inter coding) at each orthogonal transformation size.

The inverse quantization/inverse transformation unit 32 also performs an inverse orthogonal transformation process on the transform coefficients, which are the compressed data inverse-quantized thereby, on a per transformation block basis, to calculate a decoded prediction difference signal which is the same as the local decoding prediction difference signal outputted from the inverse quantization/inverse transformation unit 8 shown in FIG. 1 (step ST28).

The adding unit 36 adds the decoded prediction difference signal calculated by the inverse quantization/inverse transformation unit 32 and either the intra prediction image $P_{INTRAi}''$ generated by the intra prediction unit 34 or the inter prediction image $P_{INTERi}''$ generated by the motion compensation unit 35 to calculate a decoded image and output the decoded image to the loop filter unit 38, and also stores the decoded image in the memory 37 for intra prediction (step ST29).

This decoded image is an already-decoded image signal which is used at the time of subsequent intra prediction processes.

When completing the processes of steps ST23 to ST29 on all the coding blocks B″ (step ST30), the loop filter unit 38 performs a predetermined filtering process on the decoded image outputted from the adding unit 36, and stores the decoded image filtering-processed thereby in the motion-compensated prediction frame memory 39 (step ST31).

Concretely, the loop filter unit performs a filtering (deblocking filtering) process of reducing a distortion occurring at a boundary between transformation blocks and a distortion occurring at a boundary between prediction blocks, a process (pixel adaptive offset process) of adaptively adding an offset on a per pixel basis, an adaptive filtering process of adaptively switching among linear filters, such as Wiener filters, and performing a filtering process, and so on.

However, for each of the above-described filtering processes including the deblocking filtering process, the pixel adaptive offset process, and the adaptive filtering process, the loop filter unit 38 refers to each header information variable-length-decoded by the variable length decoding unit 31 to specify whether or not to perform the process on the slice currently being processed.

At that time, in the case in which the loop filter unit 11 of the image encoding device is configured as shown in FIG. 11, for example, when performing two or more filtering processes, the loop filter unit 38 is configured as shown in FIG. 12.

In the deblocking filtering process, the loop filter unit refers to the header information variable-length-decoded by the variable length decoding unit 31, and, when there exists information for changing the various parameters used for the selection of the intensity of a filter applied to a block boundary from initial values, performs the deblocking filtering process on the basis of the change information. When no change information exists, the loop filter unit carries out the deblocking filtering process according to a predetermined method.

In the pixel adaptive offset process, the loop filter unit partitions the decoded image into blocks on the basis of the block partitioning information for the pixel adaptive offset process, which is variable-length-decoded by the variable length decoding unit 31, refers to the index variable-length-decoded by the variable length decoding unit 31 and indicating the class classifying method of each of the blocks on a per block basis, and, when the index does not indicate "does not perform the offset process", performs a class classification on each pixel in each of the blocks according to the class classifying method indicated by the above-mentioned index.

As a candidate for the class classifying method, a method which is the same as a candidate for the class classifying method for the pixel adaptive offset process in the loop filter unit 11 is prepared in advance.

The loop filter unit 38 then refers to the offset information specifying the offset value calculated for each class on a per block basis and variable-length-decoded by the variable length decoding unit 31, and performs a process of adding the offset to the brightness value of the decoded image.

In the adaptive filtering process, after performing a class classification according to the same method as that used by the image encoding device of FIG. 1, the loop filter unit performs the filtering process by using the filter for each class, which is variable-length-decoded by the variable length decoding unit 31, on the basis of information about the class classification.

The decoded image on which the filtering process is carried out by this loop filter unit 38 is a reference image for motion-compensated prediction, and is also a reproduced image.

As can be seen from the above description, because the configuration is implemented in which by setting an inter picture which refers to only a long-term reference picture as a random access point and encoding information identifying the picture number of the long-term reference picture as additional information, the long-term reference picture which is specified from the above-mentioned additional information is decoded precedingly, and, after that, a picture showing the random access point which refers to only the above-mentioned long-term reference picture is decoded, thereby generating an encoded bitstream in which random access can be carried out also in an inter picture, there is provided an advantage of improving the coding efficiency while maintaining the random access intervals, by changing intra pictures (IRAP pictures) on which random access can be carried out to inter pictures with the above-mentioned additional information.

Further, according to this Embodiment 1, the long-term reference picture which is specified from the additional information is decoded precedingly and, after that, a picture showing the random access point which refers to only the above-mentioned long-term reference picture is decoded, thereby providing an advantage of being able to normally decode the encoded bitstream in which random access can be carried out also in inter pictures.

Embodiment 2

In the image encoding device according to above-mentioned Embodiment 1, SEI is newly defined as additional information showing a randomly-accessible inter picture, the additional information including picture position information showing the picture number of a reference picture to be used at the time of random access which is to be referred to by the randomly-accessible inter picture. In contrast, in an image encoding device according to this embodiment, instead of newly defining SEI, the meaning of a Recovery Point SEI Message defined in nonpatent reference 1 and nonpatent reference 2 is modified in such a way as to be interpreted as follows. More specifically, a picture for which a Recovery Point SEI Message is provided is handled as a randomly-accessible inter picture, and a syntax recovery_poc_cnt (in nonpatent reference 2, recovery_frame_cnt) of the Recovery Point SEI Message is interpreted as not the position of a picture which serves as a recovery point which is a decoding start position, but information showing the position of a reference picture to be used at the time of random access. In case in which the image encoding device is configured in this way, the same processing as that performed by the image encoding device according to above-mentioned Embodiment 1 can be carried out without defining new SEI, and the same advantages can be provided. However, the number of reference pictures to be used at the time of random access which a randomly-accessible inter picture can refer to is limited to one.

An image decoding device according to this embodiment interprets a picture for which a Recovery Point SEI Message is provided as a randomly-accessible inter picture, and further interprets a syntax recovery_poc_cnt (in nonpatent reference 2, recovery_frame_cnt) of the Recovery Point SEI Message as information showing, not the position of a picture which serves as a recovery point, but the position of a reference picture to be used at the time of random access. In case in which the image decoding device is configured in this way, when starting decoding from a picture for which a Recovery Point SEI Message is provided, the image decoding device first decodes a picture indicated by recovery_poc_cnt (in nonpatent reference 2, recovery_frame_cnt) and then decodes the picture for which the Recovery Point SEI Message is provided, and, after that, decodes pictures subsequent, in the display order, to the picture for which the Recovery Point SEI Message is provided, so that the image decoding device can normally perform a playback from the picture for which the Recovery Point SEI Message is provided. Therefore, because the image decoding device can identify a randomly-accessible inter picture for an encoded bitstream generated by the image encoding device according to this embodiment, and normally decode pictures also when starting the decoding from the randomly-accessible inter picture, the image decoding device can provide the same advantages as those provided by the image decoding device according to above-mentioned Embodiment 1.

Embodiment 3

In this embodiment, a reference picture to be used at the time of random access which is to be referred to by a randomly-accessible inter picture is limited to an immediately preceding IRAP picture which will be described below, a decoded image of the immediately preceding IRAP picture is stored in a motion-compensated prediction frame memory 12, a motion-compensated prediction unit 5 refers to the decoded image of the immediately preceding IRAP picture stored in the motion-compensated prediction frame memory 12 and performs a motion-compensated prediction on the inter picture, and a variable length encoding unit 13 encodes SEI showing that the inter picture is a randomly-accessible picture and multiplexes encoded data about the SEI into an encoded bitstream.

In this embodiment, the immediately preceding IRAP picture means an IRAP picture, among one or more IRAP pictures, whose position in encoding order (decoding order) is preceding and the nearest to that in the encoding order (decoding order) of the randomly-accessible inter picture (nearer to that in the encoding order of the randomly-accessible inter picture).

In this case, picture position information included in SEI showing a randomly-accessible inter picture, which is explained in above-mentioned Embodiment 1, i.e., picture position information showing the picture number of a reference picture to be used at the time of random access can be omitted. In case in which the image encoding device is configured in this way, the image encoding device can carry out the same processing as that performed by the image encoding device according to above-mentioned Embodiment 1 without using the information identifying the picture number of a reference picture to be used at the time of random access, i.e., additional information which constructs that SEI, there can be provided an advantage of reducing the code amount required for this SEI.

In a case in which the image encoding device is configured in such a way as to limit a reference picture to be used at the time of random access which is to be referred to by a randomly-accessible inter picture to an immediately preceding IRAP picture, by referring to that SEI, the image decoding device identifies the immediately preceding IRAP picture as the above-mentioned reference picture to be used at the time of random access which is to be referred to.

Therefore, in case in which the image decoding device is configured in this way, when starting decoding from the picture for which that SEI is provided, the image decoding device decodes the immediately preceding IRAP picture and stores the decoded image of the IRAP picture in the motion-compensated prediction frame memory 39, and, after that, the motion compensator 35 refers to the decoded image of the immediately preceding IRAP picture stored in the motion-compensated prediction frame memory 39 and performs a motion-compensated prediction on the randomly-accessible inter picture shown by the SEI, to decode the inter picture. After that, the image decoding device decodes pictures subsequent, in the display order, to the randomly-accessible inter picture shown by that SEI, so that the image decoding device can normally perform a playback from the randomly-accessible picture shown by this SEI. Therefore, the image decoding device can normally decode the bitstream generated by the image encoding device according to this embodiment from some midpoint of the bitstream.

Embodiment 4

Although the case in which the information showing that a picture is a randomly-accessible inter picture is set to SEI in the image encoding device according to above-mentioned Embodiment 1 is explained, the present invention is not limited to this embodiment as long as the information can be set to a higher-level header. For example, a configuration can be provided in which a special NAL unit type showing that a picture is a randomly-accessible inter picture is defined and the same information as above-mentioned SEI is provided for the NAL.

More specifically, in this case, instead of providing SEI so as to identify a randomly-accessible inter picture, a NAL unit type showing a randomly-accessible inter picture is newly defined, and the randomly-accessible inter picture is encoded as a NAL unit showing this NAL unit type.

In order to normally decode an encoded stream generated by the image encoding device in which a special NAL unit type showing that a picture is a randomly-accessible inter picture is defined, a special NAL unit type is defined also in the decoding device, like that defined in the image encoding device, and the encoded stream is decoded according to this special NAL unit type. In this case, the decoding device implements halfway decoding from a randomly-accessible inter picture by starting the decoding from a picture having the above-mentioned special NAL unit type. More specifically, the decoding device first decodes a reference picture to be used at the time of random access which is shown by the information which the above-mentioned special NAL unit type has and then decodes a randomly-accessible inter picture having this NAL unit type, and, after that, decodes pictures subsequent to this randomly-accessible inter picture in the display order, so that the decoding device can normally perform a playback from the randomly-accessible inter picture having that NAL unit type. Accordingly, even in the case in which the decoding device is configured in this way, the decoding device can normally decode the bitstream from some midpoint of the bitstream and provide the same advantages, like the image decoding device according to above-mentioned Embodiment 1.

Further, this embodiment is characterized in that the information showing that a picture is a randomly-accessible inter picture is set to a higher-level header, and it is clear that the higher-level header can be configured arbitrarily as long as the higher-level header can be randomly accessed. Accordingly, for example, as a combination with Embodiment 3, there can be also an example in which a reference picture to be used at the time of random access which is to be referred to by a randomly-accessible inter picture is limited to an immediately preceding IRAP picture, and the information identifying the picture number of the reference picture to be used at the time of random access is omitted.

Embodiment 5

In Embodiments 1 to 4, the image encoding device that generates an encoded stream which implements random access according to inter pictures, and the image decoding device that can normally decode the generated encoded stream are explained. In this embodiment, an encoded stream conversion device that generates an encoded stream which implements random access according to inter pictures by simply converting, partially, an encoded stream which implements random access according to only intra pictures (IRAP pictures disclosed in nonpatent reference 1, or IDR pictures disclosed in nonpatent reference 2), and an image decoding device that can normally decode the generated encoded stream will be explained.

Figure 39:
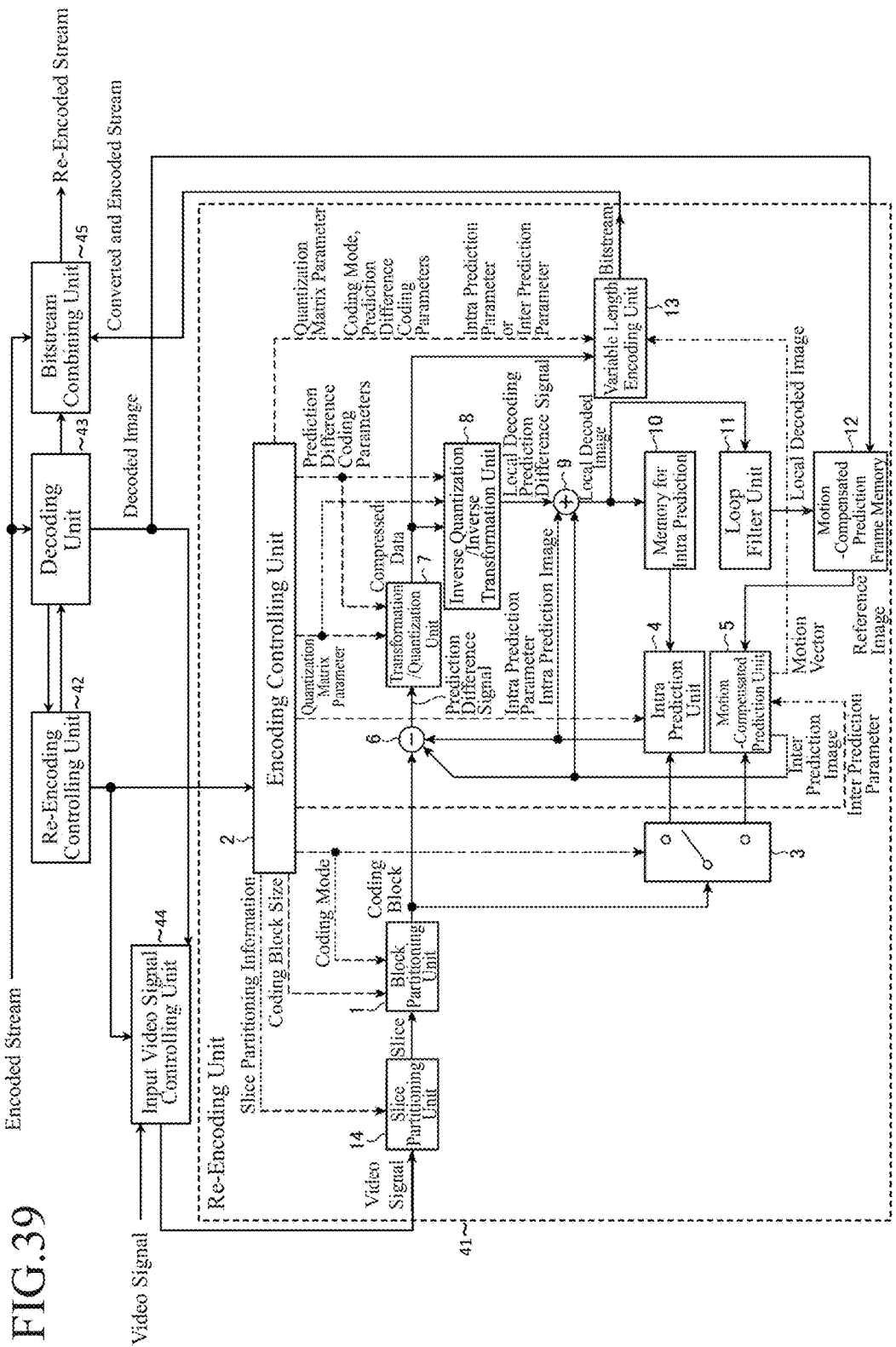
FIG. 39 is a block diagram showing an encoded stream conversion device according to Embodiment 5 of the present invention.

FIG. 39 is a block diagram showing the encoded stream conversion device according to Embodiment 5 of the present invention.

A re-encoding controlling unit 42 and an input video signal controlling unit 44 construct a re-encoding setter, a decoder 43 constructs an image decoder, and a bitstream combining unit 45 constructs a bitstream combiner.

The encoded stream conversion device according to this embodiment includes a re-encoding unit 41 that re-encodes one or more arbitrary pictures, as randomly-accessible inter pictures, from among IRAP pictures (in the case of nonpatent reference 2, IDR picture) of the encoded stream (bitstream) which is the target for conversion.

By re-encoding intra pictures to inter pictures in this way, an encoded stream in which the code amount is reduced from the original encoded stream can be generated.

Concretely, each picture which is a target for conversion (target for re-encoding) is decoded temporarily. A decoded video signal is then re-encoded as inter pictures by using an encoding device which is the same as that shown in FIG. 1.

More specifically, in the encoded stream conversion device, first, the re-encoding controlling unit 42 decodes information specifying randomly-accessible intra pictures (IRAP pictures in nonpatent reference 1, or IDR pictures in nonpatent reference 2) by using the decoder 43 from an encoded stream generated by a conventional image encoding device disclosed by nonpatent reference 1, nonpatent reference 2 or the like. Next, the re-encoding controlling unit 42 performs a control operation of setting an arbitrary picture, as a picture to be re-encoded, from among the plurality of randomly-accessible intra pictures which are specified by the decoded information specifying the randomly-accessible intra pictures, also decoding at least one picture (re-encoding reference picture) which has been encoded ahead of the picture to be re-encoded from among the plurality of randomly-accessible intra pictures by using the decoder 43, and storing the decoded picture in a motion-compensated prediction frame memory 12 of the re-encoding unit 41. The re-encoding unit 41 then refers to at least one re-encoding reference picture which is mentioned above and decoded according to the re-encoding controlling unit 42 and performs a motion-compensated prediction on the picture to be re-encoded by using a motion-compensated prediction unit 5, to generate an inter prediction picture, and generates encoded data about the inter picture by using the inter prediction picture. At that time, the decoder 43 denotes a decoding device corresponding to the conventional encoding device that generates the above-mentioned encoded stream (the decoder 43 can normally decode the above-mentioned encoded stream). In addition, the re-encoding unit 41 has the same configuration as the image encoding device (FIG. 1) according to Embodiment 1.

Further, the encoded stream conversion device includes the bitstream combining unit 45 that replaces a stream portion corresponding to the encoded data about the intra picture to be re-encoded in the above-mentioned encoded stream with the bitstream which consists of the encoded data about the inter picture, the encoded data being generated by the re-encoding unit 41, to generate a stream after re-encoding (re-encoded stream).

In the motion-compensated prediction frame memory 12 of the re-encoding unit 41, a picture which is to be referred to by each picture which is a target for conversion is stored as a long-term reference picture. It is assumed that this long-term reference picture is limited to an IRAP picture (an IDR picture when the above-mentioned encoded stream is generated by the encoding device disclosed by nonpatent reference 2). In the case in which a specific picture is stored as a long-term reference picture in this way, the bitstream combining unit 45 needs to change the original encoded stream in such a way that in a portion corresponding to the encoded data about a picture which is to be encoded, in the encoding order, after the above-mentioned specific picture and before the picture which is a target for conversion, the above-mentioned specific picture is stored as a long-term reference picture.

The inter prediction picture outputted from the motion-compensated prediction unit 5 is converted into compressed data via a subtracting unit 6 and a transformation/quantization unit 7, like a typical inter picture, and is outputted to a variable length encoding unit 13. As mentioned above, the re-encoding unit 41 that re-encodes, as an inter picture, an intra picture which is a target for conversion includes a buffer that temporarily stores a specific intra picture, the motion-compensated prediction unit 5, the subtracting unit 6, and the transformation/quantization unit 7. The inter prediction image and the compressed data must be generated in such a way that the decoded image generated at that time becomes the same as the decoded image which is generated from the intra picture before re-encoding. Therefore, when re-encoding the above-mentioned intra picture which is a target for conversion, the re-encoding controlling unit 42 controls the input video signal controlling unit 44 in such a way as to input, as a video signal, the decoded image of the above-mentioned intra picture which is decoded by the decoder 43 and which is a target for conversion to a slice partitioning unit 14. The re-encoding controlling unit 42 can implement the above-mentioned generation by then referring to the decoded image which is generated from the above-mentioned intra picture which is a target for conversion, and controlling the encoding controlling unit 2 so as to control the processes performed by the motion-compensated prediction unit 5, the subtracting unit 6, and the transformation/quantization unit 7 in such a way to, for example, perform lossless encoding so that the decoded image which is generated from the above-mentioned intra picture which is a target for conversion is the same as the decoded image after re-encoding.

As to a process about reference picture buffer management of re-encoded inter pictures, it is necessary to cause the buffer conditions at the time of encoding a picture which is to be encoded next time after an IRAP picture or an IDR picture before re-encoding to remain unchanged according to the above-mentioned re-encoding process. To this end, the buffer (motion-compensated prediction frame memory 12) is controlled by using a buffer management unit included in the encoding controlling unit 2 so as not to exert an influence upon the process of decoding pictures to be decoded after the re-encoded picture.

Into the access unit of the inter picture which is acquired by converting the re-encoded picture, i.e., an intra picture, additional information (SEI information) showing that the inter picture is a randomly-accessible one is multiplexed. Information identifying the picture number of the reference picture to be used at the time of random access which is referred to by the re-encoded picture is included in this SEI information. A process of encoding the SEI information and multiplexing this encoded SEI information into the bitstream is carried out by the variable length encoding unit 13, like in the case of above-mentioned Embodiment 1.

As an alternative, the encoded stream conversion device can be configured in such a way as to generate and encode the above-mentioned additional information, and multiplex the encoded additional information into the re-encoded stream, by using the bitstream combining unit 45. In this case, because the re-encoding unit 41 does not have to perform the generation and the encoding of the above-mentioned additional information, the re-encoding unit can implement the re-encoding by performing the same encoding process as that performed by the encoding device that generates the encoded stream before re-encoding (the conventional image encoding device disclosed by nonpatent reference 1, nonpatent reference 2 or the like).

The above-mentioned reference picture to be used at the time of random access can be limited to an immediately preceding IRAP picture (in the case of nonpatent reference 2, an immediately preceding IDR picture), like in the case of Embodiment 3. In this case, the information identifying the picture number of the above-mentioned reference picture to be used at the time of random access can be omitted as SEI.

As an alternative, the information showing that the picture is a randomly-accessible inter picture can be encoded, instead of being set as SEI information, in the same form as that shown in Embodiment 2 or 4.

The image decoding device according to this Embodiment 5 that decodes the re-encoded coded stream can normally decode the bitstream according to how the encoded stream conversion device is configured so as to encode the information showing that the picture is a randomly-accessible inter picture, by using the corresponding image decoding device according to either of Embodiments 1 to 4.

Further, although the method of re-encoding only a randomly-accessible intra picture such as an IRAP picture (IDR picture) is described in the explanation previously made, all pictures including from a randomly-accessible intra picture to a picture to be decoded immediately before the next randomly-accessible intra picture (which are a unit generally called a Group Of Pictures (GOP), and represent a picture group which can be independently decoded) can be re-encoded collectively. A randomly-accessible intra picture which is to be re-encoded at that time can be re-encoded, as a randomly-accessible inter picture, together with the information showing that the intra picture is a randomly-accessible one (either of the pieces of information described in Embodiments 1 to 4), in the same way as that explained above, and remaining pictures to be re-encoded can be re-encoded in what way. In this case, a decoded image which is generated from a randomly-accessible inter picture can be decoded normally by the image decoding device according to this embodiment even if the decoded image differs from a decoded image which is generated from an intra picture before re-encoding, unlike in the case of using the above-mentioned re-encoding method. Therefore, when re-encoding each picture to be re-encoded, the re-encoding controlling unit 42 controls the input video signal controlling unit 44 in such a way as to input the original image (video signal) which is the above-mentioned picture to be re-encoded to the slice partitioning unit 14.

By doing in this way, the re-encoding controlling unit does not have to perform a control operation in such a way that the decoded image before re-encoding becomes the same as that after re-encoding, for each picture to be re-encoded, and can simplify the re-encoding process.

Further, when limiting a reference picture to be used at the time of random access (picture which is to be referred to when re-encoding a randomly-accessible intra picture to be re-encoded) to an immediately preceding IRAP picture (in the case of nonpatent reference 2, an immediately preceding IDR picture), like in the case of Embodiment 3, the re-encoding controlling unit can re-encode pictures including from an immediately preceding IRAP picture, instead of a picture which is a randomly-accessible inter picture, to a picture to be decoded immediately before another randomly-accessible intra picture next to the picture which is a randomly-accessible inter picture (another randomly-accessible intra picture which is subsequent and the nearest to that picture in the decoding order). By doing in this way, flexible re-encoding independent of the decoded image which is generated from the encoded stream before re-encoding on the basis of the immediately preceding IRAP picture can be implemented. A plurality of randomly-accessible inter pictures which refer to the immediately preceding IRAP can be included in the plurality of re-encoded pictures.

Although the example of performing the re-encoding in such a way as to store a reference picture to be used at the time of random access as a long-term reference picture is explained in the above-mentioned explanation, the encoded stream conversion device can be configured in such a way as to prepare a special buffer which is referred to by a randomly-accessible inter picture, store the above-mentioned reference picture to be used at the time of random access in this buffer, and encode the randomly-accessible inter picture by referring to the reference picture to be used at the time of random access stored in the above-mentioned special buffer. In this case, the image decoding device is also configured in such away as to prepare such a special buffer as above and decode a randomly-accessible inter picture by referring to this buffer. The encoded stream conversion process and the decoding process other than the above-mentioned operations are implemented by performing the same processes as those previously explained according to this embodiment.

In the case of this configuration, there is provided an advantage of eliminating the need to change the encoded data about pictures which are encoded after encoding the above-mentioned reference picture to be used at the time of random access and before encoding a randomly-accessible inter picture.

Further, in this embodiment, the re-encoding can be performed with coding parameters before the re-encoding being applied at the time of re-encoding. Concretely, a part of the coding parameters before re-encoding is applied to a picture whose picture type (slice type) does not change before and after the re-encoding. For example, the re-encoding is carried out by using coding parameters including block partitioning information before the re-encoding, the coding mode of each block and a prediction parameter, just as they are. By doing in this way, the need to perform a process of selecting coding parameters is eliminated, and the processing load on the re-encoding process can be reduced.

The encoded stream conversion device according to this Embodiment 5 can partially re-encode intra pictures of an encoded stream in which only an intra picture is defined as a random access point to randomly-accessible inter pictures. Therefore, an encoded stream whose code amount is reduced from the original encoded stream can be generated.

Further, the image decoding device according to this Embodiment 5 provides an advantage of being able to normally decode the encoded bitstream in which the intra pictures of the encoded stream in which only an intra picture is defined as a random access point are partially re-encoded to randomly-accessible inter pictures.

Embodiment 6

Figure 35:
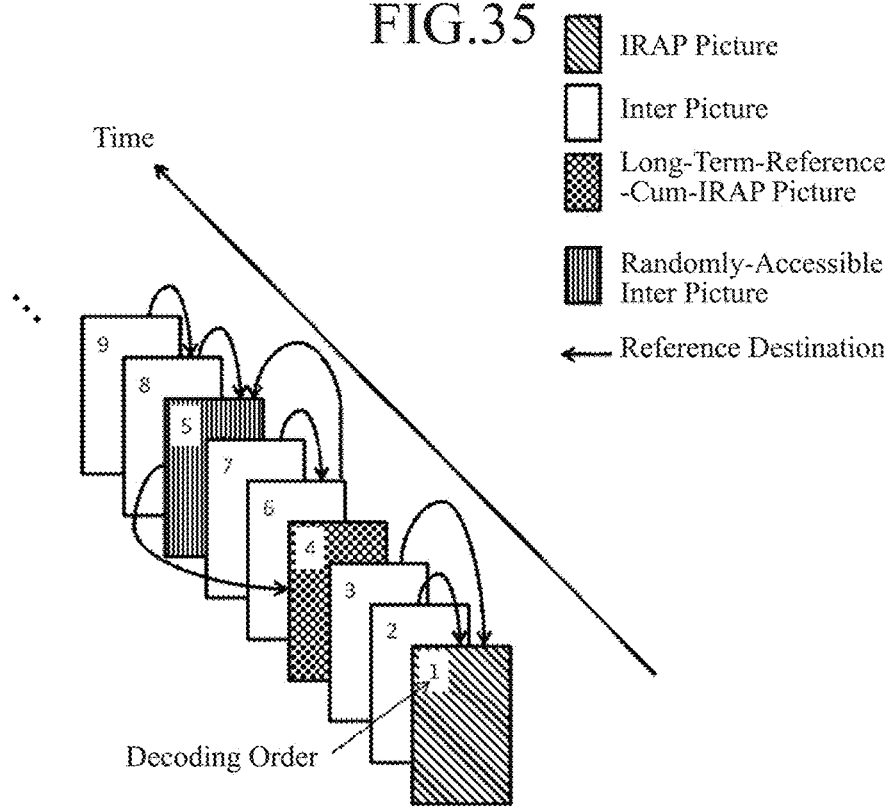
FIG. 35 is an explanatory drawing showing an example of the implementation of random access according to a randomly-accessible inter picture.

In above-mentioned Embodiment 1, random access according to randomly-accessible inter pictures is implemented by causing each inter picture ("inter picture" shown by a white box in FIG. 33(*b*)) whose position in the display order is subsequent to a randomly-accessible inter picture (whose display time is future with respect to the randomly-accessible inter picture) and which cannot be randomly accessed not to refer to a picture whose position in the display order is preceding to a randomly-accessible inter picture (whose display time is past with respect to the randomly-accessible inter picture). In this embodiment, by causing an inter picture whose position in the decoding order is subsequent to a randomly-accessible inter picture, as shown in an example shown in FIG. 35, and which cannot be randomly accessed not to refer to a picture whose position in the decoding order is preceding to a randomly-accessible inter picture, random access according to randomly-accessible inter pictures is implemented. This case corresponds to a case of replacing IDR pictures described in nonpatent reference 1 and nonpatent reference 2 with randomly-accessible inter pictures.

Therefore, when starting decoding from a randomly-accessible inter picture for which SEI identifying the randomly-accessible inter picture is provided, an image decoding device that decodes an encoded stream generated by an image encoding device according to this embodiment first decodes a picture shown by information identifying the picture number of a reference picture to be used at the time of random access, the information being included in the SEI identifying the randomly-accessible inter picture, and then decodes the picture for which the above-mentioned SEI is provided, and, after that, decodes pictures subsequent, in the display order, to the picture for which above-mentioned SEI is provided, thereby being able to normally perform a playback from the randomly-accessible inter picture, like that according to Embodiment 1.

Further, only the restrictions on reference pictures shown in Embodiment 1 are changed in this embodiment, and it is clear that this embodiment can be combined with another embodiment by using the same methods as those for use in the image encoding device and the image decoding device according to Embodiment 1.

Embodiment 7

Although in the image encoding device according to above-mentioned Embodiment 1, SEI is newly defined as information identifying a randomly-accessible inter picture, the information including information identifying the picture number of a reference picture to be used at the time of random access which is to be referred to by the randomly-accessible inter picture, a Recovery Point SEI Message defined in nonpatent reference 1 and nonpatent reference 2 is used as the information identifying a randomly-accessible inter picture in an image encoding device according to this embodiment. Further, the interpretation of a Recovery Point SEI Message is changed and used in above-mentioned Embodiment 2. In contrast, in this embodiment, the syntax recovery_poc_cnt (in nonpatent reference 2, recovery_frame_cnt) of a Recovery Point SEI Message is interpreted as the position of a picture which serves as a recovery point which is a decoding start position, as defined in nonpatent reference 1 and nonpatent reference 2. In addition to that, only when the picture which serves as a recovery point is an inter picture, the information identifying the picture number of a reference picture to be used at the time of random access, as disclosed in above-mentioned Embodiment 1, is encoded as a syntax of a Recovery Point SEI Message.

An image decoding device according to this embodiment decodes the Recovery Point SEI Message and checks the picture type of the picture which serves as the recovery point shown by the syntax recovery_poc_cnt (in nonpatent reference 2, recovery_frame_cnt), and, only when the picture which serves as the recovery point is an inter picture, decodes the information identifying the picture number of a reference picture to be used at the time of random access to specify the reference picture to be used at the time of random access. In case in which the image decoding device is configured in this way, when starting decoding from a picture for which that SEI is provided, the image decoding device first decodes the picture shown by the information identifying the picture number of the reference picture to be used at the time of random access and then decodes the randomly-accessible inter picture shown by recovery_poc_cnt, and, after that, decodes pictures subsequent, in the display order, to the randomly-accessible inter picture, thereby being able to normally perform a playback from the randomly-accessible inter picture. Accordingly, there can be provided the same advantages as those provided by the image decoding device according to above-mentioned Embodiment 1.

In this embodiment, when a picture which serves as a recovery point is an intra picture, no modification from nonpatent reference 1 and nonpatent reference 2 is made, and halfway decoding can be performed normally from an intra picture which serves as a recovery point by using an image decoding device which conforms to any of nonpatent reference 1 and nonpatent reference 2.

Like in the case of Embodiment 3, the above-mentioned reference picture to be used at the time of random access can be limited to an immediately preceding IRAP picture (in the case of nonpatent reference 2, an immediately preceding IDR picture). In this case, the information (syntax) identifying the picture number of a reference picture to be used at the time of random access can be omitted. Accordingly, halfway decoding from a randomly-accessible inter picture can be implemented by using only the information (syntax) defined by a Recovery Point SEI Message described in nonpatent reference 1 and nonpatent reference 2.

Further, also in the encoded stream conversion device according to Embodiment 5, a Recovery Point SEI Message defined in nonpatent reference 1 and nonpatent reference 2 can be used as the information identifying a randomly-accessible inter picture, like in the case of the above-mentioned image encoding device. In the case in which the encoded stream conversion device is configured in this way, the decoding can be carried out by the image decoding device according to this embodiment.

Embodiment 8

Figure 36:
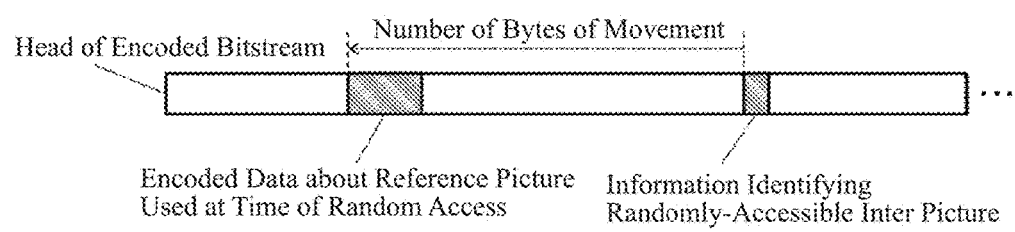
FIG. 36 is an explanatory drawing when the position of a reference picture to be used at the time of random access is shown by the number of bytes of movement from information identifying a randomly-accessible inter picture.
Figure 37:
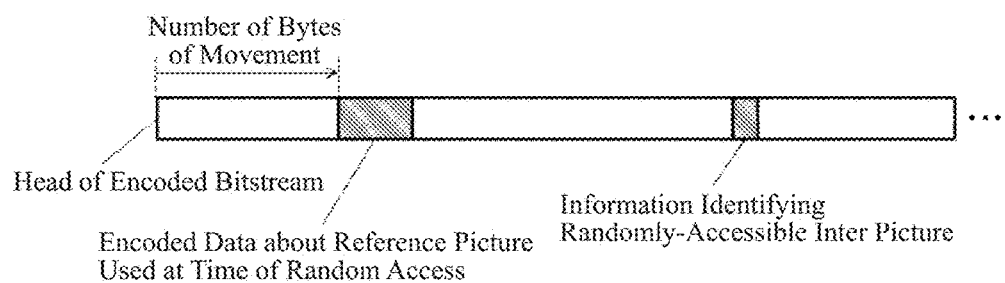
FIG. 37 is an explanatory drawing when the position of a reference picture to be used at the time of random access is shown by the number of bytes of movement from the head of an encoded bitstream.

The position of a reference picture to be used at the time of random access is encoded as a picture number in above-mentioned Embodiments 1, 2 and 4 to 7. In contrast with above-mentioned Embodiments 1, 2 and 4 to 7, in this embodiment, the position of a reference picture to be used at the time of random access is shown by the number of bytes of movement from information identifying a randomly-accessible inter picture, as shown in FIG. 36. By doing in this way, the decoding start position of a reference picture to be used at the time of random access can be known without performing a process of decoding the picture number from each encoded picture data and comparing the picture number with the picture number of the reference picture to be used at the time of random access in order to specify the above-mentioned reference picture to be used at the time of random access, and the processing load on the decoding process can be reduced. As an alternative, the position of a reference picture to be used at the time of random access can be shown by the number of bytes of movement from the head of the encoded bitstream, as shown in FIG. 37. By doing in this way, the decoding start position of the reference picture to be used at the time of random access can be known as an absolute position, instead of a position relative to the encoded bitstream (the number of bytes of movement from the information identifying a randomly-accessible inter picture). Further, in case in which the start point of the number of bytes of movement is standardized between the image encoding device and the image decoding device, it is clear that a point different from those shown in FIGS. 36 and 37 can be set.

Embodiment 9

In this embodiment, identification information about a randomly-accessible inter picture, the identification information being shown by SEI, as shown in Embodiment 1, and information identifying the position of a reference picture to be used at the time of random access are provided as information disposed in a media file format in which encoded bitstreams of a video image and a voice are combined. The media file format is defined in, for example, ISO/IEC 23008-1, ISO/IEC 13818-1/ITU-T H.222.0, ISO/IEC 14496-14:2003, and so on. By doing in this way, both a randomly-accessible inter picture and a reference picture to be used at the time of random access required to decode the randomly-accessible inter picture can be identified before extracting an encoded bitstream generated by the image encoding device explained in either of above-mentioned Embodiments 1 to 7 from a media file, and high-speed random access can be implemented.

Concretely, descriptor information provided for a unit (referred to as GOP media data from here on) in which encoded bitstreams of Group Of Pictures (GOP) units in each of which a plurality of pictures starting with an IRAP picture (in nonpatent reference 2, an IDR picture) can be decoded independently are combined is used. For example, to the descriptor information about GOP media data including a randomly-accessible inter picture, time information (corresponding to a time code) about the randomly-accessible inter picture is added as the identification information about the randomly-accessible inter picture, and time information about the reference picture to be used at the time of random access is added as the information identifying the position of the reference picture to be used at the time of random access.

As an alternative, descriptor information (Movie fragment metadata) provided for a unit (referred to as picture media data from here on) in which encoded bitstreams of picture units are combined is used. For example, to descriptor information about the picture media data about a randomly-accessible inter picture, flag information showing whether or not the picture is a randomly-accessible inter picture is added as the identification information about the randomly-accessible inter picture, and time information about the reference picture to be used at the time of random access is added as the information identifying the position of the reference picture to be used at the time of random access.

As examples of the descriptor information about GOP media data, MPU metadata described in ISO/IEC 23008-1 and moov box described in ISO/IEC 14496-14:2003 are provided. As examples of the descriptor information about picture media data, Movie fragment metadata described in ISO/IEC 23008-1 and moof box described in ISO/IEC 14496-14:2003 are provided.

Further, in this embodiment, a configuration can be provided in which a reference picture to be used at the time of random access which is to be referred to by a randomly-accessible inter picture is limited to an immediately preceding IRAP picture, and the information identifying the position of the reference picture to be used at the time of random access is omitted, like in the case of Embodiment 3. By doing in this way, the code amount required for the information identifying the position of a reference picture to be used at the time of random access can be reduced.

Embodiment 10

Although in Embodiments 1 to 9 a reference picture to be used at the time of random access which is to be referred to by a randomly-accessible inter picture is defined as a long-term reference picture stored in a buffer for long-term storage, in this embodiment a reference picture to be used at the time of random access is defined as an intra picture which is not a long-term reference picture. In this case, a reference picture to be used at the time of random access is stored in a buffer for short-term storage as a short-term reference picture which is the same as a reference picture in encoding and decoding of another picture. However, in order to cause a reference picture to be used at the time of random access to exist in the buffer for short-term storage at the time of encoding and decoding the randomly-accessible inter picture, it is necessary to keep the above-mentioned reference picture to be used at the time of random access stored in the buffer for short-term storage at the time of encoding and decoding each picture after the reference picture is stored in the buffer for short-term storage. To this end, the image encoding device encodes management information about a short-term reference picture, the management information being defined in nonpatent reference 1 and nonpatent reference 2 in such a way that the reference picture to be used at the time of random access is placed in a state in which it is stored in the buffer for short-term storage at the time of encoding and decoding the randomly-accessible inter picture. Further, the image decoding device decodes the above-mentioned management information from the encoded stream and manages a buffer according to this information, so that the above-mentioned reference picture to be used at the time of random access is kept stored in the buffer for short-term storage at the time of encoding and decoding the randomly-accessible inter picture, and a reference to the reference picture is enabled. Therefore, a normal playback of an encoded stream generated by the image encoding device according to this embodiment from a randomly-accessible inter picture can be carried out.

Embodiment 11

Embodiments 1 to 10 are implemented in such a way that a randomly-accessible inter picture is defined as a picture which refers to only a picture set as a reference picture to be used at the time of random access, and the reference picture to be used at the time of random access is stored in either the buffer for long-term storage or the buffer for short-term storage which is disclosed in nonpatent reference 1 or nonpatent reference 2. More specifically, the encoding side needs to encode reference picture management information stored in the buffer for long-term storage and the buffer for short-term storage according to nonpatent reference 1 or nonpatent reference 2, and the decoding side needs to decode and refer to the above-mentioned reference picture management information according to nonpatent reference 1 or nonpatent reference 2. In this embodiment, the need to encode the above-mentioned reference picture management information in each randomly-accessible inter picture is eliminated by combining Embodiment 3 and Embodiment 4.

Concretely, a picture which is to be referred to by a randomly-accessible inter picture is limited to an immediately preceding IRAP picture, like in the case of Embodiment 3, and a special NAL unit type showing that a picture is a randomly-accessible inter picture is defined, like in the case of Embodiment 4. When a picture which is a target to be encoded is a randomly-accessible inter picture, the encoding side erases pictures, except an immediately preceding IRAP picture, stored in the buffer for long-term storage and the buffer for short-term storage, the encoding side encodes the picture which is the target to be encoded as a picture having the above-mentioned special NAL unit type. After then encoding the randomly-accessible inter picture, the encoding side stores this inter picture in the buffer for long-term storage or the buffer for short-term storage, and enables the inter picture to be referred to by a picture which is to be encoded after that.

When the decoded NAL unit type is the above-mentioned special NAL unit type, the decoding side interprets the picture which is the target to be encoded as a randomly-accessible inter picture, like in the case of Embodiment 4. After then erasing pictures, except the immediately preceding IRAP picture, stored in the buffer for long-term storage and the buffer for short-term storage, the decoding side decodes the randomly-accessible inter picture by referring to the immediately preceding IRAP picture. After decoding the randomly-accessible inter picture, the decoding side stores this inter picture in the buffer for long-term storage or the buffer for short-term storage, and enables the inter picture to be referred to by a picture which is to be decoded after that. By doing in this way, also when the decoding is started from a randomly-accessible inter picture (picture having the above-mentioned special NAL unit type), a playback can be carried out normally.

Embodiment 12

Figure 38:
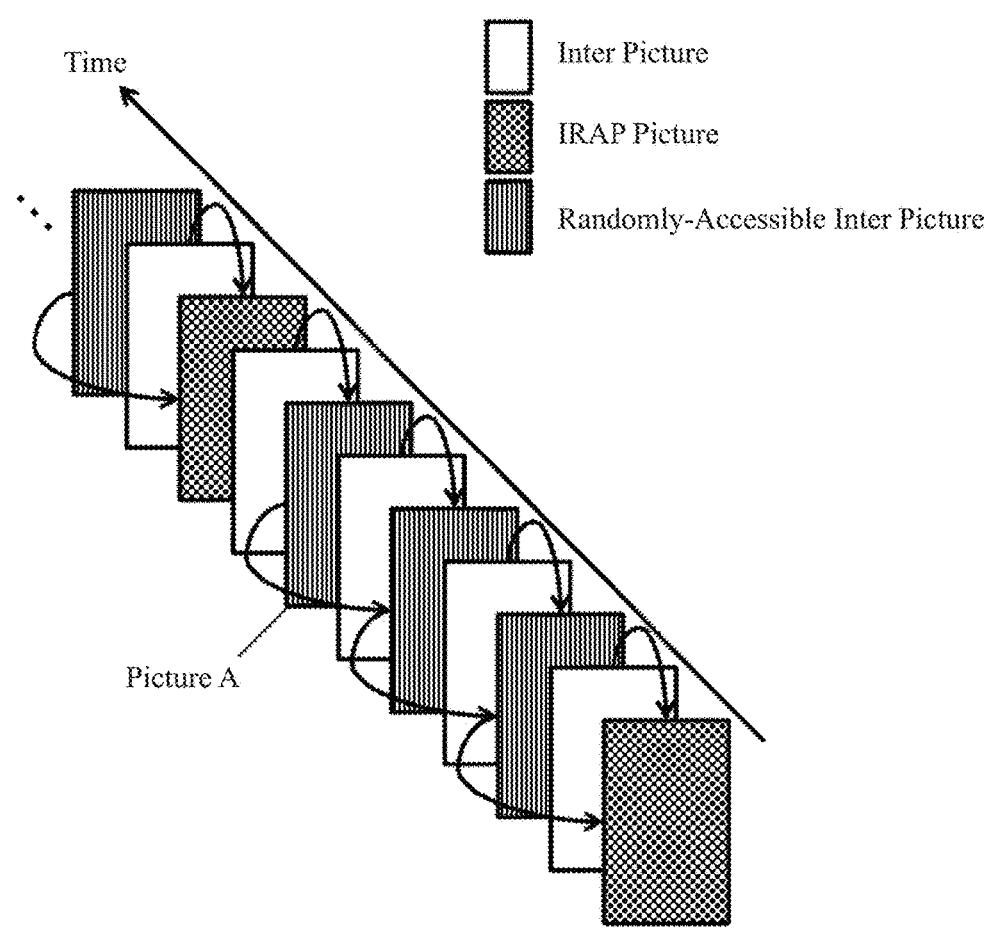
FIG. 38 is an explanatory drawing showing an example of implementation of random access of sequentially referring to inter pictures which can be randomly accessed, starting with an IRAP picture.

Although in Embodiments 1 to 11 a reference picture to be used at the time of random access which is to be referred to by a randomly-accessible inter picture is an intra picture, in this embodiment randomly-accessible inter pictures starting with an IRAP picture are referred to one by one, as shown in FIG. 38. At that time, as information identifying the position of a reference picture to be used at the time of random access, information identifying randomly-accessible inter pictures is encoded, this information being provided for each randomly-accessible inter picture. In addition, in order to enable randomly-accessible inter pictures to be referred to one by one, as mentioned above, reference pictures stored in the buffer for long-term storage or the buffer for short-term storage are managed in such a way that when each randomly-accessible inter picture is encoded, a reference to an immediately preceding picture (a picture the nearest to that inter picture in the encoding order (decoding order)) among already-encoded IRAP pictures and randomly-accessible inter pictures is enabled.

By doing in this way, after decoding the information identifying randomly-accessible inter pictures and specifying the randomly-accessible inter pictures, when, for example, performing a halfway playback from one (a picture A) of the randomly-accessible inter pictures, the decoding device first decodes the immediately preceding IRAP picture and randomly-accessible inter pictures existing between an IRAP picture and the picture A one by one in the decoding order, and stores the inter pictures in the buffer for long-term storage or the buffer for short-term storage. At that time, the decoding device can specify the randomly-accessible inter pictures existing between the IRAP picture and the picture A from information identifying decoded randomly-accessible inter pictures. Because the decoding device can decode the picture A by referring to the decoded immediately preceding randomly-accessible inter picture (the randomly-accessible inter picture which is the nearest to the picture in the decoding order), the decoding device can normally perform a playback from the randomly-accessible inter picture. Because a randomly-accessible inter picture can be encoded by referring to a picture nearer thereto in time than an IRAP picture according to the above-mentioned configuration, the coding efficiency can be improved.

Embodiment 13

In contrast to Embodiment 12, in this embodiment, each randomly-accessible inter picture is encoded by selecting a picture to be referred to from among an immediately preceding IRAP picture (an IRAP picture which is the nearest thereto in encoding order (decoding order)), and randomly-accessible inter pictures encoded (decoded) after the immediately preceding IRAP picture.

At that time, in contrast to Embodiment 12, information specifying a picture to be referred to by each randomly-accessible inter picture is further encoded. As an example of the above-mentioned information specifying a picture to be referred to, there is a picture number (Picture Oder Count: POC). In addition, in order to make a reference picture selectable as mentioned above, reference pictures in either the buffer for long-term storage or the buffer for short-term storage are managed in such a way that the immediately preceding IRAP picture and subsequent randomly-accessible inter pictures can be referred to at the time of encoding each randomly-accessible inter picture.

By doing in this way, the decoding device decodes the information identifying randomly-accessible inter pictures, and specifies the randomly-accessible inter pictures, and, after that, when, for example, performing a halfway playback from one of the randomly-accessible inter pictures (a picture A shown in FIG. 38), decodes randomly-accessible inter pictures existing between the immediately preceding IRAP picture and the picture A one by one in the decoding order, and stores the inter pictures in either the buffer for long-term storage or the buffer for short-term storage. At that time, the decoding device decodes the information specifying a picture to be referred to by each randomly-accessible inter picture, and specifies the reference picture of that inter picture by referring to this information. By doing in this way, the decoding device can finally decode the picture A and normally perform a playback from the randomly-accessible inter picture. By using the configuration as above, because each randomly-accessible inter picture can be encoded by selecting a picture which improves the coding efficiency most from among a plurality of reference pictures, the coding efficiency can be improved.

Further, although the image encoding device and the image decoding device according to this Embodiment 13 are configured in such a way as to refer to a picture from among the immediately preceding IRAP picture and the subsequent randomly-accessible inter pictures, the image encoding device and the image decoding device can be alternatively configured in such a way as to select one of the immediately preceding IRAP picture and the immediately preceding randomly-accessible inter picture (the randomly-accessible inter picture which is the nearest in the encoding order (decoding order)). By doing in this way, because the above-mentioned information specifying a picture to be referred to is implemented by flag information showing which one of the immediately preceding IRAP picture and the immediately preceding randomly-accessible inter picture is selected, the code amount can be reduced as compared with the case in which the above-mentioned picture number or the like is used. In addition, because the buffer for long-term storage or the buffer for short-term storage can just be managed in such a way that when encoding each randomly-accessible inter picture, only the immediately preceding IRAP picture and the immediately preceding randomly-accessible inter picture can be referred to, the number of pictures to be stored can be reduced.

Figure 30:
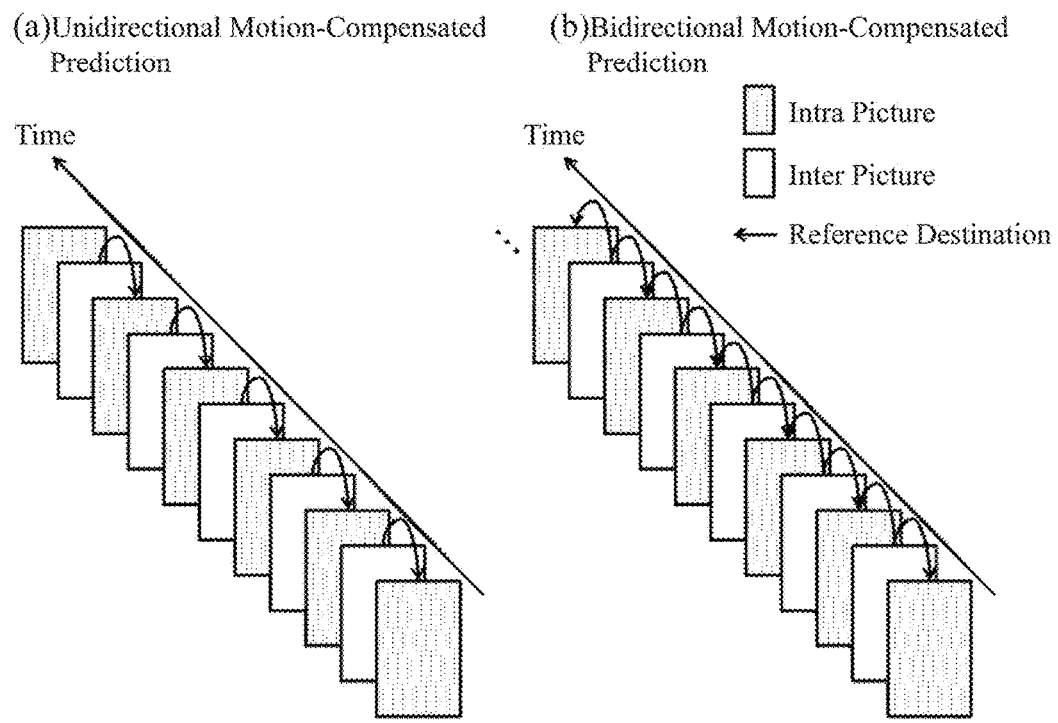
FIG. 30 is an explanatory drawing showing an example of encoding using a motion-compensated prediction.
Figure 31:
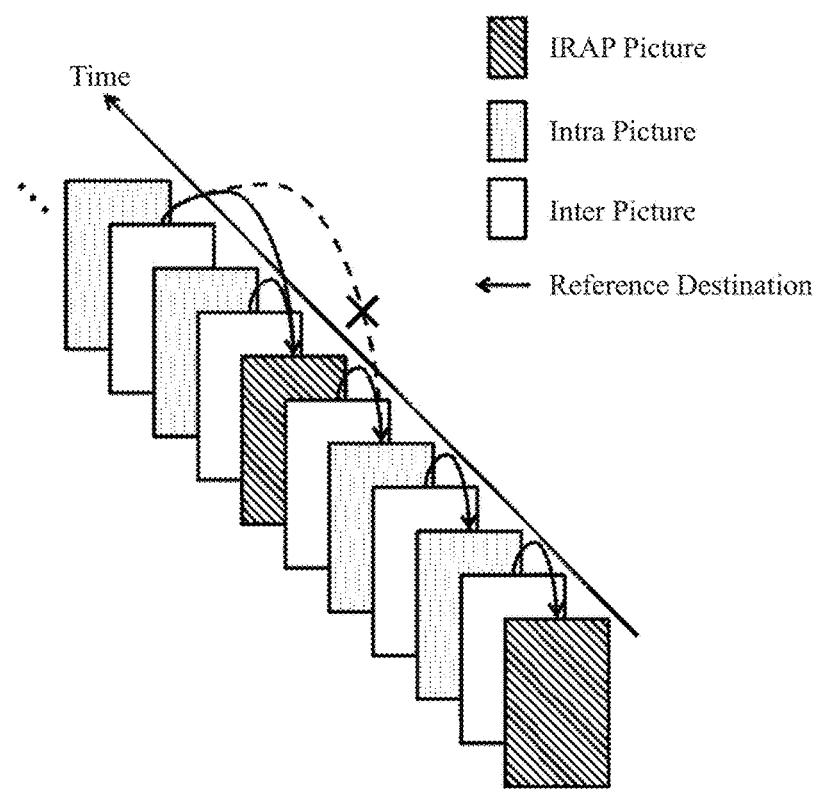
FIG. 31 is an explanatory drawing showing an example of encoding which enables random access using an IRAP picture.

Although in Embodiments 1 to 13, a picture which refers to an inter picture is explained as a P picture using one unidirectional motion-compensated prediction in FIGS. 31 to 35 and 38, it is clear that that inter picture can be a B picture using a bidirectional prediction which refers to a plurality of past pictures or a plurality of future pictures in the display order, while temporal restrictions imposed on the bidirectional motion-compensated prediction of FIG. 30(*b*) and bidirectional motion-compensated predictions are removed.

Further, in each of the above-mentioned embodiments excluding Embodiment 4, inter pictures are set as randomly-accessible pictures by using SEI. Therefore, even when an encoded bitstream generated by the image encoding device according to each of the embodiments is decoded by an image decoding device which conforms to any of nonpatent reference 1 and nonpatent reference 2, because a randomly-accessible inter picture cannot be identified, only halfway decoding from the inter picture cannot be carried out while halfway decoding from a randomly-accessible intra picture defined in nonpatent reference 1 and nonpatent reference 2 and decoding can be carried out normally as long as the decoding starts from the head of the encoded bitstream. This is because even in a case in which halfway decoding from a randomly-accessible inter picture is not performed, when a reference picture to be used at the time of random access is encoded, this reference picture to be used at the time of random access is stored in the buffer for long-term storage or the buffer for short-term storage, and the buffer is managed according to the above-mentioned reference picture management information in such a way that a reference to the reference picture is enabled when a picture set as a randomly-accessible inter picture is decoded, and, as a result, when a picture set as a randomly-accessible inter picture is decoded even if the above-mentioned SEI is not provided, a reference picture to be used at the time of random access is already stored in the buffer for long-term storage or the buffer for short-term storage and therefore a reference to the reference picture is enabled.

Further, an example using randomly-accessible inter pictures will be shown hereafter. First a top intra picture is set as a reference picture to be used at the time of random access. Then, on the assumption that pictures are encoded as intra pictures at constant intervals, when the coding efficiency is increased by encoding, as an inter picture which refers to a reference picture to be used at the time of random access, each picture assigned in such a way as to be encoded as an intra picture, the picture is encoded as not an intra picture, but an inter picture (randomly-accessible inter picture) which refers to a reference picture to be used at the time of random access, whereas when the coding efficiency is increased by encoding, as an intra picture, each picture assigned in such a way as to be encoded as an intra picture, the picture is encoded as a randomly-accessible intra picture and is also set to be a new reference picture to be used at the time of random access. By doing in this way, a randomly-accessible inter picture and a reference picture to be used at the time of random access can be set adaptively for an image to be encoded. Further, although in the above-mentioned example, whether to encode, as a randomly-accessible intra picture, each picture assigned in such a way as to be encoded as an intra picture, or encode, as a randomly-accessible inter picture which refers to a reference picture to be used at the time of random access, each picture assigned in such a way as to be encoded as an intra picture is determined according to the coding efficiency, a feature quantity of the reference picture to be used at the time of random access and a feature quantity of the above-mentioned picture assigned in such a way as to be encoded as an intra picture can be extracted and the determination can be performed on the basis of the feature quantities. For example, a correlation value between pictures which is based on the feature quantities is calculated, and whether to encode, as a randomly-accessible intra picture, each picture assigned in such a way as to be encoded as an intra picture, or encode, as a randomly-accessible inter picture which refers to a reference picture to be used at the time of random access, each picture assigned in such a way as to be encoded as an intra picture is determined according to the correlation value. As an example of the correlation value, the following picture correlation index I is provided. On the basis of I shown in the following equation (5), whether or not to encode the picture to be encoded as a randomly-accessible inter picture is determined.

$$I = w_0 dE_Y + w_1 dE_U + w_2 dE_V + w_3 dV_Y + w_4 dV_U + w_5 dV_V \qquad (5)$$

$$dE_X = |E(S_{T_X}) - E(S_{R_X})|$$

$$dV_X = |V(S_{T_X}) - V(S_{R_X})|$$

where $w_i$ (i=0, 1, . . . , 5) denotes a weighting factor, E(S) denotes the average of the pixel values S in the picture, V(S) denotes the variance of the pixel values S in the picture, $S_{TX}$ denotes the pixel value of a color component X of the picture to be encoded (picture assigned in such a way as to be encoded as the above-mentioned intra picture to be encoded), and $S_{RX}$ denotes the pixel value of the color component X of the reference picture to be used at the time of random access. When the above-mentioned index I is smaller than a preset threshold, it is determined that the correlation between the pictures is high, and the picture to be encoded is encoded as a randomly-accessible inter picture. In contrast, when the above-mentioned index I is equal to or larger than the above-mentioned threshold, it is determined that the correlation between the pictures is low, and the picture to be encoded is encoded as a randomly-accessible intra picture. By determining whether or not to encode the picture to be encoded as a randomly-accessible inter picture on the basis of the picture correlation index in addition to setting the above-mentioned threshold to an appropriate value, a method of encoding (intra encoding or inter encoding) a picture which serves as a random access point (picture assigned in such a way as to be encoded as the above-mentioned intra picture) can be controlled adaptively, and the coding efficiency of the entire bitstream can be improved. Further, although the above-mentioned equation (5) shows an example of a YUV signal, another chrominance signal, such as an RGB signal, can be used, as a matter of course.

While the invention has been described in its preferred embodiments, it is to be understood that an arbitrary combination of two or more of the above-mentioned embodiments can be made, various changes can be made in an arbitrary component according to any one of the above-mentioned embodiments, and an arbitrary component according to any one of the above-mentioned embodiments can be omitted within the scope of the invention. Further, the encoded stream generated by the image encoding device according to each embodiment or the re-encoded stream generated by the encoded stream conversion device can also be stored, as a file, in a storage such as a server. In addition, a device that distributes the encoded stream or the re-encoded stream can also be constructed.

INDUSTRIAL APPLICABILITY

The image encoding device, the image encoding method, and the encoded stream conversion device according to the present invention are suitable for use as those having a high necessity to maintain the random access intervals when encoding an image with a high degree of efficiency. Further, the image decoding device and the image decoding method according to the present invention are suitable for use as those having a high necessity to normally decode an encoded bitstream including randomly-accessible inter pictures even when the coding efficiency is improved while the random access intervals are maintained.

EXPLANATIONS OF REFERENCE NUMERALS

1 block partitioning unit, 2 encoding controlling unit (coding mode determinator), 3 select switch (prediction image generator), 4 intra prediction unit (prediction image generator), 5 motion-compensated prediction unit (prediction image generator), 6 subtracting unit (difference image generator), 7 transformation/quantization unit (image compressor), 8 inverse quantization/inverse transformation unit (local decoded image generator), 9 adding unit (local decoded image generator), 10 memory for intra prediction, 11 loop filter unit (filtering processor), 12 motion-compensated prediction frame memory, 13 variable length encoding unit (encoder), 14 slice partitioning unit (block partitioner), 31 variable length decoding unit (decoder), 32 inverse quantization/inverse transformation unit (difference image generator), 33 select switch (prediction image generator), 34 intra prediction unit (prediction image generator), 35 motion compensation unit (prediction image generator), 36 adding unit (decoded image generator), 37 memory for intra prediction, 38 loop filter unit (filtering processor), 39 motion-compensated prediction frame memory, 41 re-encoding unit, 42 re-encoding controlling unit (re-encoding setter), 43 decoding unit (image decoder), 44 input video signal controlling unit (re-encoding setter), and 45 bitstream combining unit (bitstream combiner).

The invention claimed is:

1. An image encoding device that includes a block partitioner to partition an inputted image into blocks which are units for encoding process and a coding mode determiner to determine a coding mode for each of the blocks after being partitioned by said block partitioner, and that performs an encoding process on each of the blocks after being partitioned by said block partitioner according to the coding mode determined by said coding mode determiner, and outputs compressed data about said block, said image encoding device comprising:
a prediction image generator to generate a prediction image of each of the blocks after being partitioned by said block partitioner;
an image compressor to compress a difference image between each of the blocks after being partitioned by said block partitioner and the prediction image generated by said prediction image generator and output compressed data about said difference image;
a local decoded image generator to decompress the difference image compressed by said image compressor and add the difference image decompressed thereby and the prediction image generated by said prediction image generator, to generate a local decoded image;
a filtering processor to perform a filtering process on the local decoded image generated by said local decoded image generator; and
an encoder to encode the compressed data outputted from said image compressor and the coding mode determined by said coding mode determiner, to generate a bitstream into which encoded data about said compressed data and encoded data about said coding mode are multiplexed,
wherein when a plurality of randomly-accessible inter pictures in a Group of Pictures (GOP) is encoded, said prediction image generator sets, as a reference picture, only a randomly-accessible intra picture whose position in encoding order is preceding and nearest to that of each of said plurality of randomly-accessible inter pictures, and performs a motion-compensated prediction using the set reference picture for a prediction process, and said encoder encodes identification information showing that each of said plurality of randomly-accessible inter pictures is randomly-accessible, and multiplexes encoded data about said identification information into said bitstream.

2. An image decoding device that inputs a bitstream in which an image is compression-encoded on a per block basis, and generates a decoded image, said image decoding device comprising:
a decoder to decode compressed data and a coding mode which are associated with each of blocks from said bitstream;
a prediction image generator to refer to a decoded pixel according to the coding mode decoded by said decoder to generate a prediction image for each of the blocks;
a decoded image generator to add a difference image generated by decompressing the compressed data decoded by said decoder and the prediction image generated by said prediction image generator to generate a decoded image; and
a filtering processor to perform a filtering process on the decoded image generated by said decoded image generator,
wherein said decoder decodes identification information showing which inter picture is a randomly-accessible one, and, when a plurality of randomly-accessible inter pictures in a Group of Pictures (GOP) identified by the said identification information is decoded, said prediction image generator sets, as a reference picture, only a randomly-accessible intra picture whose position in decoding order is preceding and nearest to that of each of said plurality of randomly-accessible inter pictures, and performs a motion-compensated prediction using the set reference picture for a prediction process.

3. An encoded stream conversion device that inputs a bitstream in which an image is compression-encoded on a per block basis, and outputs a re-encoded bitstream, said encoded stream conversion device comprising:
an image decoder to decode said bitstream to generate a decoded image, and also specify randomly-accessible intra pictures;
a re-encoding setter to set a re-encoding target intra picture which is to be re-encoded to a randomly-accessible inter picture from among said specified randomly-accessible intra pictures;

a re-encoder to re-encode said re-encoding target intra picture; and a bitstream combiner to combine said bitstream and the re-encoding target intra picture which is re-encoded by said re-encoder, and output a re-encoded bitstream, wherein said re-encoder encodes identification information showing that the picture which is re-encoded to said randomly-accessible inter picture is randomly-accessible, and multiplexes encoded data about said identification information into said re-encoded bitstream.

4. An image encoding method of, when in a block partitioner, partitioning an inputted image into blocks which are units for encoding process and, in a coding mode determiner, determining a coding mode for each of the blocks after being partitioned by said block partitioner, performing an encoding process on each of the blocks after being partitioned by said block partitioner according to said coding mode and outputting compressed data about said block, said image encoding method comprising the steps of:

in a prediction image generator, generating a prediction image of each of the blocks after being partitioned by said block partitioner;

in an image compressor, compressing a difference image between each of the blocks after being partitioned by said block partitioner and the prediction image generated by said prediction image generator and outputting compressed data about said difference image;

in a local decoded image generator, decompressing the difference image compressed by said image compressor and adding the difference image decompressed thereby and the prediction image generated by said prediction image generator, to generate a local decoded image;

in a filtering processor, performing a filtering process on the local decoded image generated by said local decoded image generator; and in an encoder, encoding the compressed data outputted from said image compressor and the coding mode determined by said coding mode determiner, to generate a bitstream into which encoded data about said compressed data and encoded data about said coding mode are multiplexed, wherein when a plurality of randomly-accessible inter pictures in a Group of Pictures (GOP) is encoded, said prediction image generator sets, as a reference picture, only a randomly-accessible intra picture whose position in encoding order is preceding and nearest to that of each of said plurality of randomly-accessible inter pictures, and performs a motion-compensated prediction using the set reference picture for a prediction process, and said encoder encodes identification information showing that each of said plurality of randomly-accessible inter pictures is randomly-accessible, and multiplexes encoded data about said identification information into said bitstream.

5. An image decoding method of inputting a bitstream in which an image is compression-encoded on a per block basis, and generating a decoded image, said image decoding method comprising the steps of:

in a decoder, decoding compressed data and a coding mode which are associated with each of blocks from said bitstream;

in a prediction image generator, referring to a decoded pixel according to the coding mode decoded by said decoder to generate a prediction image for each of the blocks;

in a decoded image generator, adding a difference image generated by decompressing the compressed data decoded by said decoder and the prediction image generated by said prediction image generator to generate a decoded image; and in a filtering processor, performing a filtering process on the decoded image generated by said decoded image generator, wherein said decoder decodes identification information showing which inter picture is a randomly-accessible one, and, when a plurality of randomly-accessible inter pictures in a Group of Pictures (GOP identified by the said identification information is decoded, said prediction image generator sets, as a reference picture, only a randomly-accessible intra picture whose position in decoding order is preceding and nearest to that of each of said plurality of randomly-accessible inter pictures, and performs a motion-compensated prediction using the set reference picture for a prediction process.

* * * * *